(12) United States Patent
Rodríguez

(10) Patent No.: US 10,892,555 B2
(45) Date of Patent: *Jan. 12, 2021

(54) FREQUENCY AND POLARIZATION RECONFIGURABLE ANTENNA SYSTEMS

(71) Applicant: Skyworks Solutions, Inc., Woburn, MA (US)

(72) Inventor: René Rodríguez, Rancho Santa Margarita, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,830

(22) Filed: Aug. 30, 2019

(65) Prior Publication Data

US 2020/0099134 A1 Mar. 26, 2020

Related U.S. Application Data

(63) Continuation of application No. 15/834,468, filed on Dec. 7, 2017, now Pat. No. 10,439,288.

(Continued)

(51) Int. Cl.
*H01Q 9/04* (2006.01)
*H01Q 9/16* (2006.01)
(Continued)

(52) U.S. Cl.
CPC ............ *H01Q 9/0442* (2013.01); *H01Q 1/50* (2013.01); *H01Q 9/16* (2013.01); *H01Q 19/005* (2013.01);
(Continued)

(58) Field of Classification Search
CPC .......... H01Q 9/0442; H01Q 9/16; H01Q 1/50; H01Q 19/005
(Continued)

(56) References Cited

U.S. PATENT DOCUMENTS 5,231,410 A * 7/1993 Murakami ........... H01Q 1/1278
343/704
5,673,053 A * 9/1997 Marthinsson .......... H01Q 1/242
343/702
(Continued)

FOREIGN PATENT DOCUMENTS

KR 10-2009-0057350 A 6/2009

OTHER PUBLICATIONS

Suzuki et al., "An Integrated Configuration of Antennas and Filters for Front-End Module in Massive-MIMO Transmitter" IEEE International Symposium on Radio-Frequency Integration Technology 2015, 3 pages.

(Continued)

*Primary Examiner* — Lam T Mai
(74) *Attorney, Agent, or Firm* — Knobbe, Martens, Olson & Bear, LLP

(57) ABSTRACT

Apparatus and methods for reconfigurable antenna systems are provided herein. In certain configurations, an antenna system includes an antenna element, a tuning conductor adjacent to and spaced apart from the antenna element, and a switch electrically connected between the tuning conductor and a reference voltage, such as ground. The tuning conductor is operable to load the antenna element, and the switch selectively connects the tuning conductor to the reference voltage to provide tuning to the antenna element.

20 Claims, 53 Drawing Sheets

Related U.S. Application Data

(60) Provisional application No. 62/432,839, filed on Dec. 12, 2016, provisional application No. 62/512,958, filed on May 31, 2017.

(51) Int. Cl.
  H01Q 19/00 (2006.01)
  H01Q 1/50 (2006.01)
  H01Q 1/38 (2006.01)
  H04B 1/18 (2006.01)
  H04B 7/0408 (2017.01)

(52) U.S. Cl.
  CPC ............... *H01Q 1/38* (2013.01); *H04B 1/18* (2013.01); *H04B 7/0408* (2013.01)

(58) Field of Classification Search
  USPC ......................................................... 343/744
  See application file for complete search history.

(56) References Cited

U.S. PATENT DOCUMENTS

| | | | |
|---|---|---|---|
| 5,966,097 A | 10/1999 | Fukasawa et al. | |
| 6,061,025 A | 5/2000 | Jackson | |
| 6,501,427 B1 | 12/2002 | Lilly | |
| 6,828,938 B2 | 12/2004 | Tran | |
| 6,844,852 B1 | 1/2005 | Simons | |
| 7,068,234 B2 | 6/2006 | Sievenpiper | |
| 7,260,424 B2 | 8/2007 | Schmidt | |
| 7,372,406 B2 | 5/2008 | Shiotsu et al. | |
| 7,868,829 B1 | 1/2011 | Colburn et al. | |
| 7,952,533 B2 | 5/2011 | Hur et al. | |
| 8,369,796 B2 | 2/2013 | Pan et al. | |
| 8,380,132 B2 | 2/2013 | Nagy | |
| 8,654,034 B2 | 2/2014 | Legare | |
| 8,659,480 B2 | 2/2014 | Wilkins | |
| 8,967,485 B2 | 3/2015 | Piazza et al. | |
| 9,002,431 B2* | 4/2015 | Jones | A61B 5/055 2/69 |
| 9,077,082 B2 | 7/2015 | Tatarnikov et al. | |
| 9,203,144 B2 | 12/2015 | De Luis et al. | |
| 9,236,955 B2 | 1/2016 | Bahl et al. | |
| 9,379,449 B2 | 6/2016 | Cetiner et al. | |
| 9,537,201 B2 | 1/2017 | Alexopoulos et al. | |
| 9,711,849 B1 | 7/2017 | Chen et al. | |
| 9,793,597 B2 | 10/2017 | Shamblin et al. | |
| 9,859,617 B1* | 1/2018 | Desclos | H01Q 9/285 |
| 9,941,584 B2 | 4/2018 | Kona et al. | |
| 9,941,593 B2 | 4/2018 | Ozdemir | |
| 10,038,240 B2 | 7/2018 | Patron et al. | |
| 10,439,288 B2* | 10/2019 | Rodriguez | H01Q 9/0442 |
| 2003/0098812 A1 | 5/2003 | Ying et al. | |
| 2006/0152411 A1 | 7/2006 | Iguchi et al. | |
| 2006/0281423 A1 | 12/2006 | Caimi et al. | |
| 2007/0069958 A1 | 3/2007 | Ozkar | |
| 2009/0322619 A1 | 12/2009 | Ollikainen et al. | |
| 2010/0304693 A1 | 12/2010 | Uejima et al. | |
| 2013/0099987 A1* | 4/2013 | Desclos | H01Q 1/243 343/745 |
| 2013/0147672 A1* | 6/2013 | Desclos | H01Q 3/00 343/745 |
| 2015/0022408 A1 | 1/2015 | Shamblin et al. | |
| 2016/0134349 A1 | 5/2016 | Ljung et al. | |
| 2016/0302319 A1 | 10/2016 | Ferretti et al. | |
| 2018/0263561 A1* | 9/2018 | Jones | A61B 5/6831 |
| 2018/0294569 A1 | 10/2018 | Hoang et al. | |
| 2018/0337458 A1 | 11/2018 | Rodríguez | |

OTHER PUBLICATIONS

Zetterberg et al., Project Name: Millimetre-Wave Based Mobile Radio Access Network for Fifth Generation Integrated Communications (mmMAGIC), "Initial multi-node and antenna transmitter and receiver architectures and schemes," dated Mar. 31, 2016, 140 pages.

International Search Report and Written Opinion of the International Searching Authority for International Application No. PCT/US2017/065172 dated Mar. 29, 2018 in 14 pages.

Written Opinion from Singapore Patent Office for Application No. 11201905304S, dated Jun. 30, 2020.

* cited by examiner

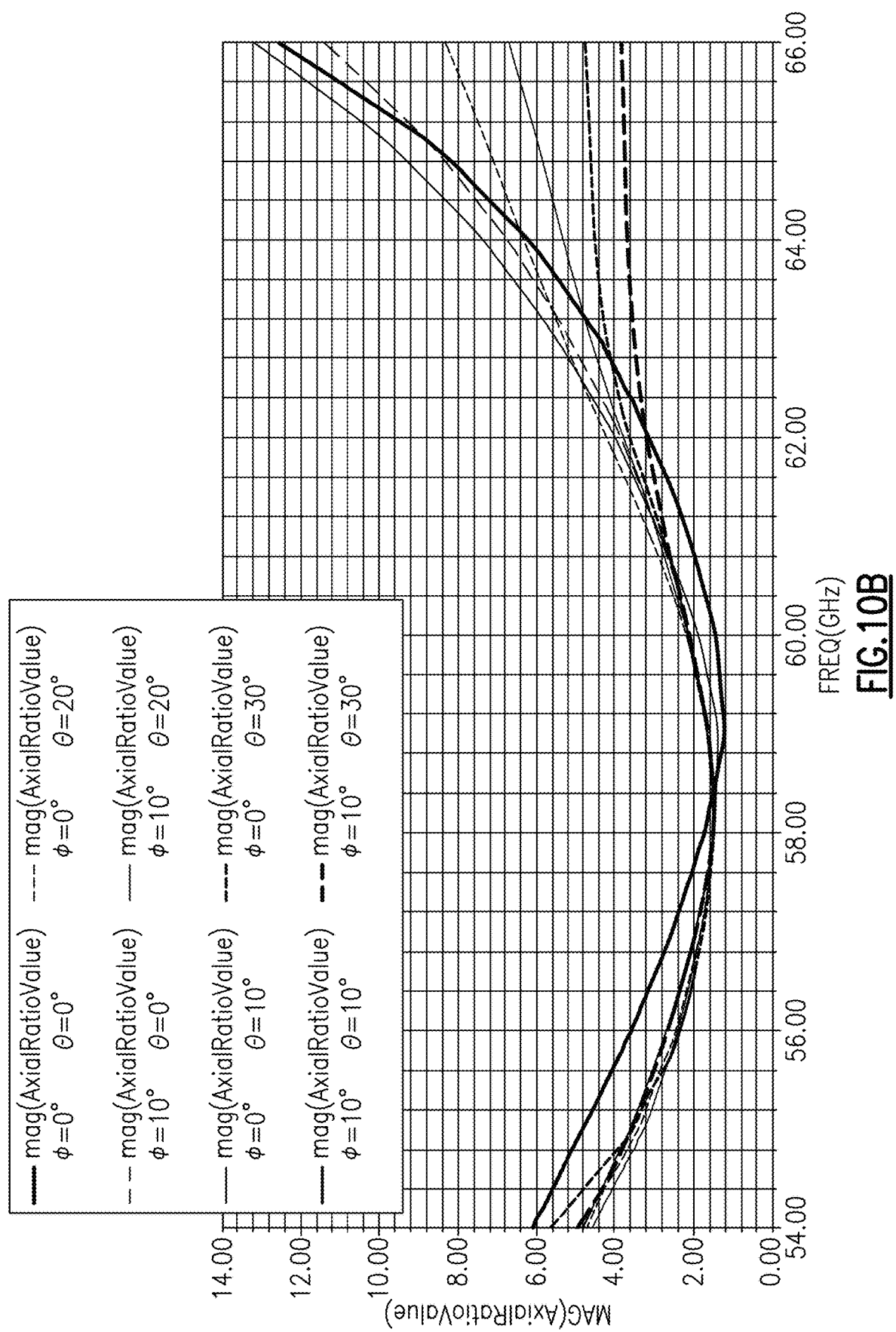

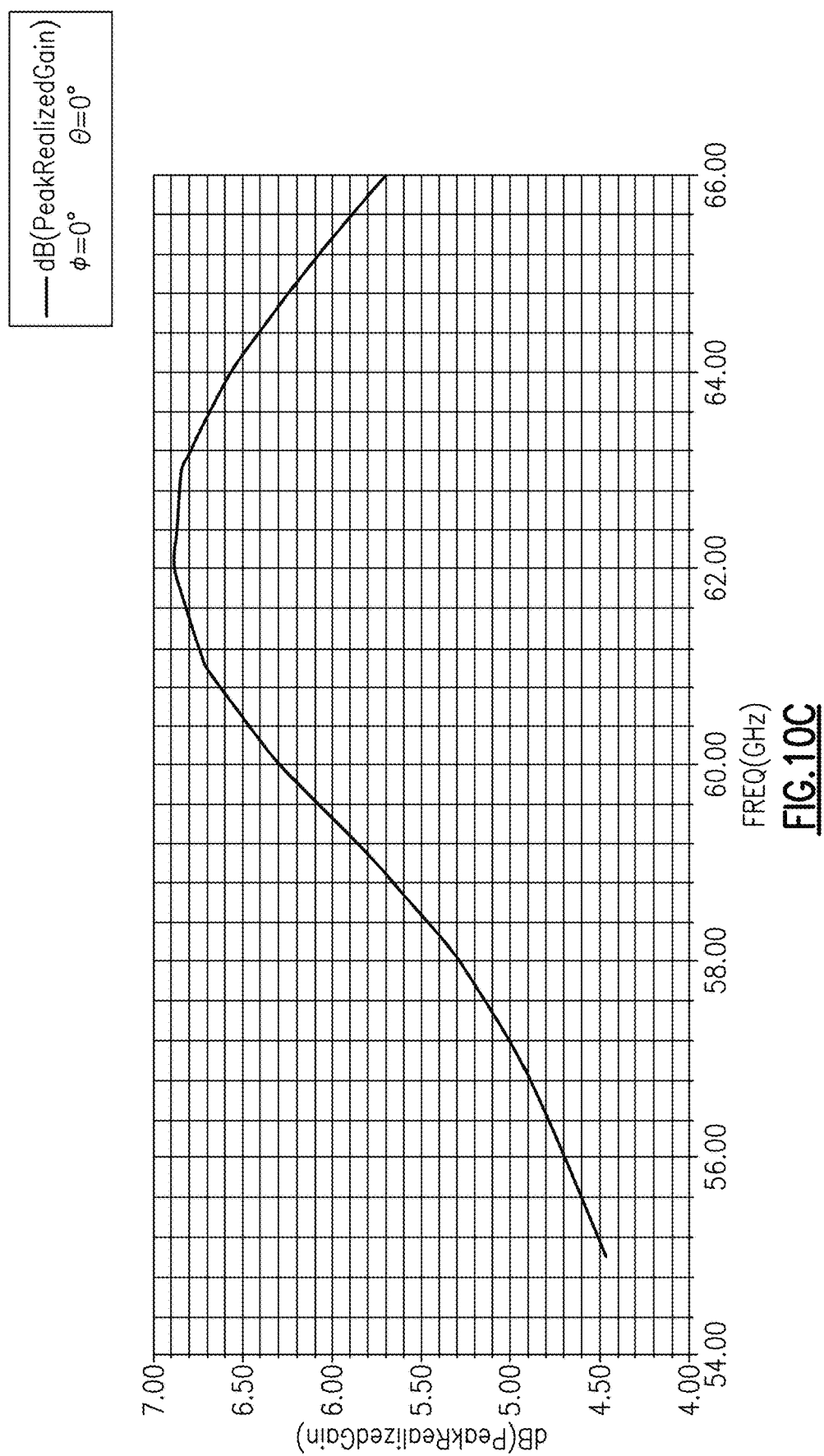

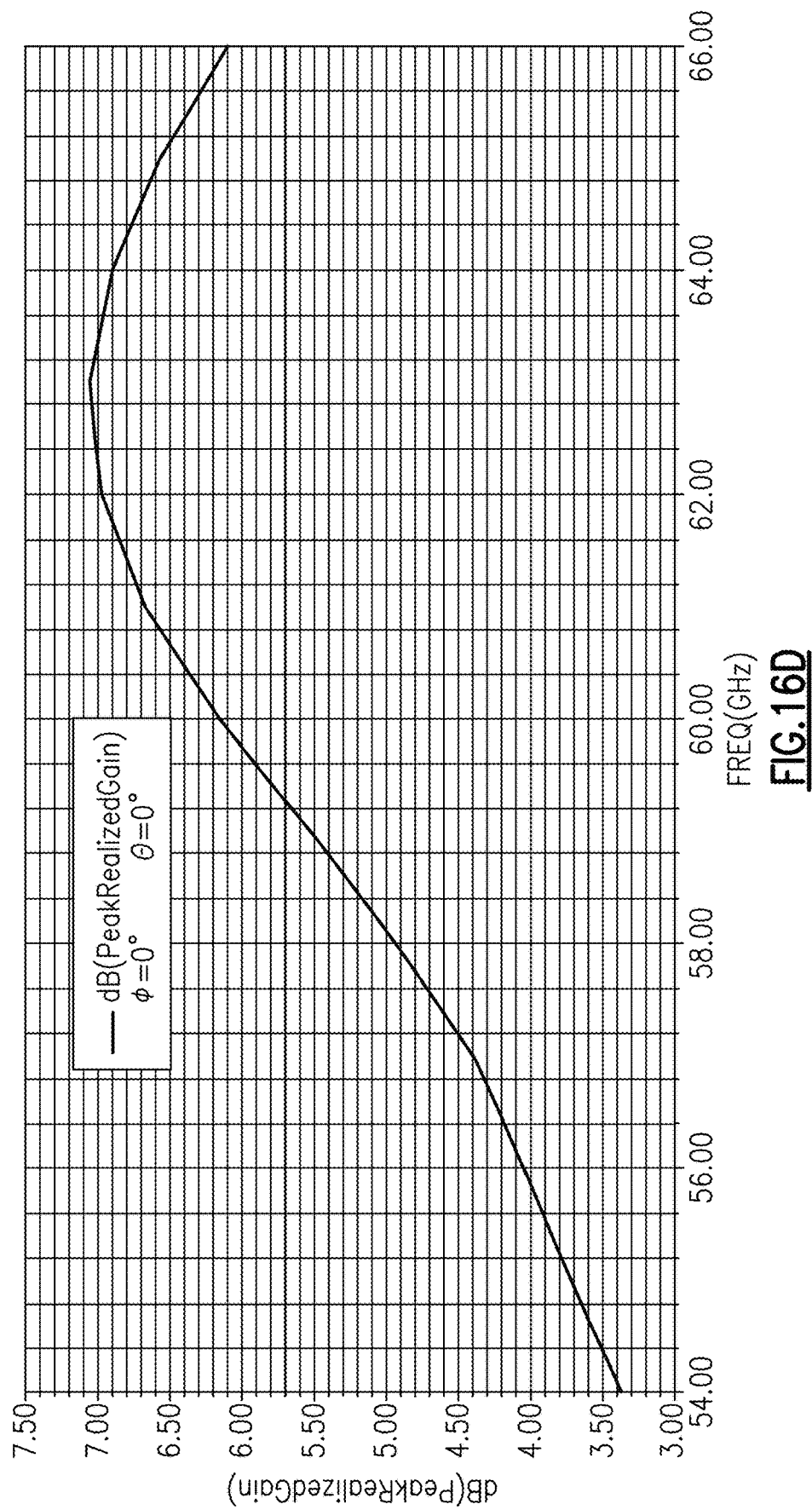

FREQUENCY AND POLARIZATION RECONFIGURABLE ANTENNA SYSTEMS

CROSS-REFERENCE TO RELATED APPLICATIONS

This application is a continuation of U.S. application Ser. No. 15/834,468, filed Dec. 7, 2017 and titled "FREQUENCY AND POLARIZATION RECONFIGURABLE ANTENNA SYSTEMS" which claims the benefit of priority under 35 U.S.C. § 119 of U.S. Provisional Patent Application No. 62/512,958, filed May 31, 2017 and titled "FREQUENCY AND POLARIZATION RECONFIGURABLE PATCH ANTENNA," and U.S. Provisional Patent Application No. 62/432,839, filed Dec. 12, 2016 and titled "FREQUENCY AND POLARIZATION RECONFIGURABLE PATCH ANTENNA," each of which is herein incorporated by reference in its entirety.

BACKGROUND

Technical Field

Embodiments of the invention relate to electronic systems, and in particular, to radio frequency (RF) electronics.

Description of Related Technology

A radio frequency (RF) communication system can include a transceiver, a front end, and one or more antennas for wirelessly transmitting and receiving signals. The front end can include low noise amplifier(s) for amplifying signals received via the antenna(s), and power amplifier(s) for boosting signals for transmission via the antenna(s).

Examples of RF communication systems include, but are not limited to, mobile phones, tablets, base stations (including macro cell base stations and small cell base stations), network access points, customer-premises equipment (CPE), laptops, and wearable electronics.

SUMMARY

In certain embodiments, the present disclosure relates to a radio frequency module. The radio frequency module includes a module substrate, an antenna element on the module substrate, a tuning conductor on the module substrate and adjacent to and spaced apart from the antenna element, and a switch electrically connected between the tuning conductor and a ground voltage. The tuning conductor is operable to load the antenna element, and the switch is operable to selectively connect the tuning conductor to the ground voltage to control an antenna characteristic of the antenna element.

In some embodiments, a state of the switch is operable to tune a bandwidth of the antenna element.

In various embodiments, a state of the switch is operable to steer a direction of polarization of the antenna element.

In a number of embodiments, the radio frequency module further includes a semiconductor die attached to the module substrate and including the switch.

In accordance with several embodiments, the radio frequency module further includes at least two tuning conductors positioned along different sides of the antenna element, the at least two tuning conductors including the tuning conductor.

According to some embodiments, the antenna element includes a signal feed and a ground feed, and the radio frequency module further includes a ground switch operable to selectively connect the ground feed to the ground voltage.

In various embodiments, the module substrate is a laminate and the switch is integrated in an internal layer of the laminate.

In a number of embodiments, the radio frequency module further includes two or more antenna elements loaded by the tuning conductor, the two or more antenna elements including the antenna element.

In accordance with some embodiments, the switch is operable to control the tuning conductor with the ground voltage in a first state and to electrically float the tuning conductor in a second state.

In several embodiments, the antenna element is a patch antenna, a dipolar antenna, a ceramic resonator, a stamped metal antenna, or a laser direct structuring antenna.

In a number of embodiments, the antenna element includes at least one fin extending from a surface of the module substrate. In various embodiments, the tuning conductor includes at least one fin extending from the surface of the module substrate.

In some embodiments, the antenna element is formed over encapsulation.

In certain embodiments, the present disclosure relates to a communication device for a wireless network. The communication device includes an antenna element, a transceiver configured to control wireless communications associated with the antenna element, a tuning conductor adjacent to and spaced apart from the antenna element, and a switch electrically connected between the tuning conductor and a ground voltage. The tuning conductor is operable to load the antenna element, and the switch is operable to selectively connect the tuning conductor to the ground voltage to control an antenna characteristic of the antenna element.

In various embodiments, a state of the switch is operable to tune a bandwidth of the antenna element.

In several embodiments, a state of the switch is operable to steer a direction of polarization of the antenna element.

In a number of embodiments, the antenna element includes a signal feed and a ground feed, and the radio frequency module further includes a ground switch operable to selectively connect the ground feed to the ground voltage.

In certain embodiments, the present disclosure relates to a base station for a cellular network. The base station includes a circuit board, an antenna element formed on the circuit board, a tuning conductor formed on the circuit board and adjacent to and spaced apart from the antenna element, and a switch electrically connected between the tuning conductor and a ground voltage. The tuning conductor is operable to load the antenna element, and the switch is operable to selectively connect the tuning conductor to the ground voltage to control an antenna characteristic of the antenna element.

In some embodiments, the antenna element includes a signal feed and a ground feed, and the radio frequency module further includes a ground switch operable to selectively connect the ground feed to the ground voltage.

In various embodiments, a state of the switch is operable to tune a bandwidth of the antenna element.

In certain embodiments, the present disclosure relates to a radio frequency module. The radio frequency module includes a module substrate, a first antenna element on a first side of the module substrate, a first tuning conductor adjacent to and spaced apart from the first antenna element on the first side of the module substrate, the first tuning conductor operable to load the first antenna element, and a first switch electrically connected between the first tuning conductor and a ground voltage. The first switch is operable to selectively connect the first tuning conductor to the ground voltage to provide tuning to the first antenna element.

In some embodiments, a state of the first switch is operable to tune a bandwidth of the first antenna element.

In several embodiments, a state of the first switch is operable to steer a direction of polarization of the first antenna element.

In a number of embodiments, the radio frequency module further includes a semiconductor die attached to the module substrate. In accordance with several embodiments, the semiconductor die is embedded in an internal layer of the module substrate. According to various embodiments, semiconductor die is on a second side of the module substrate opposite the first side. In accordance with certain embodiments, the semiconductor die includes the first switch. According to several embodiments, semiconductor die controls a state of the first switch. In accordance with various embodiments, the semiconductor die includes an interface that receives switch data operable to select the state of the first switch.

In some embodiments, the radio frequency module further includes a plurality of tuning conductors including the first tuning conductor and a second tuning conductor. According to a number of embodiments, the first tuning conductor is positioned along a first side of the first antenna element and the second tuning conductor is positioned along a second side of the first antenna element different from the first side and operable to load the first antenna element. In accordance with several embodiments, the plurality of tuning conductors includes at least four tuning conductors positioned along four or more different sides of the first antenna element and operable to load the first antenna element. According to various embodiments, the radio frequency module further includes a second antenna element on the first side of the module substrate adjacent to the first antenna element, the second tuning conductor operable to load the second antenna element.

In several embodiments, the first antenna element includes a signal feed and a ground feed, the radio frequency module further comprising a ground switch operable to selectively connect the ground feed to the ground voltage.

In a number of embodiments, the module substrate is a laminate. According to several embodiments, the first switch is integrated in an internal layer of the laminate.

In various embodiments, the module substrate includes a via operable to provide the ground voltage to the first switch.

According to several embodiments, the first antenna element is configured to receive radio waves.

In accordance with a number of embodiments, the first antenna element is configured to transmit radio waves.

In some embodiments, the first antenna element is configured to both transmit and receive radio waves.

In several embodiments, the radio frequency module further includes a second antenna element on the first side of the module substrate adjacent to the first antenna element. According to a number of embodiments, the first tuning conductor is adjacent to and spaced apart from the second antenna element and is operable to load the second antenna element.

In various embodiments, the first switch is operable to ground the first tuning conductor in a first state and to electrically float the first tuning conductor in a second state.

In some embodiments, the first switch is a field-effect transistor switch.

According to a number of embodiments, the first antenna element is a patch antenna, a dipolar antenna, a ceramic resonator, a stamped metal antenna, or a laser direct structuring antenna.

In several embodiments, the first antenna element includes at least one fin extending from a surface of the module substrate. In accordance with various embodiments, the first tuning conductor includes at least one fin extending from the surface of the module substrate.

In some embodiments, the first antenna element is formed over encapsulation that is between the first antenna element and the module substrate.

In a number of embodiments, the radio frequency module further includes an antenna array on the first side of the module substrate and including a plurality of antenna elements including the first antenna element. In accordance with several embodiments, the antenna array is operable to provide beamforming. According to various embodiments, the antenna array is operable to provide multi-input and multiple output communications.

In certain embodiments, the present disclosure relates to a communication device for operating as user equipment in a cellular network. The communication device includes a first antenna element, a first tuning conductor adjacent to and spaced apart from the first antenna element, and a first switch electrically connected between the first tuning conductor and a ground voltage. The first tuning conductor is operable to load the first antenna element, and the first switch is operable to selectively connect the first tuning conductor to the ground voltage to provide tuning to the first antenna element.

In some embodiments, a state of the first switch is operable to tune a bandwidth of the first antenna element.

In several embodiments, a state of the first switch is operable to steer a direction of polarization of the first antenna element.

In a number of embodiments, the communication device further includes a semiconductor die. In accordance with various embodiments, the semiconductor die includes the first switch. According to certain embodiments, the semiconductor die controls a state of the first switch. In accordance with several embodiments, the semiconductor die includes an interface that receives switch data operable to select the state of the first switch.

In some embodiments, the communication device further includes a plurality of tuning conductors including the first tuning conductor and a second tuning conductor. In accordance with a number of embodiments, the first tuning conductor is positioned along a first side of the first antenna element and the second tuning conductor is positioned along a second side of the first antenna element different from the first side and operable to load the first antenna element. According to several embodiments, the plurality of tuning conductors includes at least four tuning conductors positioned along four or more different sides of the first antenna element and operable to load the first antenna element. In accordance with a number of embodiments, the communication device further includes a second antenna element, the second tuning conductor operable to load the second antenna element.

In various embodiments, the first antenna element includes a signal feed and a ground feed, the radio frequency module further including a ground switch operable to selectively connect the ground feed to the ground voltage.

In a number of embodiments, the communication device further includes a front end system and a transceiver electrically coupled to the first antenna element via the front end system. In accordance with several embodiments, the front end system further includes a power amplifier configured to provide a transmit radio frequency signal to the first antenna element. According to various embodiments, the front end system further includes a low noise amplifier configured to amplify a radio frequency signal received from the first antenna element.

In some embodiments, the communication device further includes a second antenna element adjacent to the first antenna element. In a number of embodiments, the first tuning conductor is adjacent to and spaced apart from the second antenna element and is operable to load the second antenna element.

In several embodiments, the first switch is operable to ground the first tuning conductor in a first state and to electrically float the first tuning conductor in a second state.

In various embodiments, the first switch is a field-effect transistor switch.

In a number of embodiments, the first antenna element is a patch antenna, a dipolar antenna, a ceramic resonator, a stamped metal antenna, or a laser direct structuring antenna.

In accordance with several embodiments, the first antenna element includes at least one fin. In various embodiments, the first tuning conductor includes at least one fin.

In some embodiments, the communication device further includes an antenna array including a plurality of antenna elements including the first antenna element. In accordance with a number of embodiments, the antenna array is operable to provide beamforming. According to several embodiments, the antenna array is operable to provide multi-input and multiple output communications.

In certain embodiments, the present disclosure relates to a base station for a wireless network. The base station includes a first antenna element, a first tuning conductor adjacent to and spaced apart from the first antenna element, the first tuning conductor operable to load the first antenna element, and a first switch electrically connected between the first tuning conductor and a ground voltage. The first switch is operable to selectively connect the first tuning conductor to the ground voltage to provide tuning to the first antenna element.

In some embodiments, a state of the first switch is operable to tune a bandwidth of the first antenna element.

In several embodiments, a state of the first switch is operable to steer a direction of polarization of the first antenna element.

In a number of embodiments, the base station further includes a semiconductor die. In accordance with various embodiments, the semiconductor die includes the first switch. According to certain embodiments, the semiconductor die controls a state of the first switch. In accordance with several embodiments, the semiconductor die includes an interface that receives switch data operable to select the state of the first switch.

In some embodiments, the base station further includes a plurality of tuning conductors including the first tuning conductor and a second tuning conductor. In accordance with a number of embodiments, the first tuning conductor is positioned along a first side of the first antenna element and the second tuning conductor is positioned along a second side of the first antenna element different from the first side and operable to load the first antenna element. According to several embodiments, the plurality of tuning conductors includes at least four tuning conductors positioned along four or more different sides of the first antenna element and operable to load the first antenna element. In accordance with a number of embodiments, the base station further includes a second antenna element, the second tuning conductor operable to load the second antenna element.

In various embodiments, the first antenna element includes a signal feed and a ground feed, the radio frequency module further including a ground switch operable to selectively connect the ground feed to the ground voltage.

In a number of embodiments, the base station further includes a front end system and a transceiver electrically coupled to the first antenna element via the front end system. In accordance with several embodiments, the front end system further includes a power amplifier configured to provide a transmit radio frequency signal to the first antenna element. According to various embodiments, the front end system further includes a low noise amplifier configured to amplify a radio frequency signal received from the first antenna element.

In some embodiments, the base station further includes a second antenna element adjacent to the first antenna element. In a number of embodiments, the first tuning conductor is adjacent to and spaced apart from the second antenna element and is operable to load the second antenna element.

In several embodiments, the first switch is operable to ground the first tuning conductor in a first state and to electrically float the first tuning conductor in a second state.

In various embodiments, the first switch is a field-effect transistor switch.

In a number of embodiments, the first antenna element is a patch antenna, a dipolar antenna, a ceramic resonator, a stamped metal antenna, or a laser direct structuring antenna.

In accordance with several embodiments, the first antenna element includes at least one fin. In various embodiments, the first tuning conductor includes at least one fin.

In some embodiments, the base station further includes an antenna array including a plurality of antenna elements including the first antenna element. In accordance with a number of embodiments, the antenna array is operable to provide beamforming. According to several embodiments, the antenna array is operable to provide multi-input and multiple output communications.

BRIEF DESCRIPTION OF THE DRAWINGS

Embodiments of this disclosure will now be described, by way of non-limiting example, with reference to the accompanying drawings.

FIGS. 10A-10C show graphs of antenna characteristics of an RF module according to one embodiment.

FIGS. 16A-16E show graphs of antenna characteristics of an RF module according to another embodiment.

DETAILED DESCRIPTION OF CERTAIN EMBODIMENTS

Figure 1:
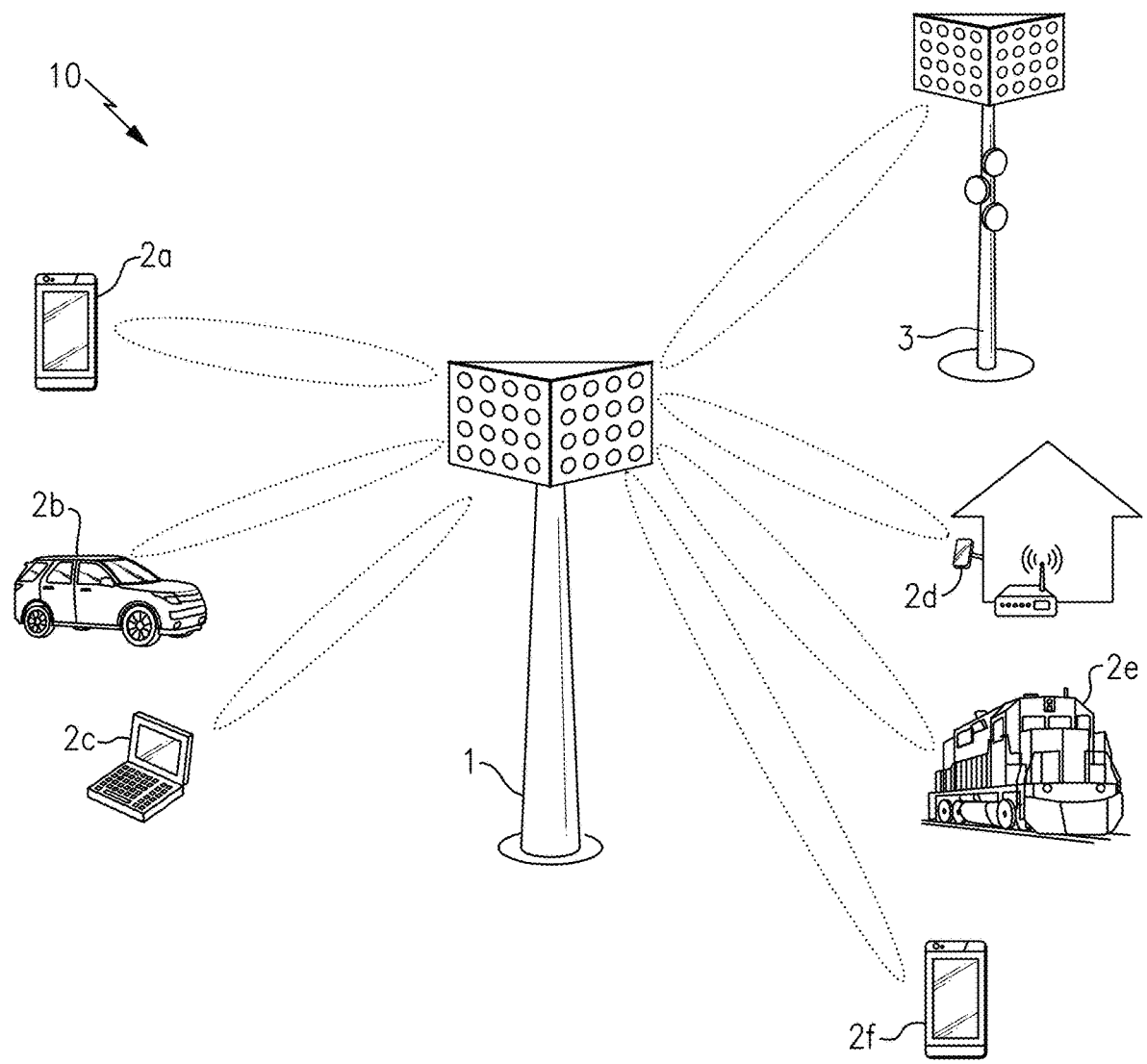
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet-of-Things (NB-IOT), Vehicle-to-Everything (V2X), and High Power User Equipment (HPUE).

3GPP plans to introduce Phase 1 of fifth generation (5G) technology in Release 15 (targeted for 2018) and Phase 2 of 5G technology in Release 16 (targeted for 2019). Release 15 is anticipated to address 5G communications at less than 6 GHz, while Release 16 is anticipated to address communications at 6 GHz and higher. Subsequent 3GPP releases will further evolve and expand 5G technology. 5G technology is also referred to herein as 5G New Radio (NR).

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, and a second mobile device 2f.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices.

The illustrated communication network 10 of FIG. 1 supports communications using a variety of technologies, including, for example, 4G LTE, 5G NR, and wireless local area network (WLAN), such as Wi-Fi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communication with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
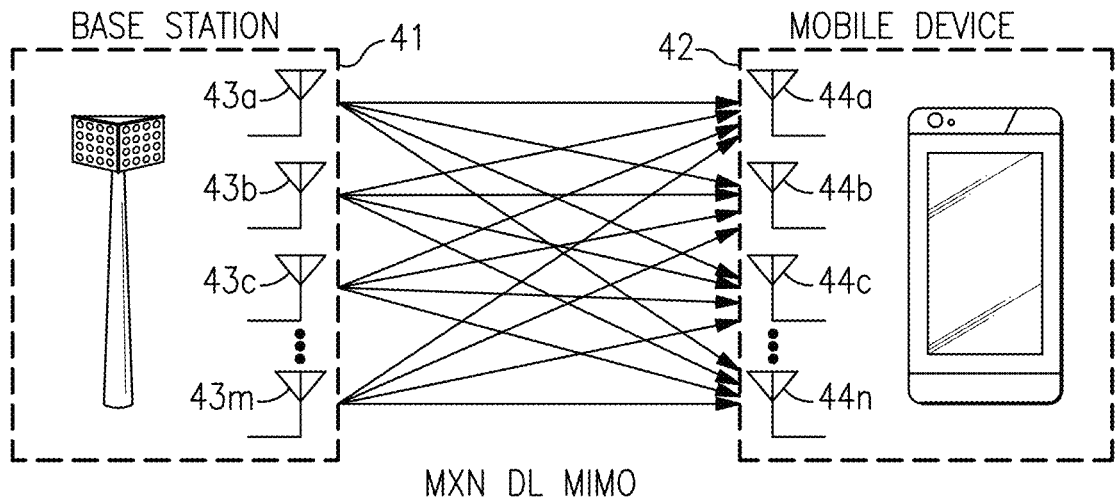
FIG. 2A is a schematic diagram of one example of a downlink channel using multi-input and multi-output (MIMO) communications.
Figure 2B:
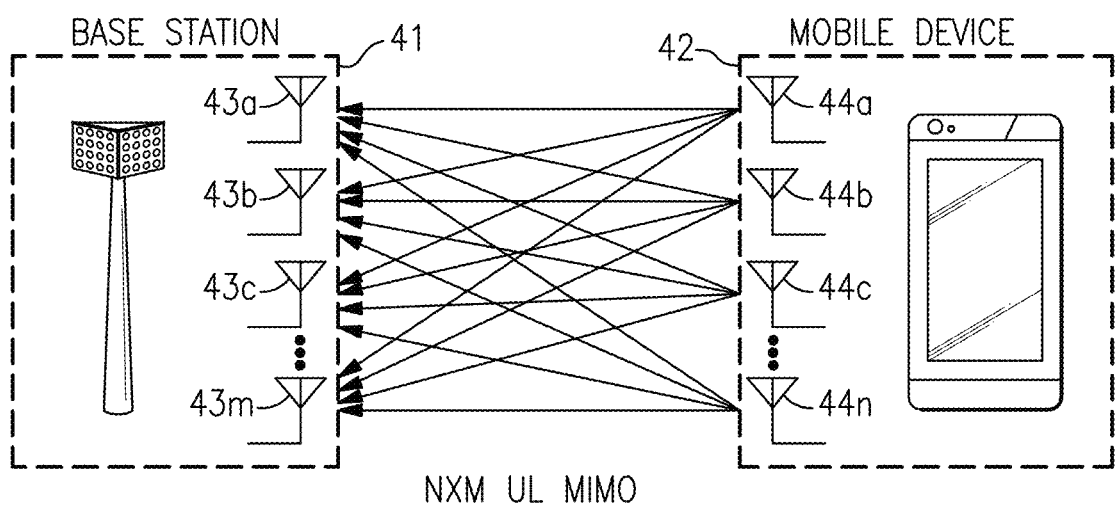
FIG. 2B is schematic diagram of one example of an uplink channel using MIMO communications.

FIG. 2A is a schematic diagram of one example of a downlink channel using multi-input and multi-output (MIMO) communications. FIG. 2B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 2A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 2A illustrates an example of M×N DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 2B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 2B illustrates an example of N×M UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3:
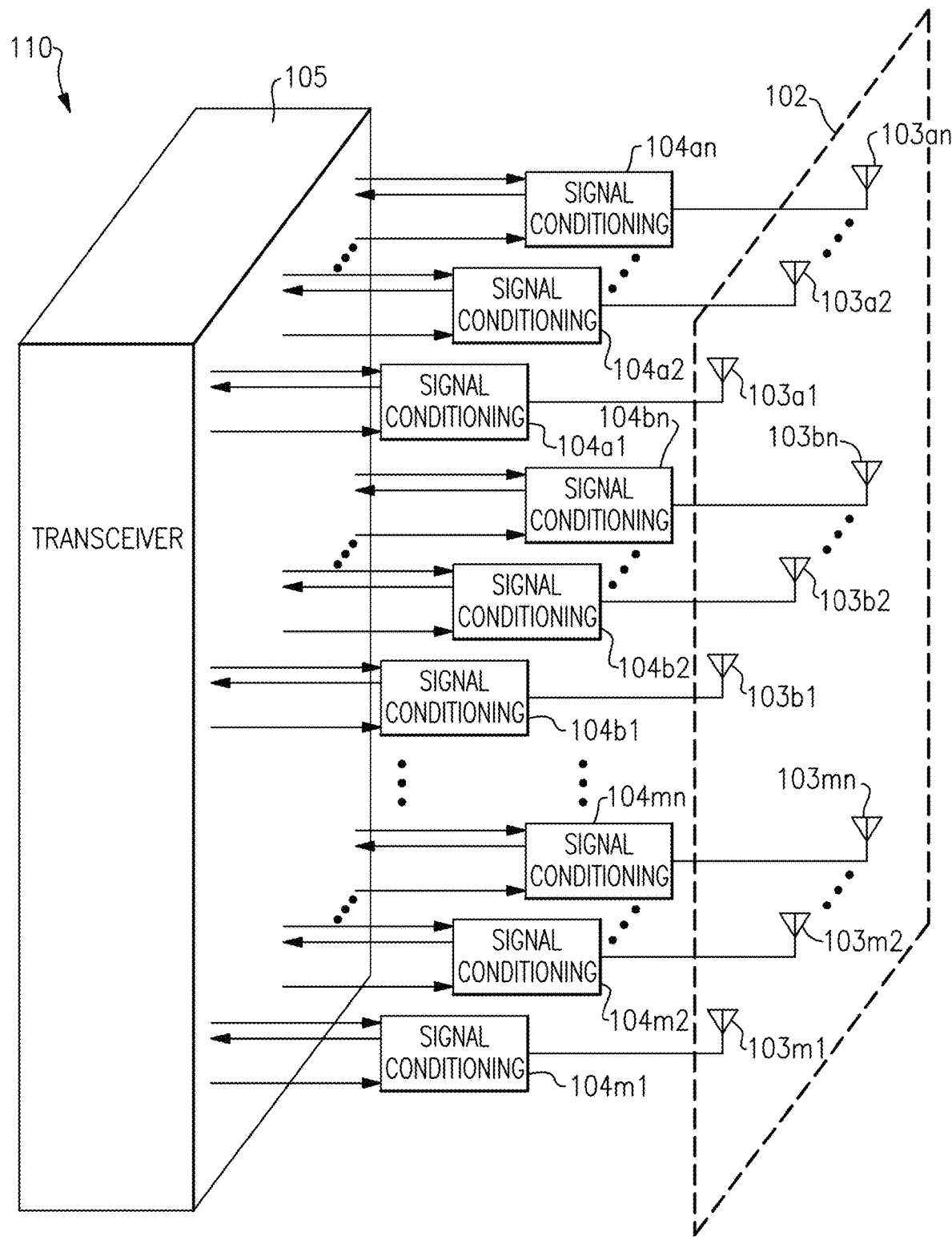
FIG. 3 is a schematic diagram of one example of a communication system that operates with beamforming.

FIG. 3 is a schematic diagram of one example of a communication system 110 that operates with beamforming. The communication system 110 includes a transceiver 105, signal conditioning circuits 104a1, 104a2 . . . 104an, 104b1, 104b2 . . . 104bn, 104m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 3, the transceiver 105 generates control signals for the signal conditioning circuits. The control signals can be used for a variety of functions, such as controlling the phase of transmitted or received signals to control beam forming.

Figure 4A:
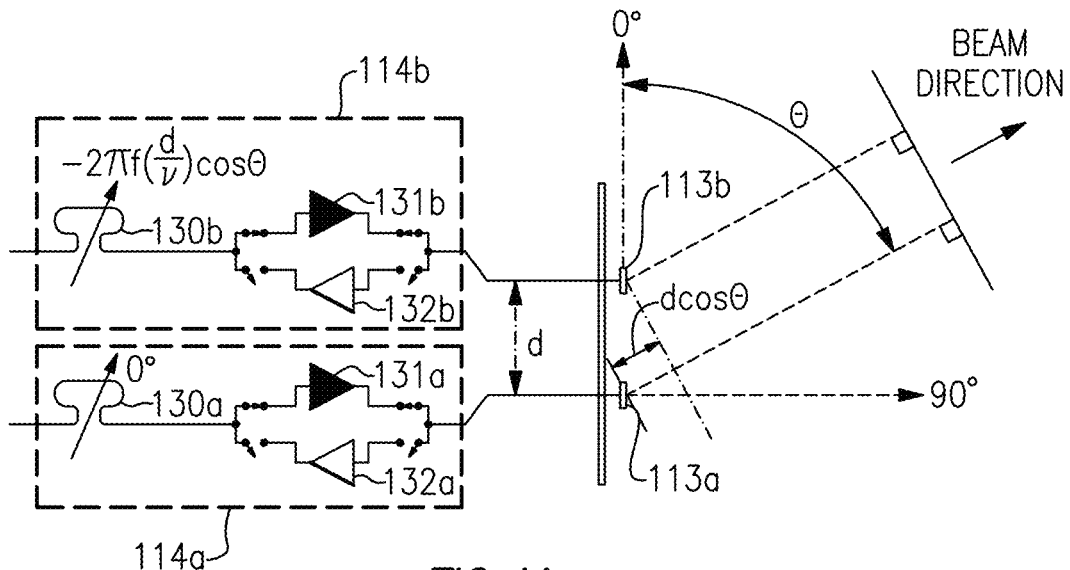
FIG. 4A is a schematic diagram of one example of beamforming to provide a transmit beam.

FIG. 4A is a schematic diagram of one example of beamforming to provide a transmit beam. FIG. 4A illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 4A illustrates one embodiment of a portion of the communication system 110 of FIG. 3.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132b, and switches for controlling selection of the power amplifier 131b or LNA 132b.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4A has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle θ can be achieved. For example, when the first phase shifter 130a has a reference value of 0°, the second phase shifter 130b can be controlled to provide a phase shift of about $-2\pi f(d/v)\cos\theta$ radians, where f is the fundamental frequency of the transmit signal, d is the distance between the antenna elements, v is the velocity of the radiated wave, and it is the mathematic constant pi.

In certain implementations, the distance d is implemented to be about ½λ, where λ is the wavelength of the fundamental component of the transmit signal. In such implementations, the second phase shifter 130b can be controlled to provide a phase shift of about $-\pi \cos \theta$ radians to achieve a transmit beam angle $\theta$.

Accordingly, the relative phase of the phase shifters 130a, 130b can be controlled to provide transmit beamforming. In certain implementations, a transceiver (for example, the transceiver 105 of FIG. 3) controls phase values of one or more phase shifters to control beamforming.

Figure 4B:
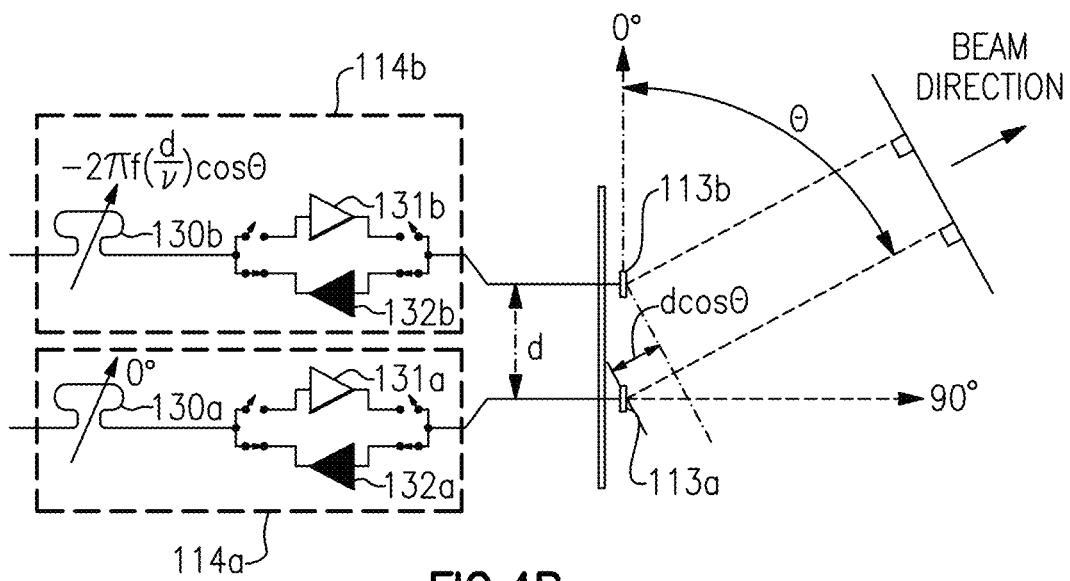
FIG. 4B is a schematic diagram of one example of beamforming to provide a receive beam.

FIG. 4B is a schematic diagram of one example of beamforming to provide a receive beam. FIG. 4B is similar to FIG. 4A, except that FIG. 4B illustrates beamforming in the context of a receive beam rather than a transmit beam.

As shown in FIG. 4B, a relative phase difference between the first phase shifter 130a and the second phase shifter 130b can be selected to about equal to $-2\pi f(d/v)\cos \theta$ radians to achieve a desired receive beam angle $\theta$. In implementations in which the distance d corresponds to about $\frac{1}{2}\lambda$, the phase difference can be selected to about equal to $-\pi \cos \theta$ radians to achieve a receive beam angle $\theta$.

Although various equations for phase values to provide beamforming have been provided, other phase selection values are possible, such as phase values selected based on implementation of an antenna array, implementation of signal conditioning circuits, and/or a radio environment.

Moreover, in certain applications, it is desirable for an antenna system to have a tunable bandwidth, thereby providing control over transmit and/or receive frequencies.

The communication networks and systems of FIGS. 1-4B illustrate example radio frequency electronics that can include a reconfigurable antenna system implemented in accordance with the teachings herein. However, the teachings herein are applications to other configurations of radio frequency electronics.

Examples of Frequency and Polarization Reconfigurable Antenna Systems

Apparatus and methods for reconfigurable antenna systems are provided herein. In certain configurations, an antenna system includes an antenna element, a tuning conductor adjacent to and spaced apart from the antenna element, and a switch electrically connected between the tuning conductor and a reference voltage (for instance, a ground voltage). The tuning conductor is operable to load the antenna element, and the switch selectively connects the tuning conductor to the reference voltage to provide tuning to the antenna element.

By implementing the antenna system in this manner, antenna characteristics of the antenna element can be controlled. For example, when the tuning conductor is connected to the reference voltage, the tuning conductor provides a secondary resonance that modifies the operation of the antenna element relative to when the tuning conductor is disconnected from the reference voltage (for instance, electrically floating). Thus, selection of a state of the switch (selection of a low impedance state or a high impedance state) can control a bandwidth and/or a direction of polarization of the antenna element, thereby providing frequency and/or polarization configurability.

In certain implementations, the antenna element includes a signal feed for receiving a signal and a reference feed (for instance, a ground feed) that is selectively connected to ground or another suitable reference voltage via a feed switch (for instance, a ground switch). Including the feed switch provides a further mechanism or knob to tune antenna characteristics. For example, the state of the feed switch can be used to modify the antenna element's operational characteristics by either connecting the reference feed to the reference voltage or disconnecting the reference feed from the reference voltage (for instance, electrically floating the reference feed).

In certain implementations multiple switches and multiple tuning conductors are provided. In one example, an antenna element is tuned by two or more tuning conductors. In a second example, separate tuning conductors are provided for two or more antenna elements. In a third example, a shared tuning conductor is used to tune two or more antenna elements.

The switch state of the antenna system can be changed over time, thereby reconfiguring the antenna system to provide desired performance characteristics at a given moment. For example, the state of the switch can be controlled to provide an optimal or near-optimal radiation pattern for a given operating environment at a given time. Thus, seamless connectivity between a mobile communication device and a base station can be provided as the mobile communication device moves relative to the base station and/or as a signaling environment changes. In one example, the state of the switches is controlled to maintain circular polarization of a mobile communication device on the move.

In certain implementations, the state of the switches is controlled based on feedback parameters of a communication link. Thus, the switch state can be controlled using a control loop, via a closed or semi-closed system, to achieve appropriate antenna characteristics.

In one example, the antenna system can be included a mobile communication device that is communicating with a base station. Additionally, a receive strength signal indicator (RSSI), an error rate indicator, and/or other signal from the base station can be used to control selection of the switch state of the mobile communication device. In another example, the antenna system is included in a base station (for example, a macro cell base station or a small cell base station) that is communication with a mobile communication device. Additionally, an RSSI, an error rate indicator, and/or other signal from the mobile communication device can be used to control selection of the switch state of the base station.

The antenna systems herein are suitable for transmitting and/or receiving signals of a wide range of frequencies, for instance, frequencies in the range of about 500 MHz to 300 GHz, and more particular, 20 GHz to 100 GHz.

In certain embodiments, a tuning conductor has a length of less than about 1 mm, a width of less than about 0.3 mm, and is spaced apart from an antenna element by less than about 100 μm. However, other tuning conductor dimensions and spacings are possible. In various embodiments, an antenna element has a width of less than about 1.5 mm and a length of less than about 1.5 mm. However, other antenna dimensions are possible.

Figure 5A:
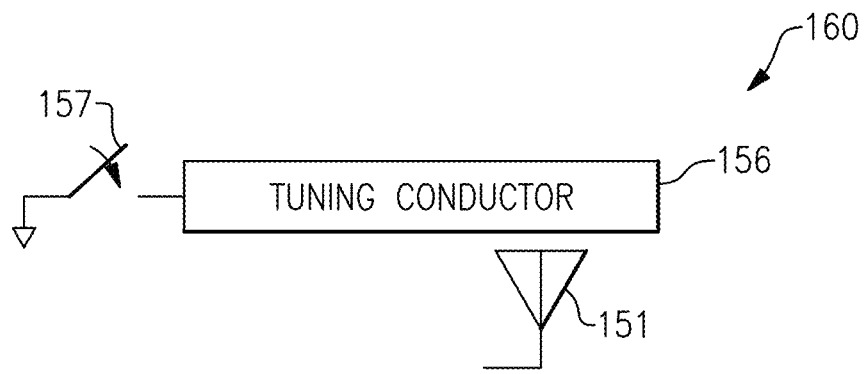
FIG. 5A is a schematic diagram of one embodiment of a tunable antenna.

FIG. 5A is a schematic diagram of one embodiment of a tunable antenna 160. The tunable antenna 160 includes an antenna element 151, a tuning conductor 156, and a switch 157. The tunable antenna 160 illustrates one example of an antenna system with tuning.

The tuning conductor 156 is adjacent to and spaced apart from the antenna element 156. Additionally, the tuning conductor 156 operates to load the antenna element 151, thereby impacting one or more characteristics of the antenna element 151. Although the tuning conductor 156 is illustrated as a rectangular strip of metal, the tuning conductor 156 can be shaped in other ways.

As shown in FIG. 5A, the switch 157 is electrically connected between the tuning conductor 156 and a reference voltage (for example, a ground voltage). Additionally, the switch 157 serves to selectively connect the tuning conductor 156 to the reference voltage so as to tune the antenna element 151.

By implementing the tunable antenna 160 in this manner, antenna characteristics of the antenna element 151 can be controlled. For example, when the tuning conductor 156 is connected to the reference voltage, the tuning conductor 156 provides a secondary resonance that modifies the operation of the antenna element 151 relative to when the tuning conductor 156 is disconnected from the reference voltage (for instance, electrically floating).

Figure 5B:
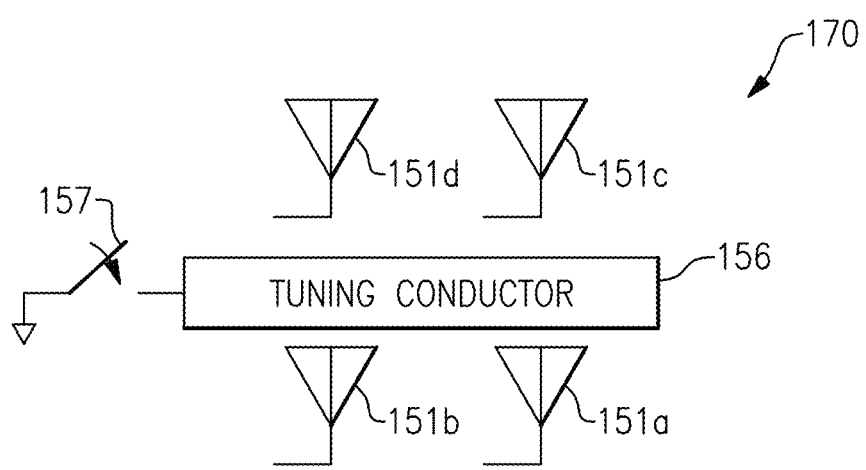
FIG. 5B is a schematic diagram of one embodiment of a tunable antenna array.

FIG. 5B is a schematic diagram of one embodiment of a tunable antenna array 170. The tunable antenna array 170 illustrates another example of an antenna system with tuning. The embodiment of FIG. 5B is similar to the embodiment of FIG. 5A, except that the tunable antenna array 170 of FIG. 5B includes multiple antenna elements 151a-151d.

Although an example with four antenna elements are shown, the teachings herein are applicable to a wide variety of antenna systems, including configurations using more or fewer antenna elements.

The antenna elements 151a-151d can correspond to antenna elements implemented in a wide variety of ways. For instance, examples of antenna elements include, but are not limited to, patch antennas, dipole antennas, ceramic resonators, stamped metal antennas, and/or laser direct structuring antennas.

The tuning conductor 156 serves to load the antenna elements 151a-151d. Thus, the state of the switch 157 can be controlled to tune the bandwidth of the antenna elements 151a-151d.

Although FIG. 5B illustrates an example in which a shared tuning conductor is used to tune two or more antenna elements, the teachings herein are also applicable to implementations in which multiple switch-controlled tuning conductors are provided for tuning one or more antenna elements. In one example, an antenna element is tuned by two or more tuning conductors. In a second example, separate tuning conductors are provided for two or more antenna elements.

Figure 5C:
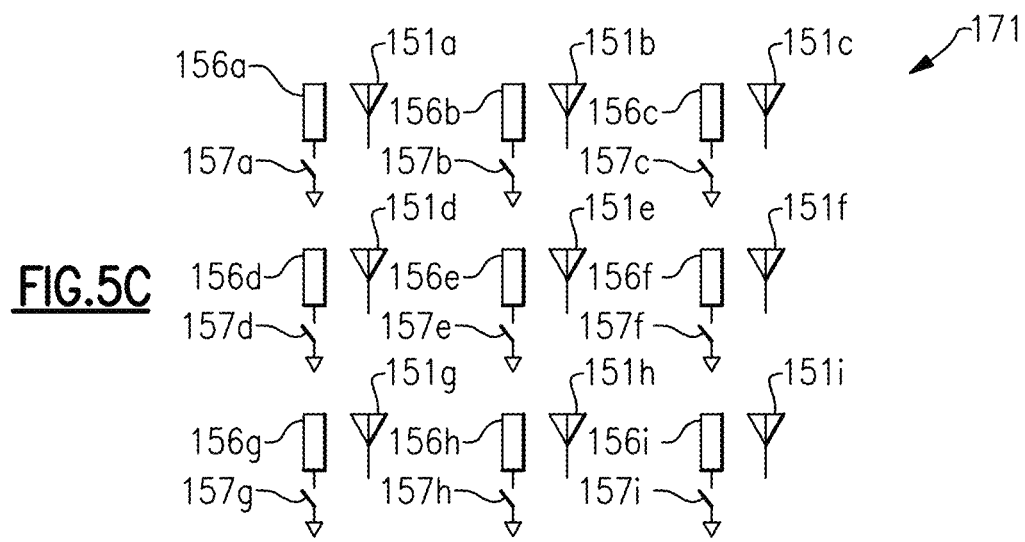
FIG. 5C is a schematic diagram of another embodiment of a tunable antenna array.

FIG. 5C is a schematic diagram of another embodiment of a tunable antenna array 171 with tuning. The tunable antenna array 171 includes antenna elements 151a-151i, which are an arranged in a three-by-three (3×3) array, in this embodiment. The tunable antenna array 171 further includes tuning conductors 156a-156i and switches 157a-157i.

As shown in FIG. 5C, each antenna element 151a-151i is tuned by a switched-controlled tuning conductor. For example, the antenna elements 151a-151i are loaded by the tuning conductors 156a-156i, respectively. Furthermore, the switches 157a-157i individually control connection of the tuning conductors 156a-156i, respectively, to a reference voltage (for instance, ground).

The tunable antenna array 171 illustrates another example of an antenna system with tuning. Although an example with a 3×3 antenna array is show, the teachings herein are applicable to antenna systems including more or fewer antenna elements. Moreover, antenna elements can be arrayed in other patterns or configurations, including, for instance, linear arrays and/or arrays using non-uniform arrangements of antenna elements. Furthermore, although an example with a one-to-one correspondence between switches and tuning conductors is shown, in certain implementations one switch controls two or more tuning conductors and/or one tuning conductor is controlled by two or more switches. Accordingly, other implementations are possible.

Figure 5D:
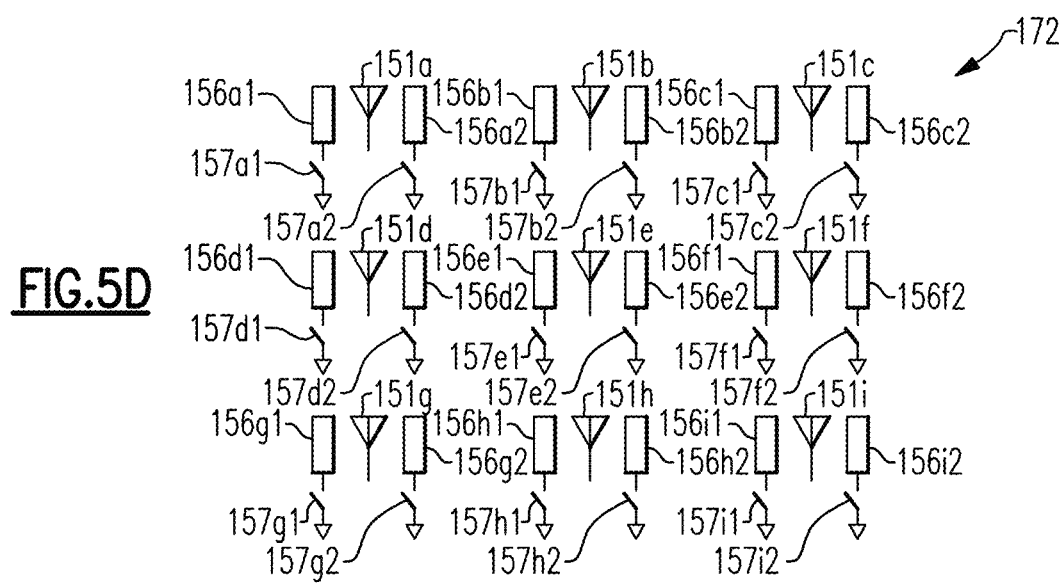
FIG. 5D is a schematic diagram of another embodiment of a tunable antenna array.

FIG. 5D is a schematic diagram of another embodiment of a tunable antenna array 172. The tunable antenna array 172 includes antenna elements 151a-151i, which are an arranged in a 3×3 array, in this embodiment. The tunable antenna array 172 further includes tuning conductors 156a1, 156a2, 156b1, 156b2, 156c1, 156c2, 156d1, 156d2, 156e1, 156e2, 156f1, 156f2, 156g1, 156g2, 156h1, 156h2, 156i1, 156i2. The tunable antenna array 172 further includes switches 157a1, 157a2, 157b1, 157b2, 157c1, 157c2, 157d1, 157d2, 157e1, 157e2, 157f1, 157f2, 157g1, 157g2, 157h1, 157h2, 157i1, 157i2. As shown in FIG. 5D, each antenna element 151a-151i is tuned by two switched-controlled tuning conductors positioned on a pair of opposite sides of each antenna element.

The tunable antenna array 172 illustrates another example of an antenna system with tuning. However, other implementations are possible.

Figure 5E:
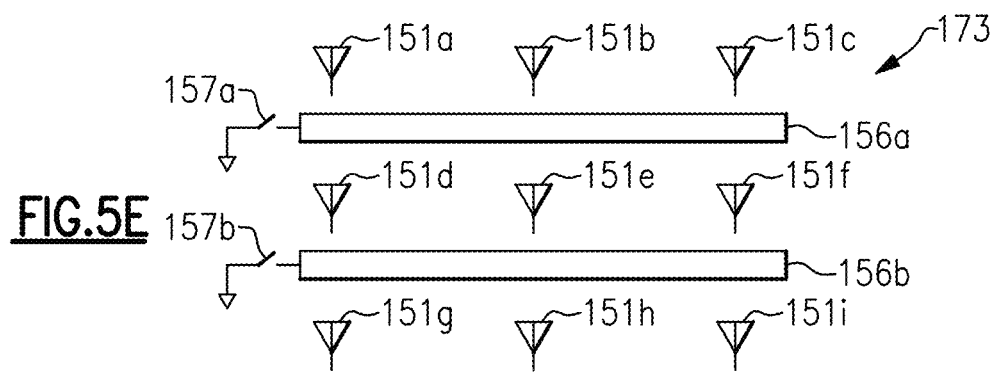
FIG. 5E is a schematic diagram of another embodiment of a tunable antenna array.

FIG. 5E is a schematic diagram of another embodiment of a tunable antenna array 173. The tunable antenna array 173 includes antenna elements 151a-151i, which are an arranged in a 3×3 array, in this embodiment. Additionally, the tunable antenna array 173 further includes a first tuning conductor 156a, a second tuning conductor 156b, a first switch 157a, and a second switch 157b.

As shown in FIG. 5E, two switch-controlled tuning conductors are positioned between rows of the array to provide tuning to the array. In this example, the first tuning conductor 157a loads antenna elements 151a-151f, and the second tuning conductor 157b loads antenna elements 151d-151i.

The tunable antenna array 173 illustrates another example of an antenna system with tuning. However, other implementations are possible.

Figure 6A:
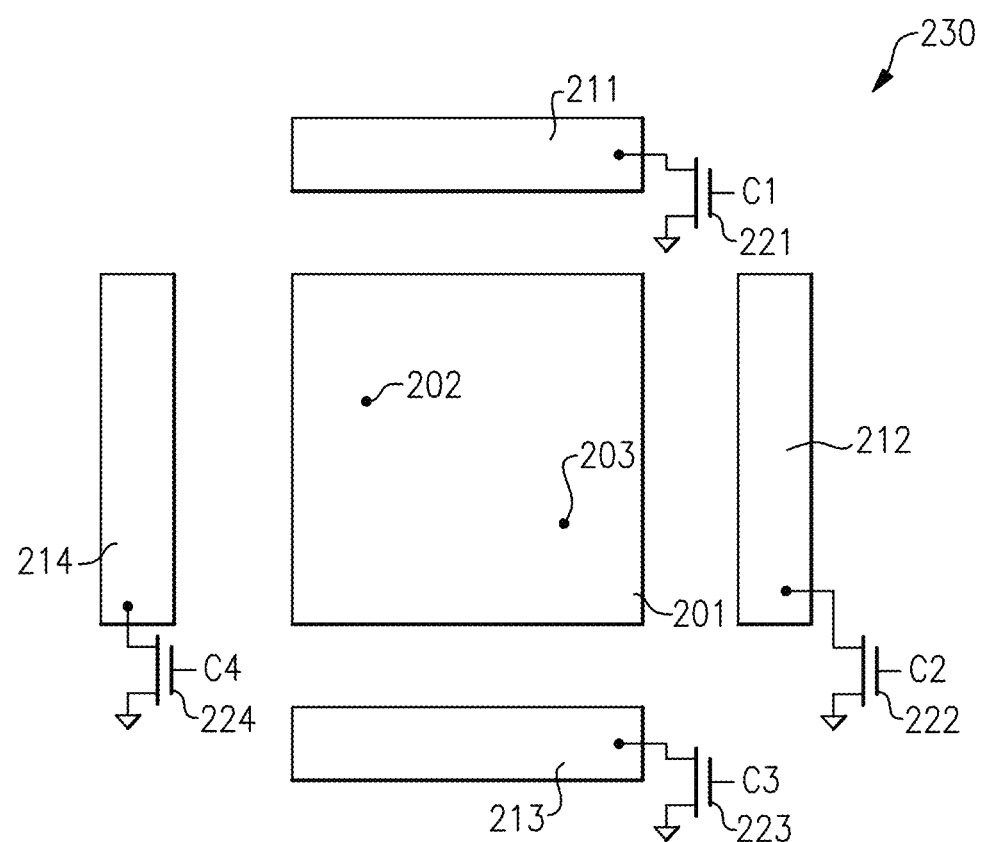
FIG. 6A is a schematic diagram of a tunable patch antenna according to one embodiment.

FIG. 6A is a schematic diagram of a tunable patch antenna 230 according to one embodiment. The tunable patch antenna 230 includes a patch antenna element 201, a first tuning conductor 211, a second tuning conductor 212, a third tuning conductor 213, a fourth tuning conductor 214, a first transistor switch 221, a second transistor switch 222, a third transistor switch 223, and a fourth transistor switch 224.

Although FIG. 6A illustrates an implementation of a tunable patch antenna with one patch antenna element, four tuning conductors, and four switches, other configurations are possible. For example, a tunable patch antenna can include other numbers of tuning conductors and/or switches. Although an example with a patch antenna is shown, the teachings herein are applicable to implementations using a different antenna type. Furthermore, the teachings herein are applicable to antenna systems including an array of antenna elements. Accordingly, other implementations are possible.

The patch antenna element 201 includes a signal feed 202 for receiving a signal and a ground feed 203 for receiving ground. In certain implementations, the tunable patch antenna 230 further includes a ground switch for selectively connecting the ground feed 203 to ground, thereby providing an additional knob for controlling the antenna characteristics of the tunable patch antenna 230.

The patch antenna element 201 can be used for transmitting and/or receiving signals, depending on implementation. Accordingly, the patch antenna element 201 can serve as a transmit antenna, a receive antenna, or a transmit/receive antenna. In one example, the signal feed 202 receives a transmit signal, such as a power amplifier output signal. In another example, the signal feed 202 is used to provide a receive signal to a low noise amplifier (LNA) or other receiver circuitry.

Although the illustrated patch antenna element 201 is substantially rectangular in shape, a patch antenna element can be shaped in a wide variety of ways.

The patch antenna element 201 and the tuning conductors 211-214 can be implemented in a planar configuration. For example, the tunable patch antenna 230 can be implemented on a side of a substrate, such as a laminate. In various embodiments, the laminate is an organic laminate and/or is a laminate with four or fewer conductive layers. Thus, the patch antenna element 201 and the tuning conductors 211-214 can be implemented on a patterned conductive layer of a substrate.

In the illustrated embodiment, the tuning conductors 211-214 are spaced apart from the patch antenna element 201, and surround a boundary or perimeter of the patch antenna element 201. For example, the first tuning conductor 211 is positioned adjacent a top side of the patch antenna element 201, the second tuning conductor 212 is positioned adjacent a right side of the patch antenna element 201, the third tuning conductor 213 is positioned adjacent a bottom side of the patch antenna element 201, and the fourth tuning conductor 214 is positioned adjacent a left side of the patch antenna element 201. Although an example including four rectangular tuning conductors is shown, the teachings herein are applicable to implementations including more or fewer tuning conductors and/or tuning conductors with different shapes, sizes, and/or orientations. Accordingly, other implementations are possible.

As shown in FIG. 6A, the transistor switches 221-224 individually control connection of the tuning conductors 221-224 to ground.

In the illustrated embodiment, the first transistor switch 221 is electrically connected between the first tuning conductor 211 and ground, and is controlled by a first control signal C1. Additionally, the second transistor switch 222 is electrically connected between the second tuning conductor 212 and ground, and is controlled by a second control signal C2. Furthermore, the third transistor switch 223 is electrically connected between the third tuning conductor 213 and ground, and is controlled by a third control signal C3. Additionally, the fourth transistor switch 224 is electrically connected between the fourth tuning conductor 214 and ground, and is controlled by a fourth control signal C4.

Although an implementation using transistor switches is shown, other implementations of switches are possible, including, but not limited to, implementations using pin diode switches and/or microelectromechanical switches.

The control signals C1-C4 can be generated in a wide variety of ways. In one example, a transceiver of a communications device generates the control signals C1-C4, thereby controlling the state of the transistor switches 221-224. In certain implementations, data stored in a programmable memory, such as a non-volatile memory, is used to control the switch state.

The control signals C1-C4 are used to selectively connect the transistor switches 221-224, respectively, to ground, thereby changing the antenna characteristics of the tunable patch antenna 230.

Accordingly, the tunable patch antenna 230 is reconfigurable by controlling the state of the transistor switches 221-224. By controlling the tuning conductors 211-214 in this manner, antenna characteristics such as bandwidth and/or polarization can be controlled. For example, implementing the tunable patch antenna 230 in this manner can aid in tuning frequency bandwidth and/or steering polarization in a particular direction.

Additional detail of the tunable patch antenna 230 can be as described earlier.

Figure 6B:
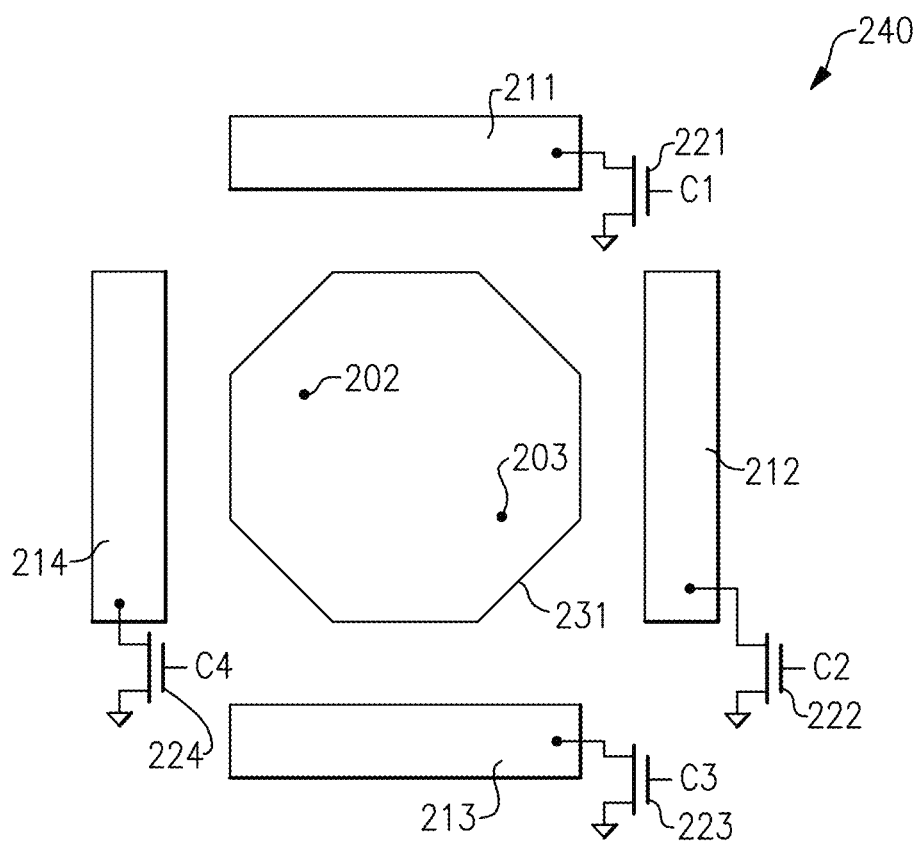
FIG. 6B is a schematic diagram of a tunable patch antenna according to another embodiment.

FIG. 6B is a schematic diagram of a tunable patch antenna 240 according to another embodiment. The tunable patch antenna 240 includes a patch antenna element 231, a first tuning conductor 211, a second tuning conductor 212, a third tuning conductor 213, a fourth tuning conductor 214, a first transistor switch 221, a second transistor switch 222, a third transistor switch 223, and a fourth transistor switch 224.

The tunable patch antenna 240 of FIG. 6B is similar to the tunable patch antenna 230 of FIG. 6A, except that the tunable patch antenna 240 includes a patch antenna element with a different shape. In particular, the patch antenna element 231 of FIG. 6B includes an octagonal shape. The teachings herein are applicable to patch antenna elements implemented with a variety of shapes and/or sizes, as well as to other implementations of antenna elements.

Additional details of the tunable patch antenna 240 can be as described earlier.

Figure 6C:
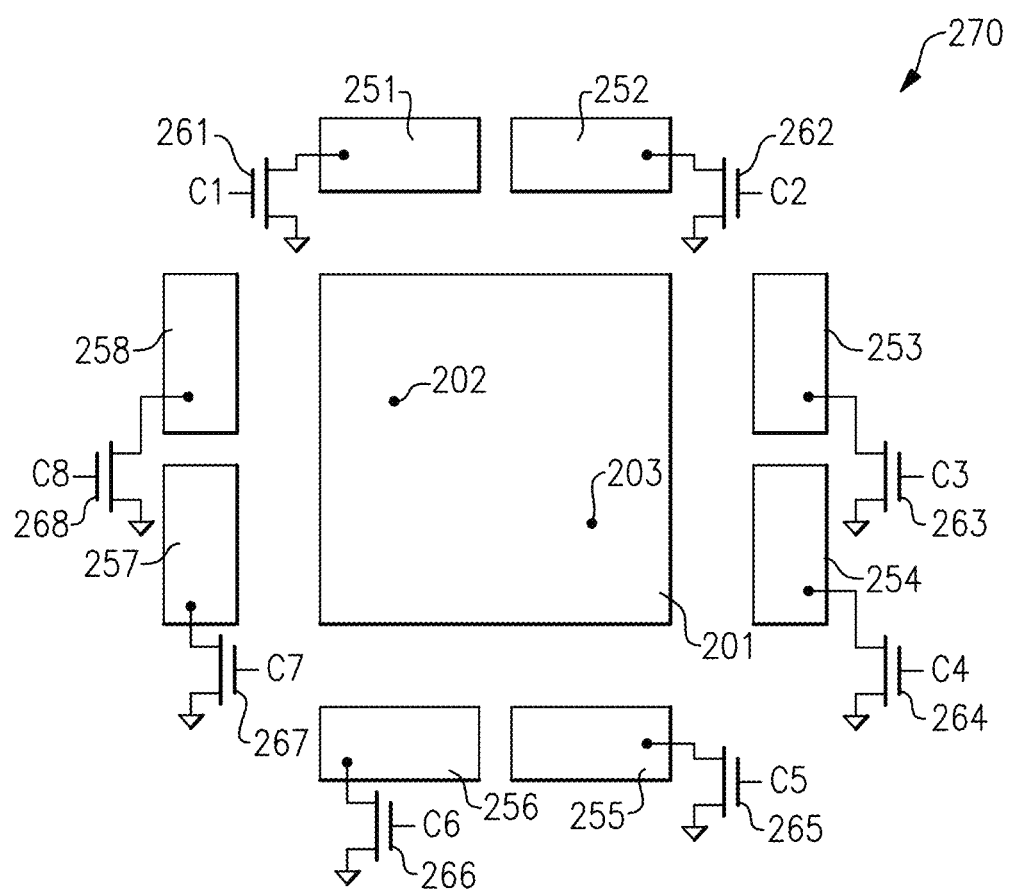
FIG. 6C is a schematic diagram of a tunable patch antenna according to another embodiment.

FIG. 6C is a schematic diagram of a tunable patch antenna 270 according to another embodiment. The tunable patch antenna 270 includes a patch antenna element 201, a first tuning conductor 251, a second tuning conductor 252, a third tuning conductor 253, a fourth tuning conductor 254, a fifth tuning conductor 255, a sixth tuning conductor 256, a seventh tuning conductor 257, an eighth tuning conductor 258, a first transistor switch 261, a second transistor switch 262, a third transistor switch 263, a fourth transistor switch 264, a fifth transistor switch 265, a sixth transistor switch 266, a seventh transistor switch 267, and an eighth transistor switch 268.

The tunable patch antenna 270 of FIG. 6C is similar to the tunable patch antenna 230 of FIG. 6A, except that the tunable patch antenna 270 includes a different implementation of tuning conductors surrounding the perimeter of the patch antenna element 201. For example, the illustrated tuning conductors 251-258 are positioned along the sides of the patch antenna element 201, with two tuning conductors per side. Additionally, the transistor switches 261-268 are controlled by the control signals C1-C8, respectively, thereby controlling connection of the tuning conductors 251-258 to ground.

The teachings herein are applicable to a wide variety of tuning conductors surrounding an antenna element. For example, tuning conductors of different number, shape, size, and/or orientation can be included in an antenna system. Accordingly, other implementations are possible.

Additional details of the tunable patch antenna 270 can be as described earlier.

Figure 6D:
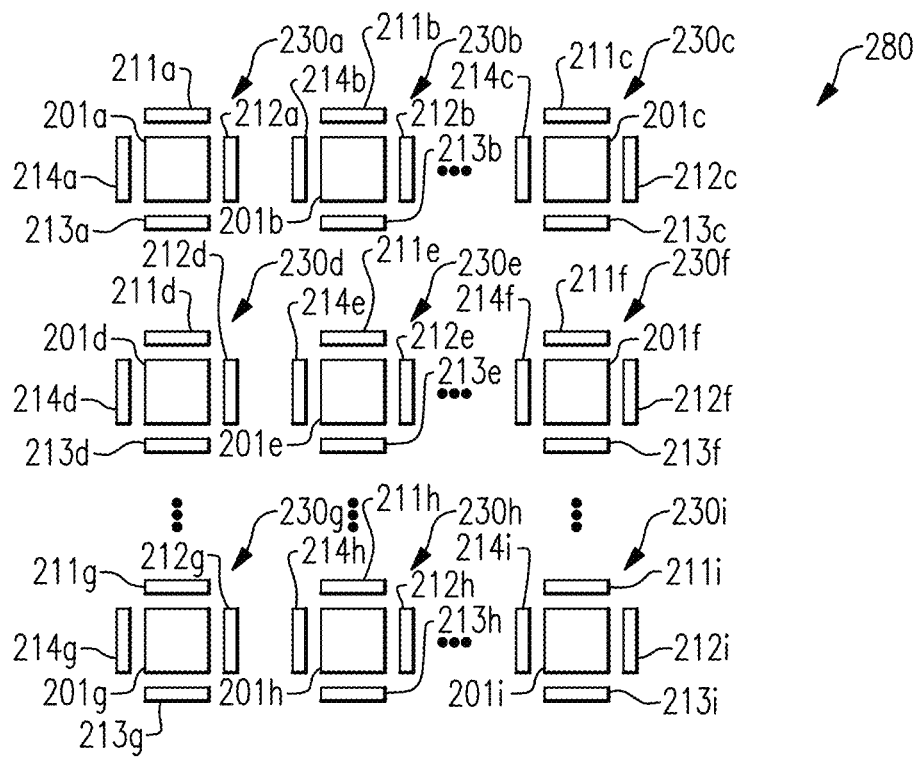
FIG. 6D is a schematic diagram of a tunable patch antenna array according to one embodiment.

FIG. 6D is a schematic diagram of a tunable patch antenna array 280 according to one embodiment. The tunable patch antenna array 280 includes an array of tunable patch antennas 230a-230i, each of which can be implemented as described with respect to FIG. 6A. For clarity of the figures, switches for controlling the electrical potential of each tuning conductor have not been illustrated.

Although a 3×3 array of tunable patch antennas is shown, more or fewer patch antennas and/or different implementations of patch antennas can be included in an array. Furthermore, the teachings herein are applicable to tunable antenna systems using different antenna types.

Including multiple antennas in an array can provide a number of advantages. For example, an array of antennas can be operable to provide multiple-input and multiple-output (MIMO) and/or beam forming communications.

Additional details of the tunable patch antenna array 280 can be as described earlier.

Figure 6E:
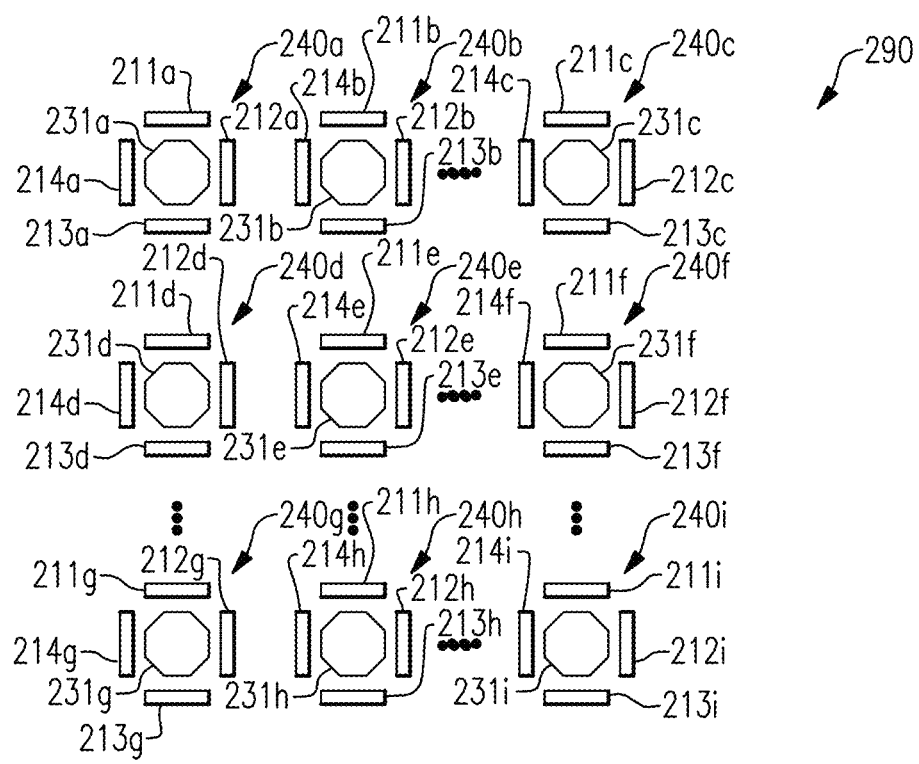
FIG. 6E is a schematic diagram of a tunable patch antenna array according to another embodiment.

FIG. 6E is a schematic diagram of a tunable patch antenna array 290 according to another embodiment. The tunable patch antenna array 290 includes an array of tunable patch antennas 240a-240i, each of which can be implemented as described with respect to FIG. 6B. For clarity of the figures, switches for controlling the electrical potential of each tuning have not been illustrated.

Although a 3×3 array of tunable patch antennas is shown, more or fewer patch antennas and/or different implementations of patch antennas can be included in an array. Furthermore, the teachings herein are applicable to tunable antenna systems using different types of antennas.

Additional details of the tunable patch antenna array 290 can be as described earlier.

Figure 7A:
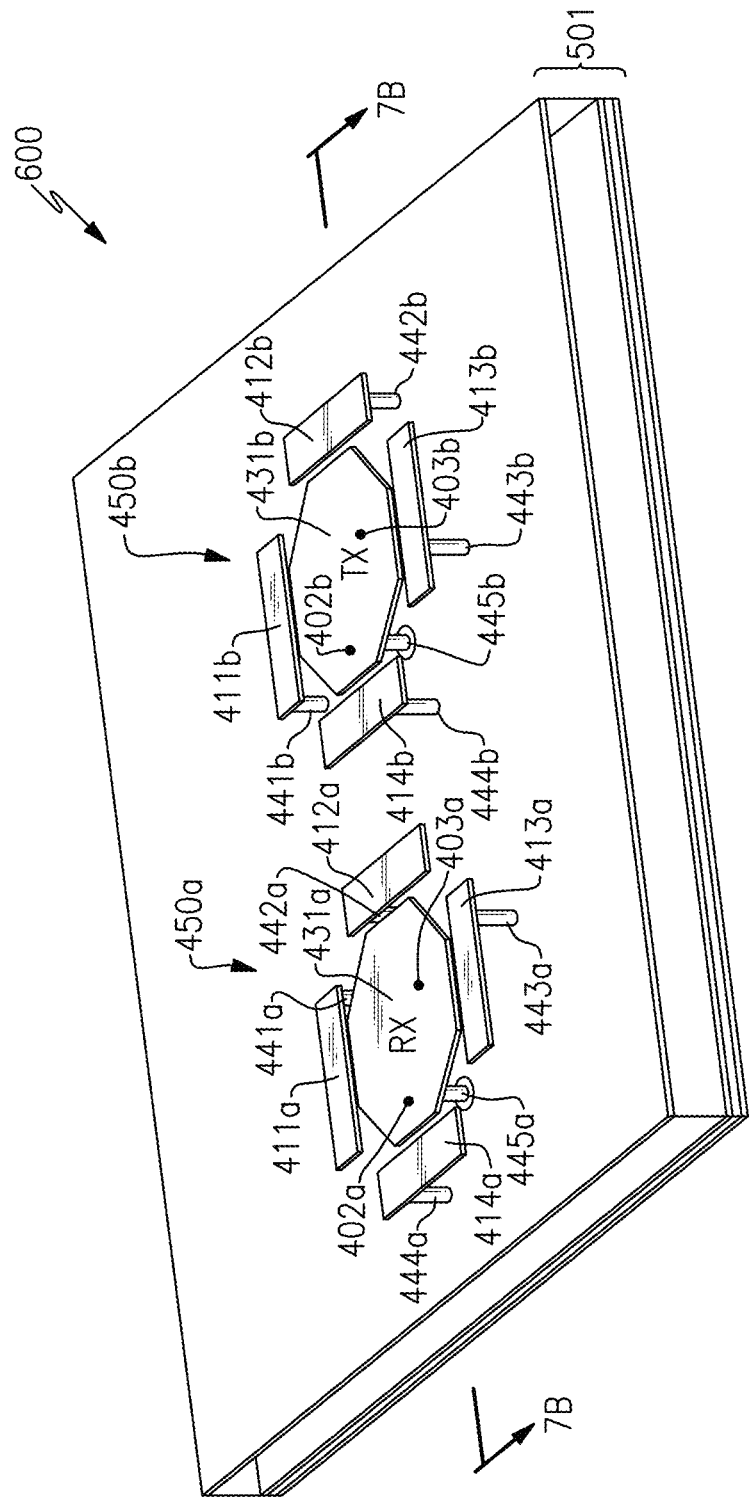
FIG. 7A is a perspective view of an RF module according to one embodiment.
Figure 7B:
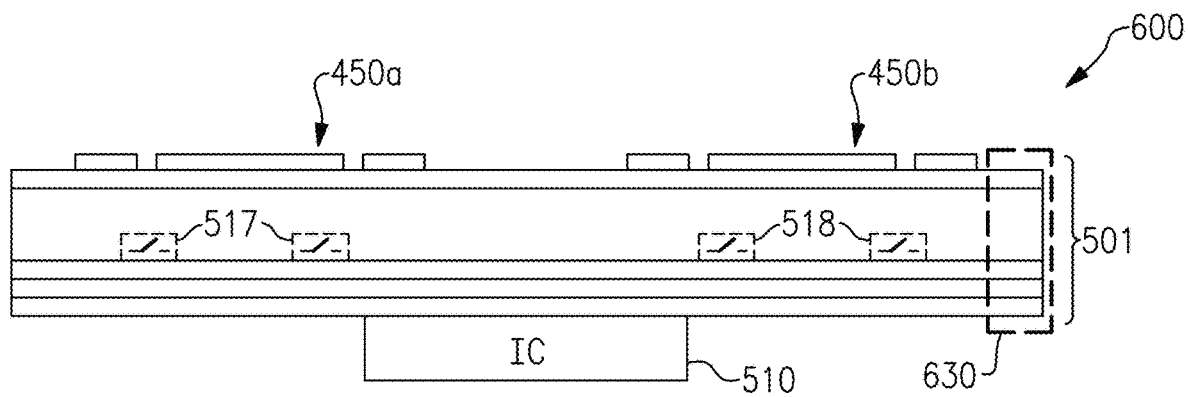
FIG. 7B is a cross-section of the RF module of FIG. 7A taken along the line 7B-7B.
Figure 7B:
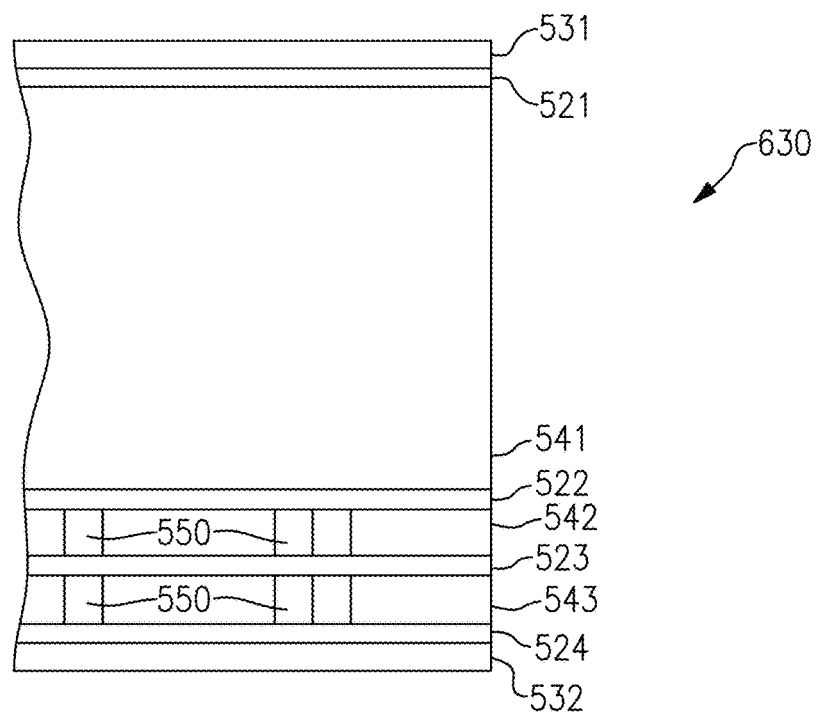

FIG. 7A is a perspective view of an RF module 600 according to another embodiment. FIG. 7B is a cross-section of the RF module 600 of FIG. 7A. The RF module 600 includes a laminated substrate or laminate 501, a first tunable patch antenna 450a, a second tunable patch antenna 450b, and a semiconductor die or IC 510 (not visible in FIG. 7A).

Although not shown in FIGS. 7A and 7B, the RF module 600 can include additional structures and components that have been omitted from the figures for clarity. Additionally, certain layers have been depicted transparently so that certain components, such as vias, are visible.

The first tunable patch antenna 450a includes a patch antenna element 431a, a signal feed 402a, a ground feed 403a, tuning conductors 411a, 412a, 413a, 414a, vias 441a, 442a, 443a, 444a, 445a, and switches 517 (not visible in FIG. 7A). Additionally, the second tunable patch antenna 450b includes a patch antenna element 431b, a signal feed 402b, a ground feed 403b, tuning conductors 411b, 412b, 413b, 414b, vias 441b, 442b, 443b, 444b, 445b, and switches 518 (not visible in FIG. 7A).

In certain implementations, the patch antenna element 431a serves as a receive (RX) antenna that receives radio waves, and the patch antenna element 431b is implemented as a transmit (TX) antenna that transmits radio waves. However, other implementations are possible.

With reference to FIGS. 7A-7B, the switches 517 of the first tunable patch antenna 450a are integrated on an internal layer of the laminate 501, in this embodiment. Additionally, the switches 517 selectively provide ground to the tuning conductors 411a, 412a, 413a, and 414a by way of the vias 441a, 442a, 443a, and 444a, respectively. Similarly, the switches 518 of the second tunable patch antenna 450b are integrated internally in the laminate 501, and selectively provide ground to the tuning conductors 411b, 412b, 413b, and 414b, by way of the vias 441b, 442b, 443b, and 444b, respectively. Although four of the switches are visible in the cross-section of FIG. 7B, any suitable number of switches can be included. For example, the RF module 600 can include a switch for each of the tuning conductors.

By including the switches 517, 518 internal to the laminate 501, conductive route lengths can be reduced, thereby enhancing performance and alleviating routing congestion. However, other implementations are possible.

For example, in another embodiment, switches are implemented as surface mount components and/or on a semiconductor die, such as the IC 510 or another die.

In the illustrated embodiment, the patch antenna elements and tuning conductors are on a first side of the laminate 501, and the IC 510 is on a second side of the laminate 501 opposite the first side. Although the IC 510 is on the second side of the laminate 501 in this embodiment, other implementations are possible. For example, in another embodiment the IC 510 is embedded in an internal layer of the laminate 501.

In certain implementations, the IC 510 includes a transceiver, a front end, and/or other circuitry of a communications device, and thus can serve as a radio of a communications device. Although an implementation with one semiconductor chip is shown, the teachings herein are applicable to RF modules with additional chips or without chips.

In certain implementations, the IC 510 generates control signals for controlling a state of the switches 517, 518. In one embodiment, the IC 510 includes an interface, such as a Mobile Industry Processor Interface (MIPI) Radio Frequency Front End (RFFE) bus, an inter-integrated circuit ($I^2C$) bus, and/or a general-purpose input/output (GPIO) bus that receives data for controlling the switch state.

As shown in FIG. 7B, a portion 630 of the laminate 501 is schematically depicted in further detail. The laminate portion 630 corresponds to a right-edge of the laminate 501. In the illustrated embodiment, the laminate portion 630 includes a first conductive layer 521, a second conductive layer 522, a third conductive layer 523, a fourth conductive layer 524, a first solder mask 531, a second solder mask 532, a first dielectric layer 541, a second dielectric layer 542, a third dielectric layer 543, and vias 550.

Although an example with four conductive layers and three non-conductive layers is shown, other numbers of layers can be used.

In certain implementations, patch antenna elements and tuning conductors are patterned in the first conductive layer 521, and the second conductive layer 522 serves as a ground plane to the patch antenna elements. However, other implementations are possible.

The laminate 501 can be implemented with layers of various thicknesses. In one specific example, the solder masks are each 20 μm thick, the conductive layers are each 15 μm thick, the first dielectric layer is 300 μm thick, and the second and third dielectric layers are each 15 μm thick. Although one specific example of layer thicknesses has been provided, a laminate can be implemented in a wide variety of ways. For example, the number of, composition of, and/or thicknesses of laminate layers can vary widely based on implementation and/or application.

Figure 8A:
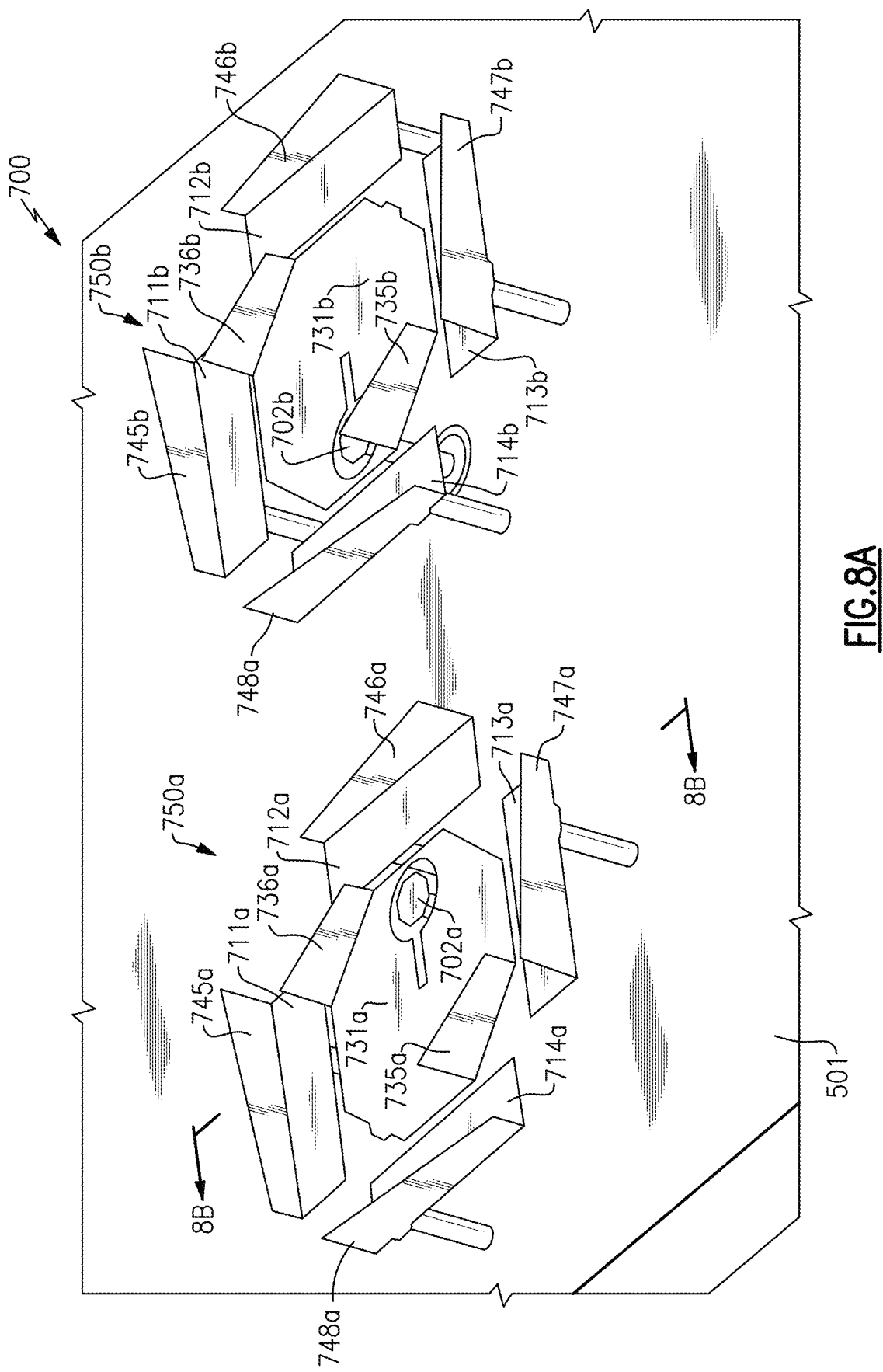
FIG. 8A is a perspective view of an RF module according to another embodiment.
Figure 8B:
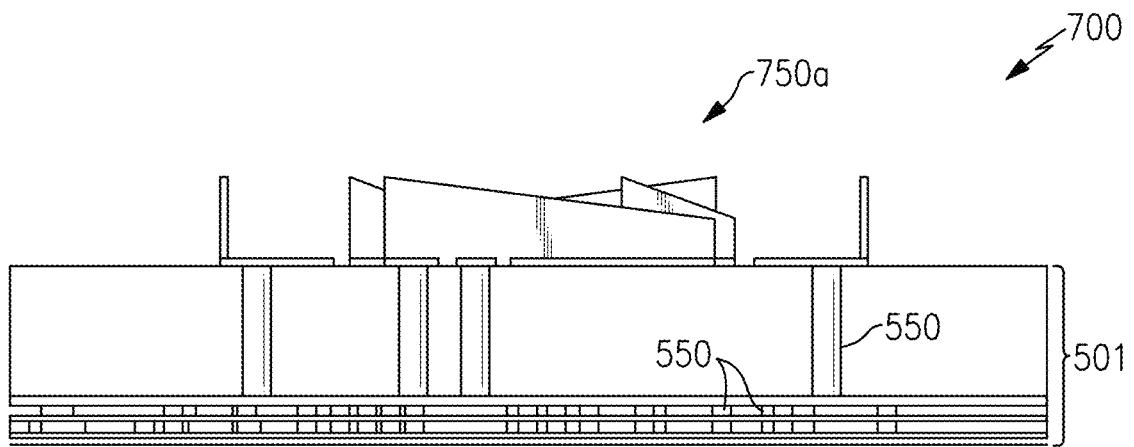
FIG. 8B is a cross-section of the RF module of FIG. 8A taken along the line 8B-8B.

FIG. 8A is a perspective view of an RF module 700 according to another embodiment. FIG. 8B is a cross-section of the RF module 700 of FIG. 8A taken along the line 8B-8B.

The RF module 700 includes a laminate 501, a first tunable antenna 750a, and a second tunable antenna 750b. The first tunable antenna 750a includes a three-dimensional antenna element 731a including fins 735a, 736a protruding therefrom, and three-dimensional tuning conductors 711a, 712a, 713a, and 714a including fins 745a, 746a, 747a, and 748a, respectively. Additionally, the second tunable antenna 750b includes a three-dimensional antenna element 731b including fins 735b, 736b protruding therefrom, and three-dimensional tuning conductors 711b, 712b, 713b, and 714b including fins 745b, 746b, 747b, and 748b, respectively. Switches have been omitted from FIGS. 8A and 8B for clarity of the figures.

Although not shown in FIGS. 8A and 8B, the RF module 700 can include additional structures and components that have been omitted from the figures for clarity. Additionally, certain layers have been depicted transparently so that certain components, such as vias, are visible.

The RF module 700 illustrates one implementation using three-dimensional antenna elements and three-dimensional tuning conductors. The teachings herein are applicable to antenna elements and tuning conductors implemented in a wide variety of ways.

In the illustrated embodiment, a signal feed 702a is implemented as a center conductor that is capacitively coupled to the three-dimensional antenna element 731a to thereby feed the three-dimensional antenna element 731a. Additionally, a slot has been included in the three-dimensional antenna element 731a adjacent to the signal feed 702a. Similarly, a signal feed 702b is implemented as a center conductor that is capacitively coupled to the three-dimensional antenna element 731b. The slots in the antenna elements aid in controlling input impedance looking into the antenna elements from the signal feeds.

Figure 9:
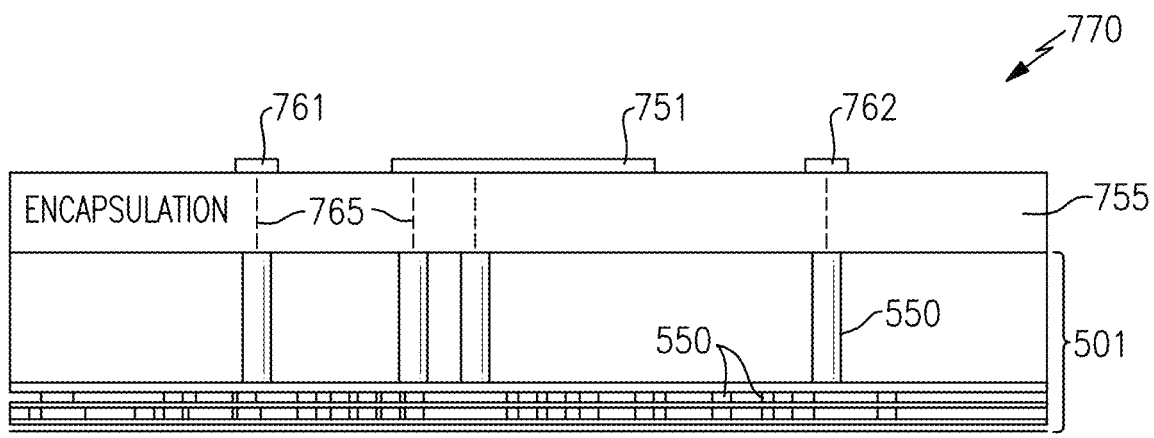
FIG. 9 is a cross-section of an RF module according to another embodiment.

FIG. 9 is a cross-section of an RF module 770 according to another embodiment. The RF module 770 includes a laminate 501, encapsulation or molding 755 formed over a first side of the laminate 501, an antenna element 751 formed over the encapsulation 755 on the first side of the laminate 510, and tuning conductors 761, 762 formed over the encapsulation 755 on the first side of the laminate 510.

As shown in FIG. 9, electrical connections 765 are included in the encapsulation 755 to connect the antenna element 751 and tuning conductors 761, 762 to conductors of the laminate 501.

The RF module 770 illustrates another example of an RF module in accordance with the teachings herein.

Figure 10A:
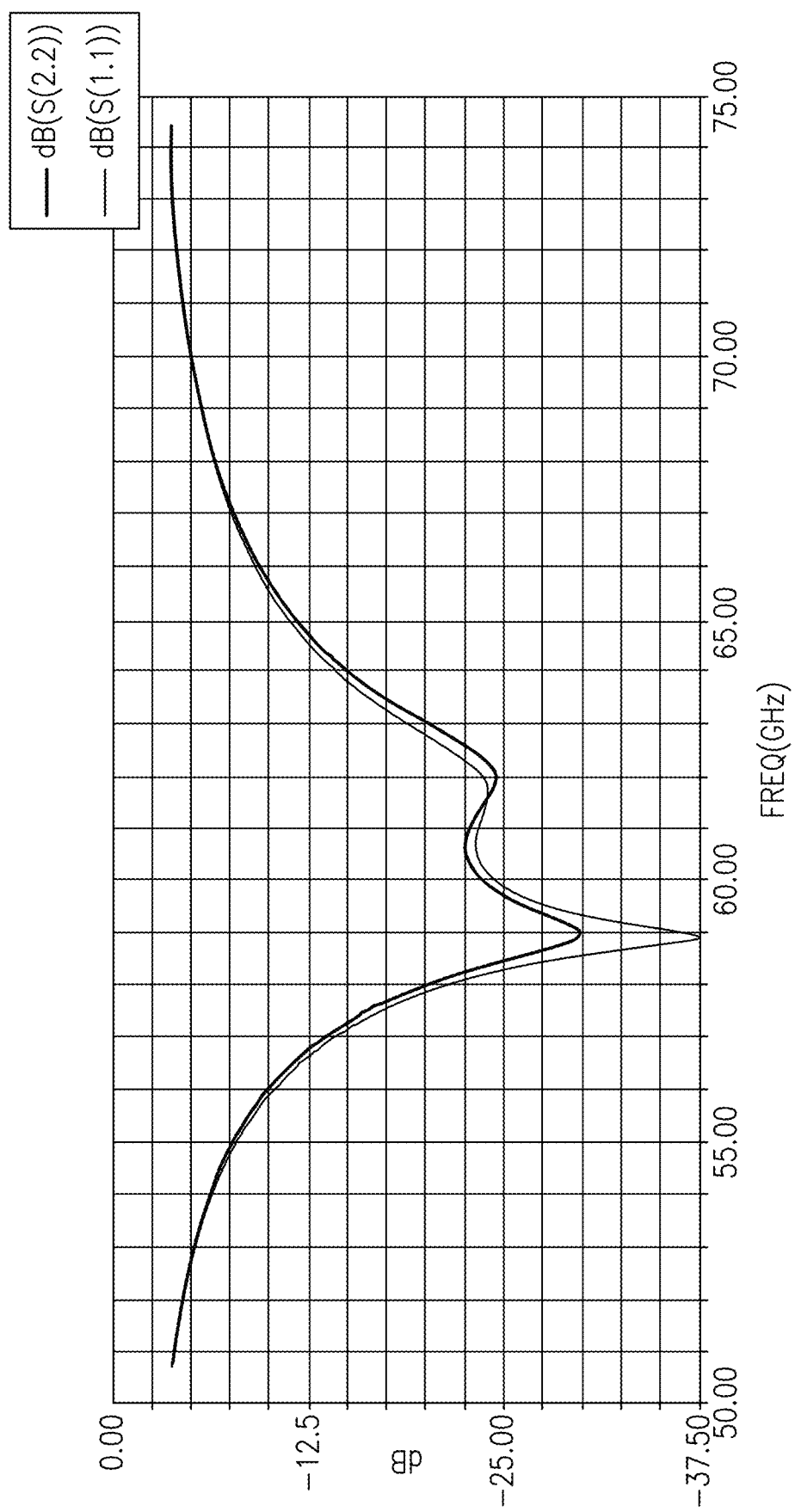

FIGS. 10A-10C show graphs of antenna characteristics of an RF module according to one embodiment. The graphs correspond to antenna characteristics of one implementation of the RF module 600 of FIGS. 7A-7B, in which all tuning conductors are grounded. Although specific simulation results are shown, results can vary based on a wide variety of factors, such as antenna implementation and simulation model. Accordingly, other results are possible.

FIG. 10A is a graph of dual resonance return loss (S11 and S22), plotted for both the tunable patch antenna 450a and the tunable patch antenna 450b for the implementation described above.

FIG. 10B is a graph of axial ratio of the tunable patch antenna 450a for different angle sweeps for the implementation described above. The graph of axial rotation includes plots for different value of an angle θ and an angle ϕ, corresponding to angles of a spherical coordinate system. For example, θ corresponds to polar angle with respect to a z-axis and ϕ to an azimuthal angle, where the antenna element resides in the x-y plane.

An antenna's axial ratio can be an important performance specification. For example, a tunable patch antenna can be specified to operate with an axial ratio of below about 3 dB, which aids in ensuring that both antenna polarizations are at the antenna's beam width. The plots indicate that both antenna polarizations coincide with one another, which indicates that signal communication can be performed with both polarizations.

FIG. 10C is a graph of gain of the tunable patch antenna 450a versus frequency for the implementation described above.

Figure 11A:
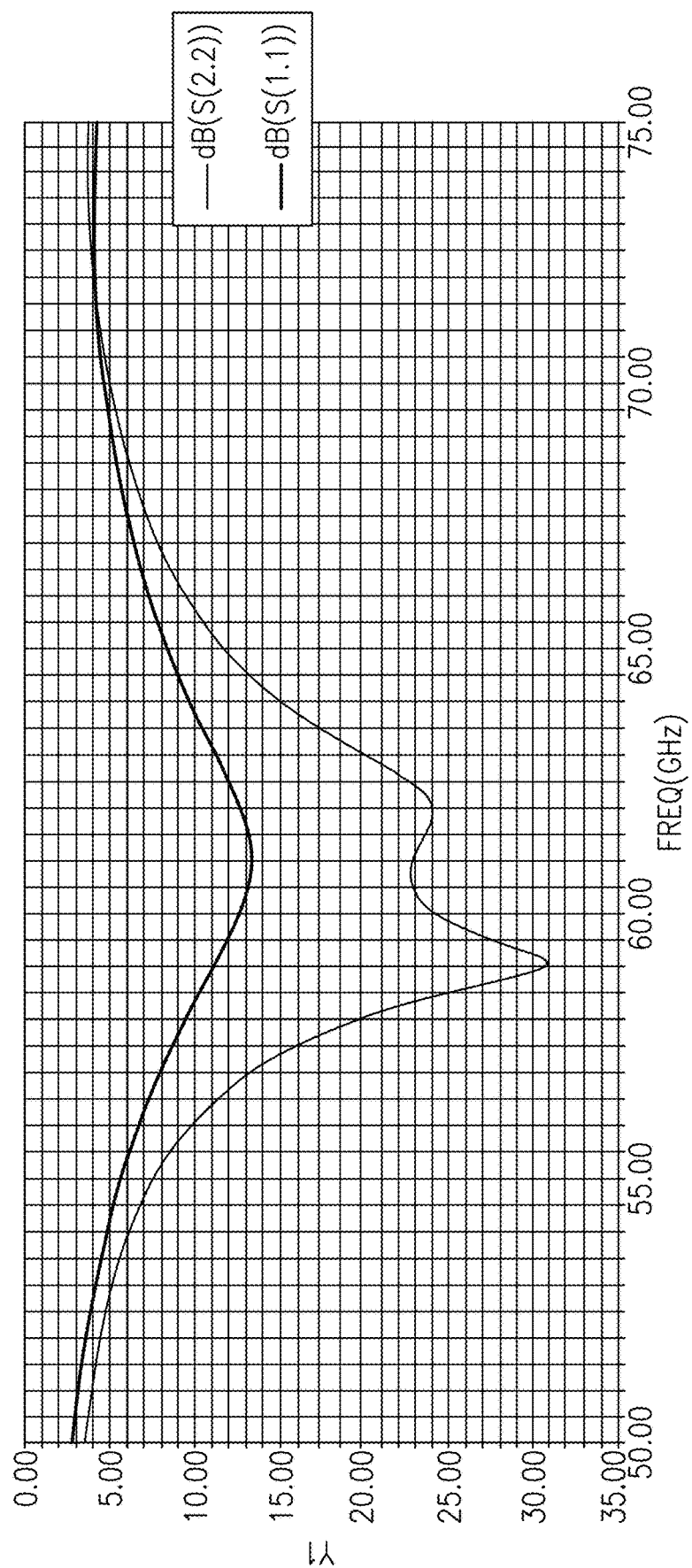
FIGS. 11A-11C show graphs of antenna characteristics of an RF module according to another embodiment.
Figure 11B:
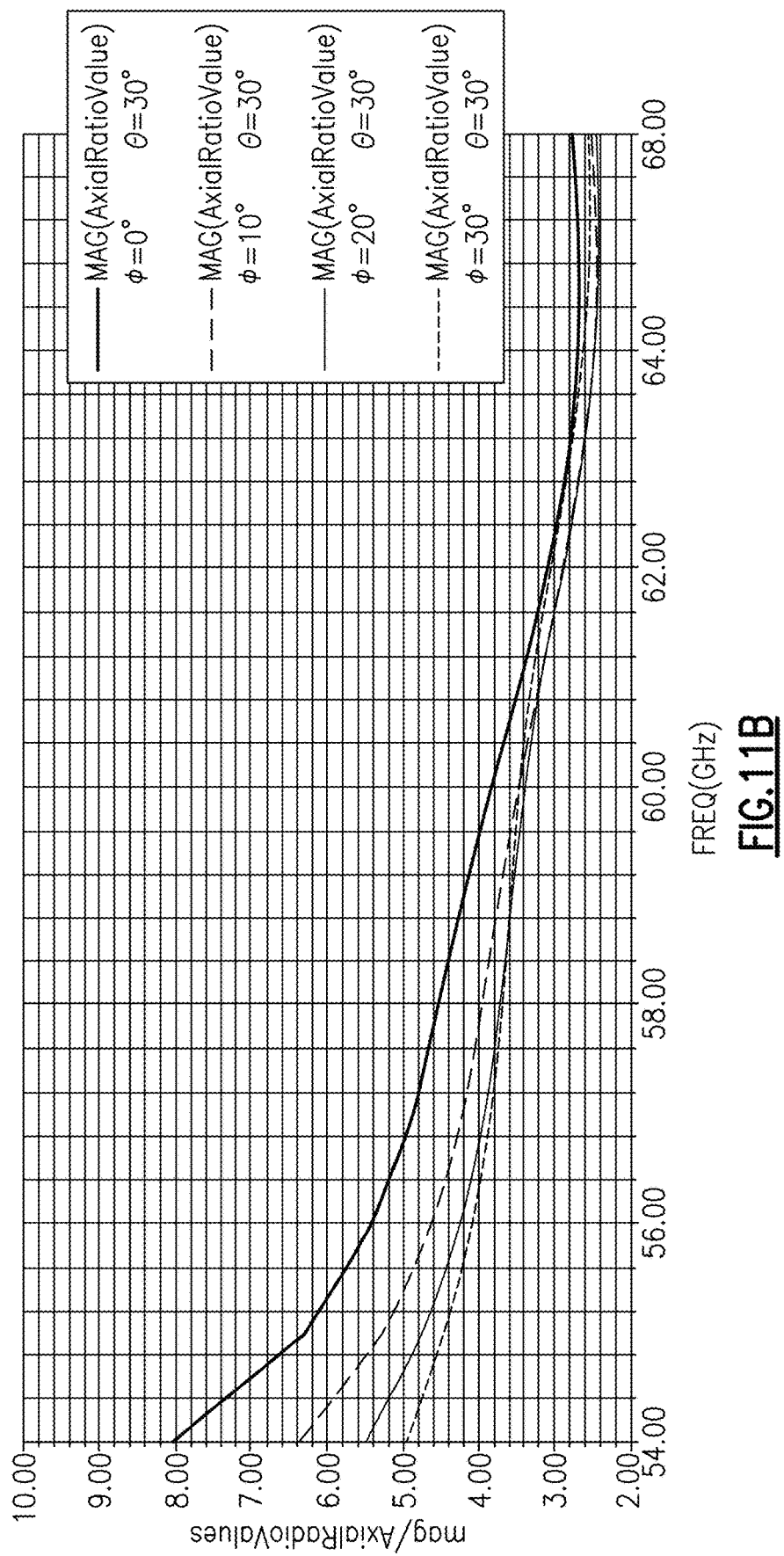
Figure 11C:
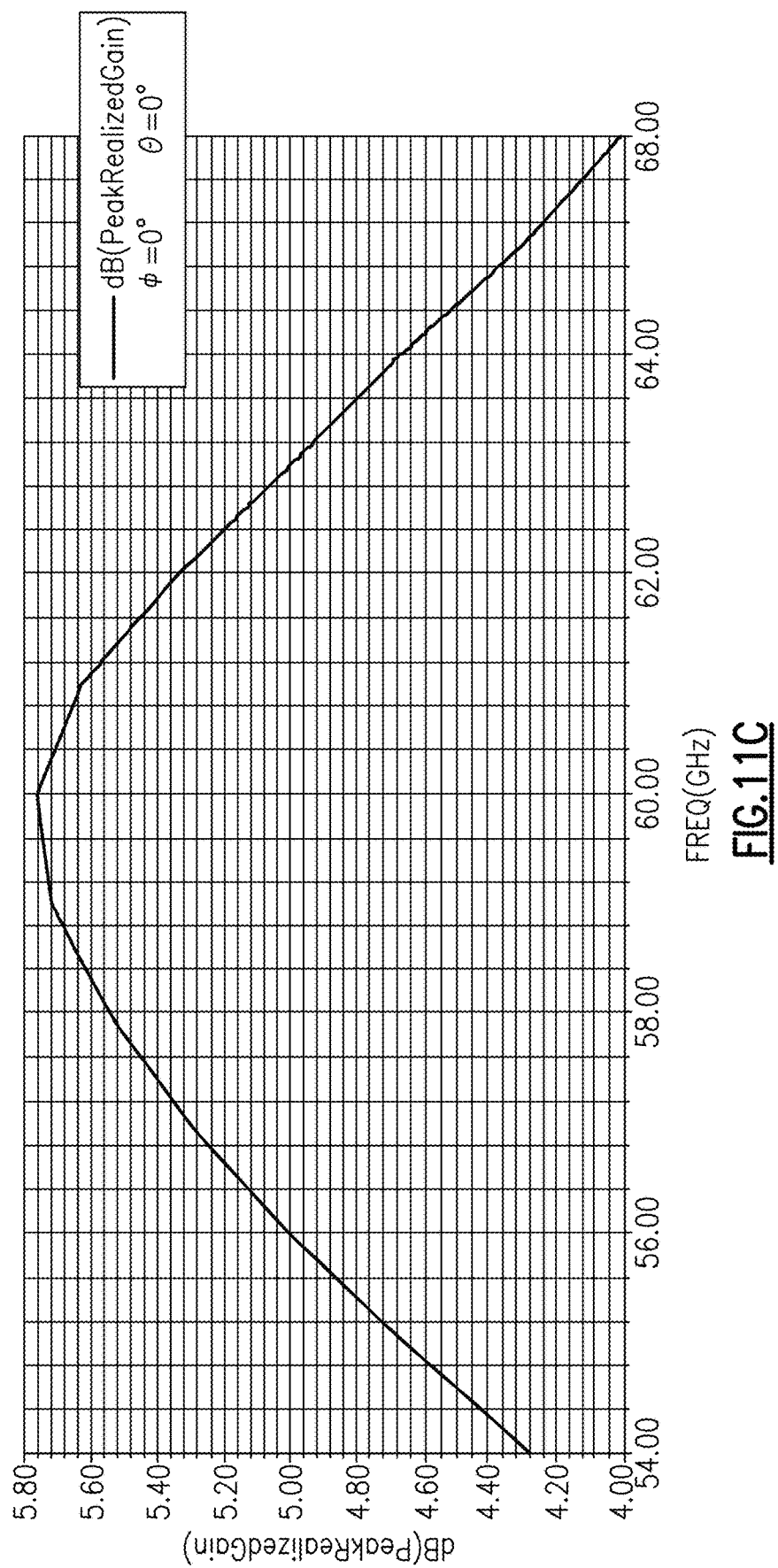

FIGS. 11A-11C show graphs of antenna characteristics of an RF module according to another embodiment. The graphs correspond to antenna characteristics of one implementation of the RF module 600 of FIGS. 7A-7B, in which the ground feed 403a is electrically floating, and in which the ground feed 403b and tuning conductors 411a, 411b, 412a, 412b, 413a, 413b, 414a, and 414b are grounded. Although specific simulation results are shown, results can vary based on a wide variety of factors, such as antenna implementation and simulation model. Accordingly, other results are possible.

FIG. 11A is a graph of dual resonance return loss (S11 and S22), plotted for both tunable patch antenna 450a and tunable patch antenna 450b for the implementation described above.

FIG. 11B is a graph of axial ratio of the tunable patch antenna 450a for different angle sweeps for the implementation described above. The plots indicate that the antennas provide an excellent radiation pattern in the 61 GHz to 68 GHz range. Additionally, by comparing FIG. 10B and FIG. 11B, it can be seen that decoupling the ground feed of the patch antenna changes the radiation pattern.

FIG. 11C is a graph of gain of the tunable patch antenna 450a versus frequency for the implementation described above.

FIGS. 12A-12E show graphs of antenna characteristics of an RF module according to another embodiment. The graphs correspond to antenna characteristics of one implementation of the RF module 600 of FIGS. 7A-7B, in which the fourth tuning conductor 414a of the tunable patch antenna 450a is electrically floating, and in which the ground feeds 403a, 403b and tuning conductors 411a, 411b, 412a, 412b, 413a, 413b, and 414b are grounded. Although specific simulation results are shown, results can vary based on a wide variety of factors, such as antenna implementation and simulation model. Accordingly, other results are possible.

Figure 12A:
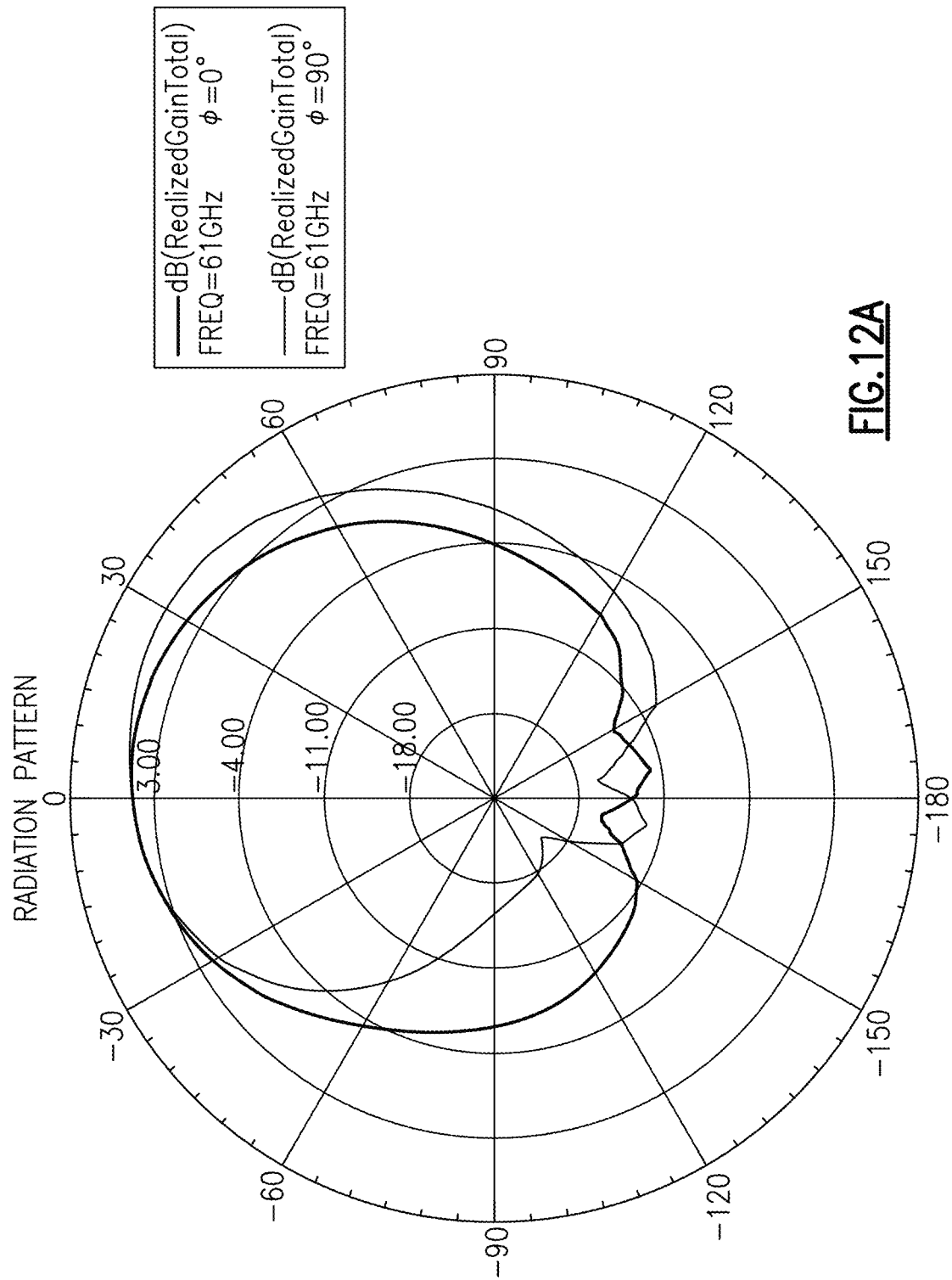
FIGS. 12A-12E show graphs of antenna characteristics of an RF module according to another embodiment.

FIG. 12A is a graph of radiation patterns for two polarizations of the first tunable patch antenna 450a for the implementation described above. An overlap of the two plots of the graph indicates that the polarizations exhibit a desired correlation.

Figure 12B:
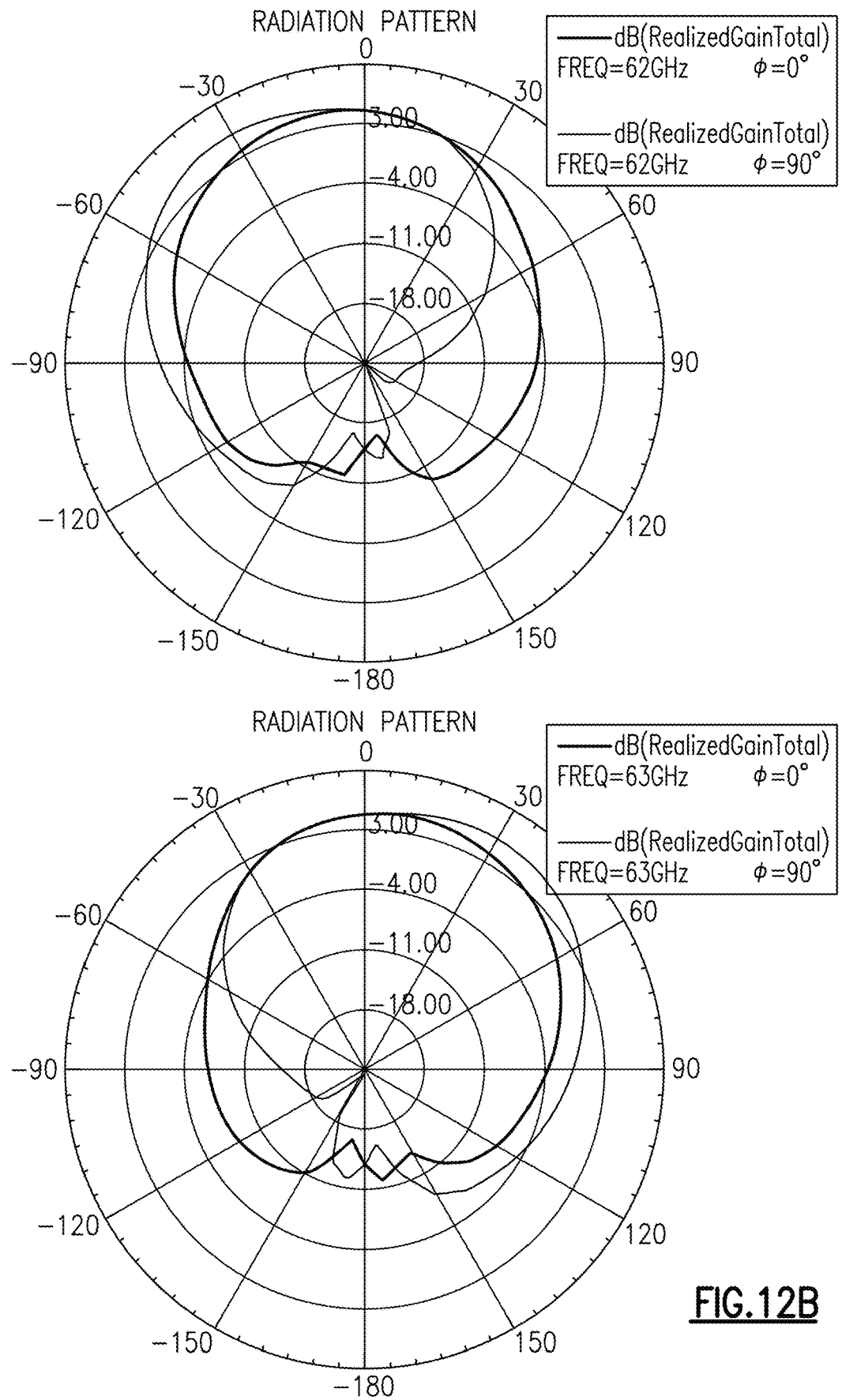

FIG. 12B is a graph of radiation patterns for two polarizations of the first tunable patch antenna 450a (depicted at bottom), and for the second tunable patch antenna 450b (depicted at top) for the implementation described above.

Figure 12C:
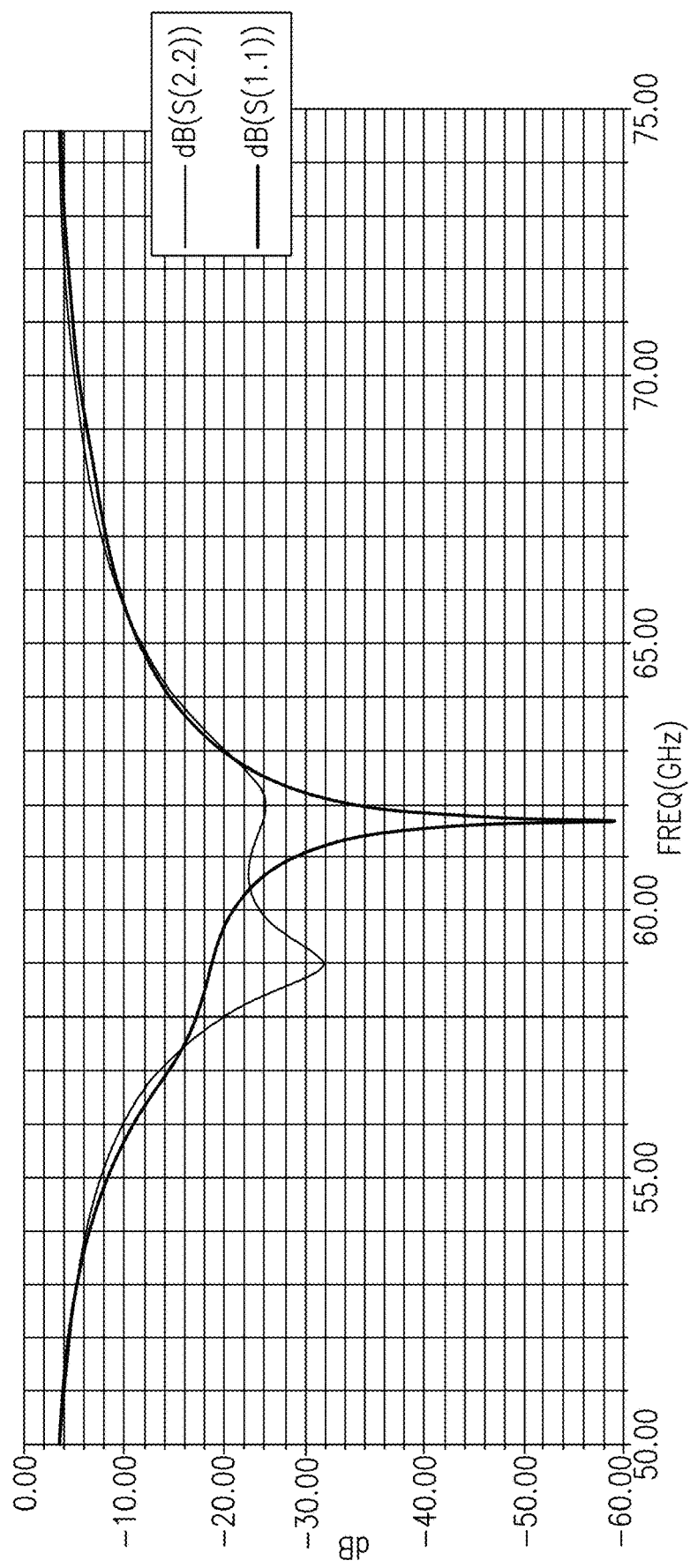

FIG. 12C is a graph of dual resonance return loss (S11 and S22), plotted for both the tunable patch antenna 450a and the tunable patch antenna 450b for the implementation described above.

Figure 12D:
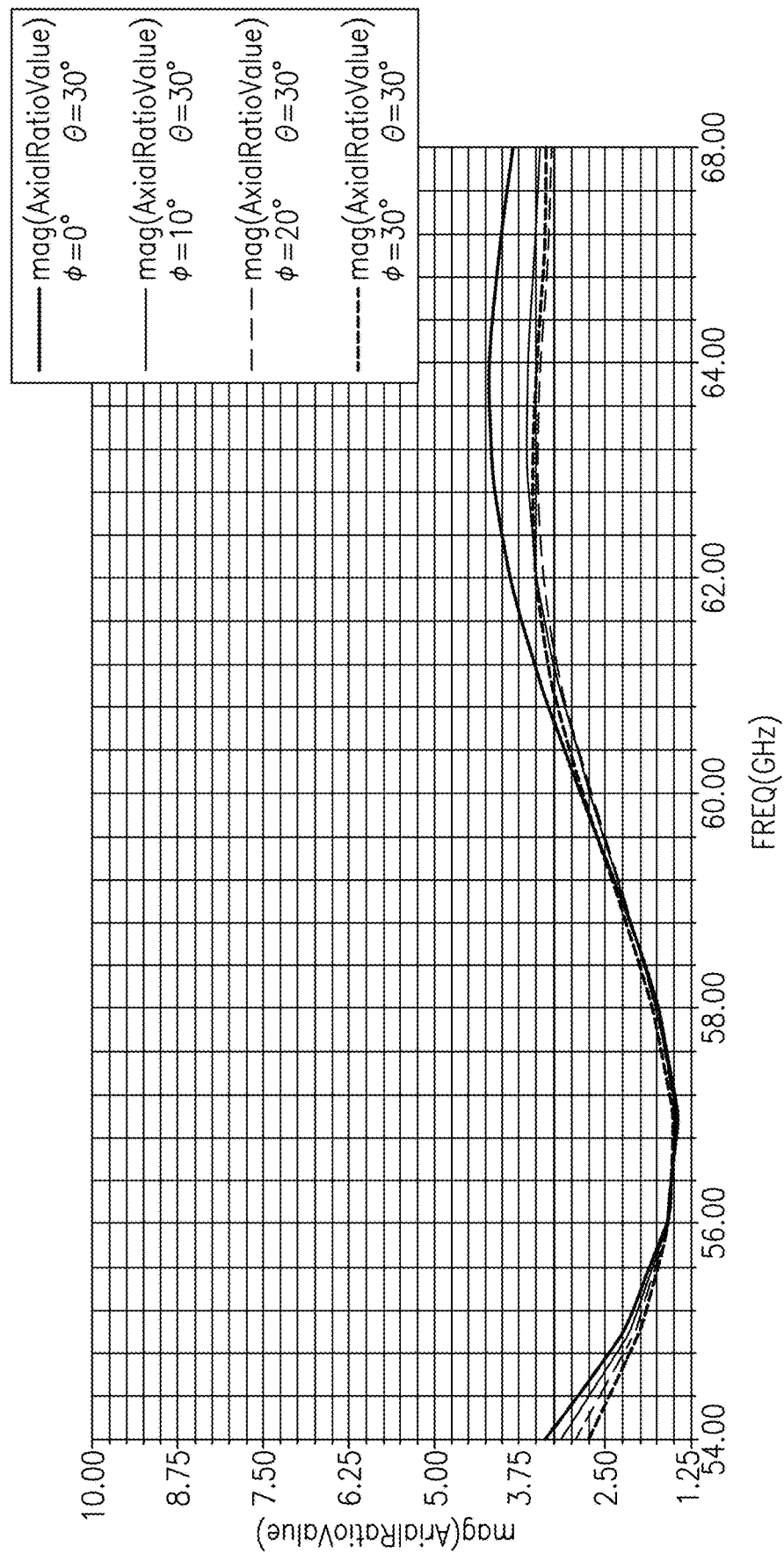

FIG. 12D is a graph of axial ratio of the tunable patch antenna 450a for different angle sweeps for the implementation described above.

Figure 12E:
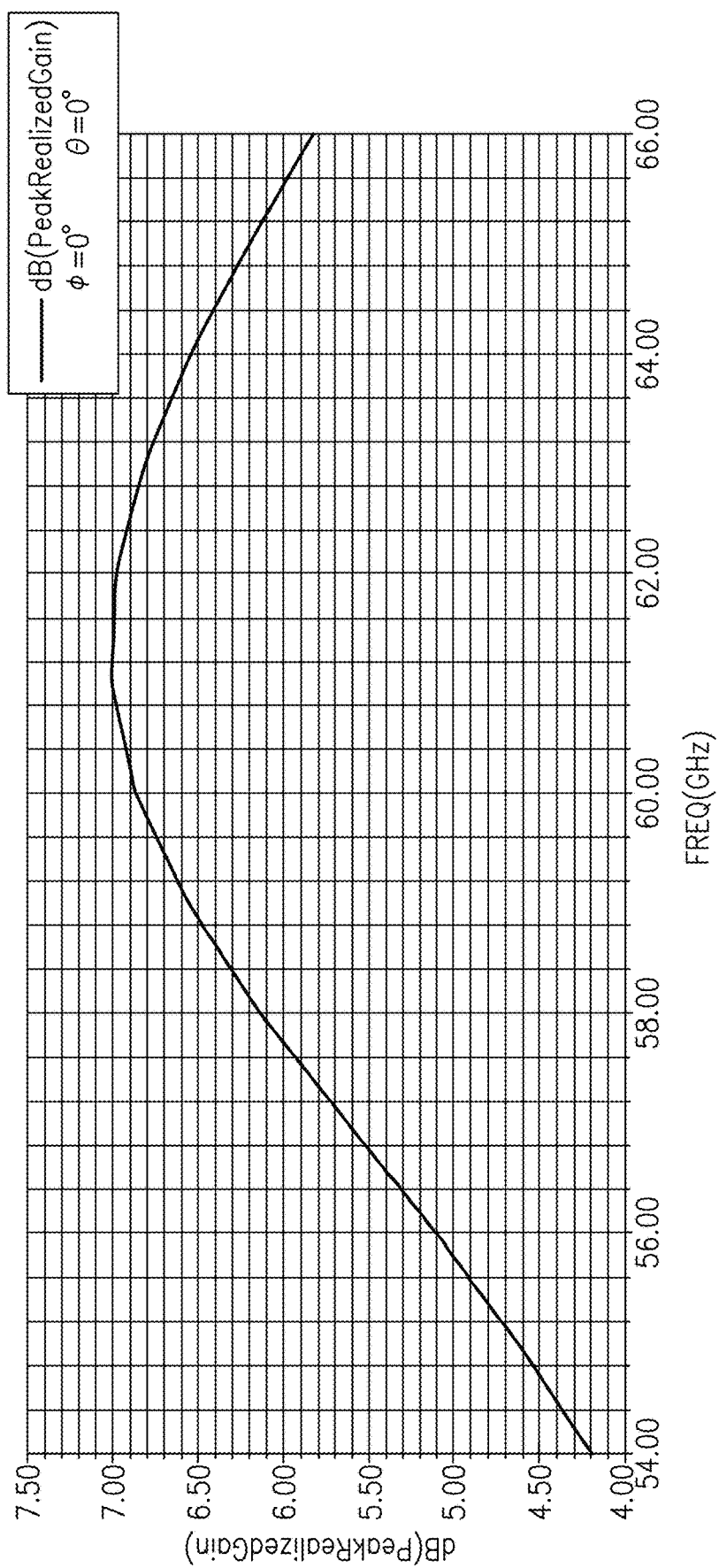

FIG. 12E is a graph of gain of the tunable patch antenna 450a versus frequency for the implementation described above.

FIGS. 13A-13D show graphs of antenna characteristics of an RF module according to another embodiment. The graphs correspond to antenna characteristics of one implementation of the RF module 600 of FIGS. 7A-7B, in which the second tuning conductor 412a of the tunable patch antenna 450a is electrically floating, and in which the ground feeds 403a, 403b and tuning conductors 411a, 411b, 412b, 413a, 413b, 414a, and 414b are grounded. Although specific simulation results are shown, results can vary based on a wide variety of factors, such as antenna implementation and simulation model. Accordingly, other results are possible.

Figure 13A:
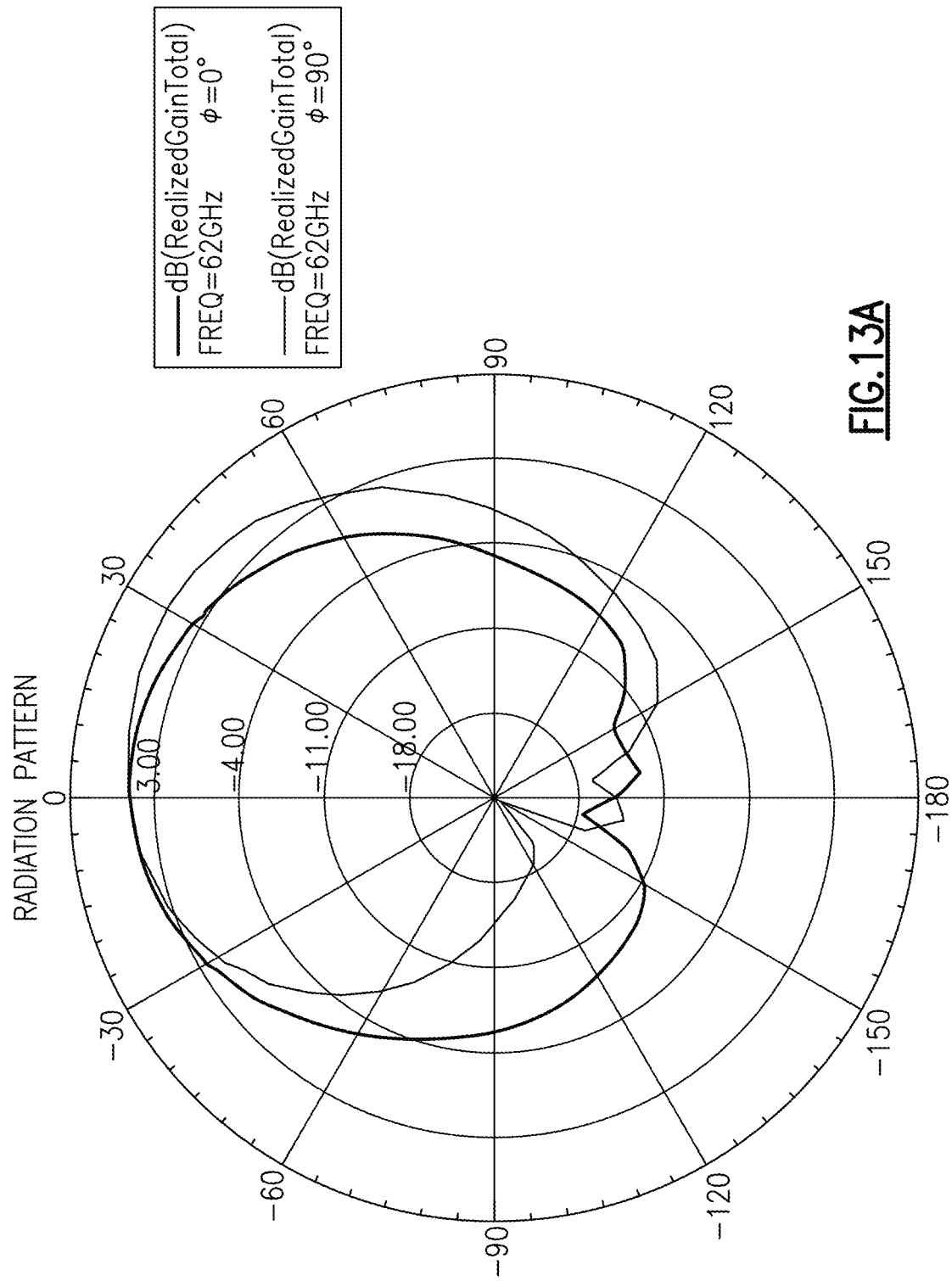
FIGS. 13A-13D show graphs of antenna characteristics of an RF module according to another embodiment.

FIG. 13A is a graph of radiation patterns for two polarizations of the first tunable patch antenna 450a for the implementation described above. An overlap of the two plots of the graph indicates that the polarizations exhibit a desired correlation.

Figure 13B:
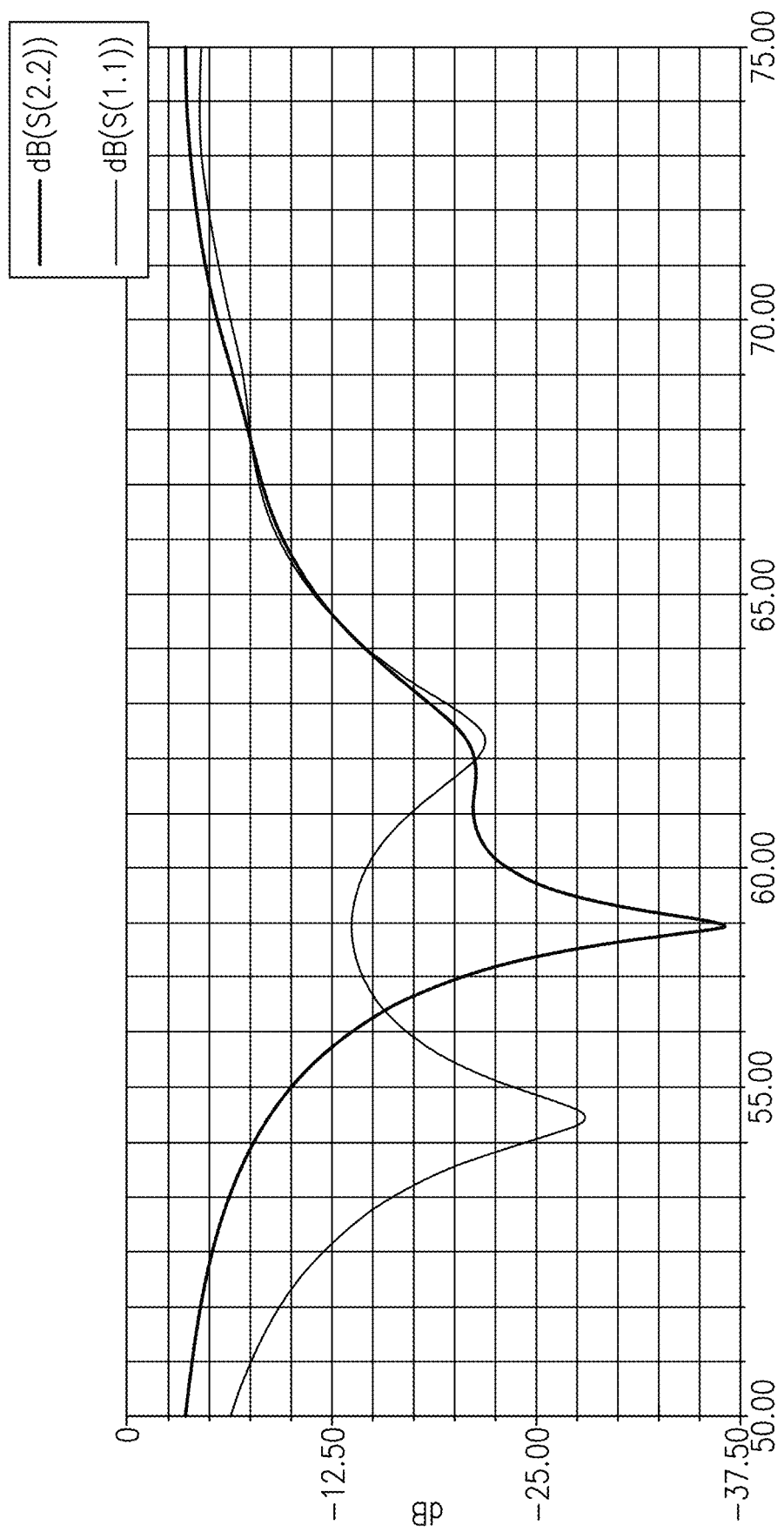

FIG. 13B is a graph of dual resonance return loss (S11 and S22), plotted for both the tunable patch antenna 450a and the tunable patch antenna 450b for the implementation described above.

Figure 13C:
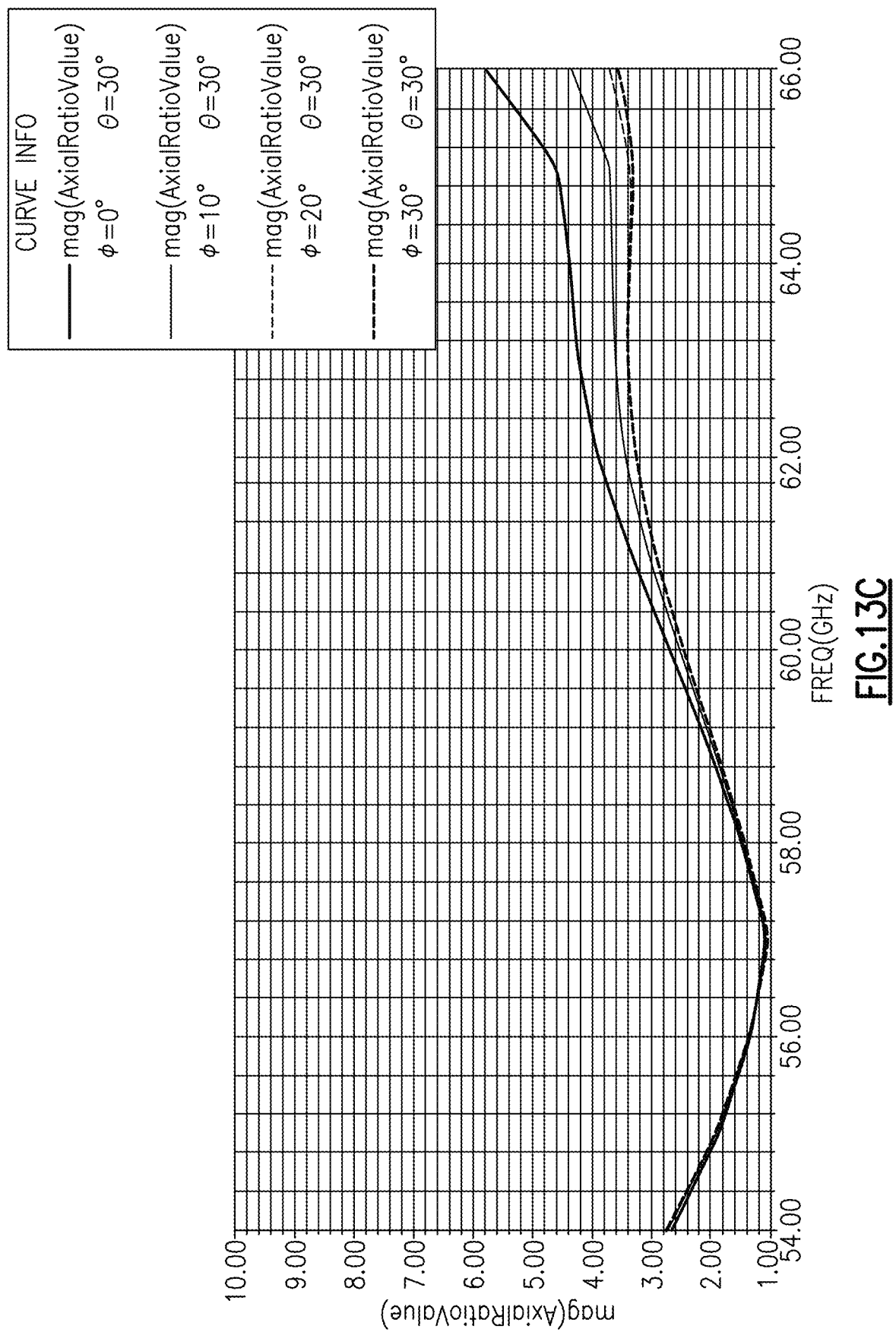

FIG. 13C is a graph of axial ratio of the tunable patch antenna 450a for different angle sweeps for the implementation described above.

Figure 13D:
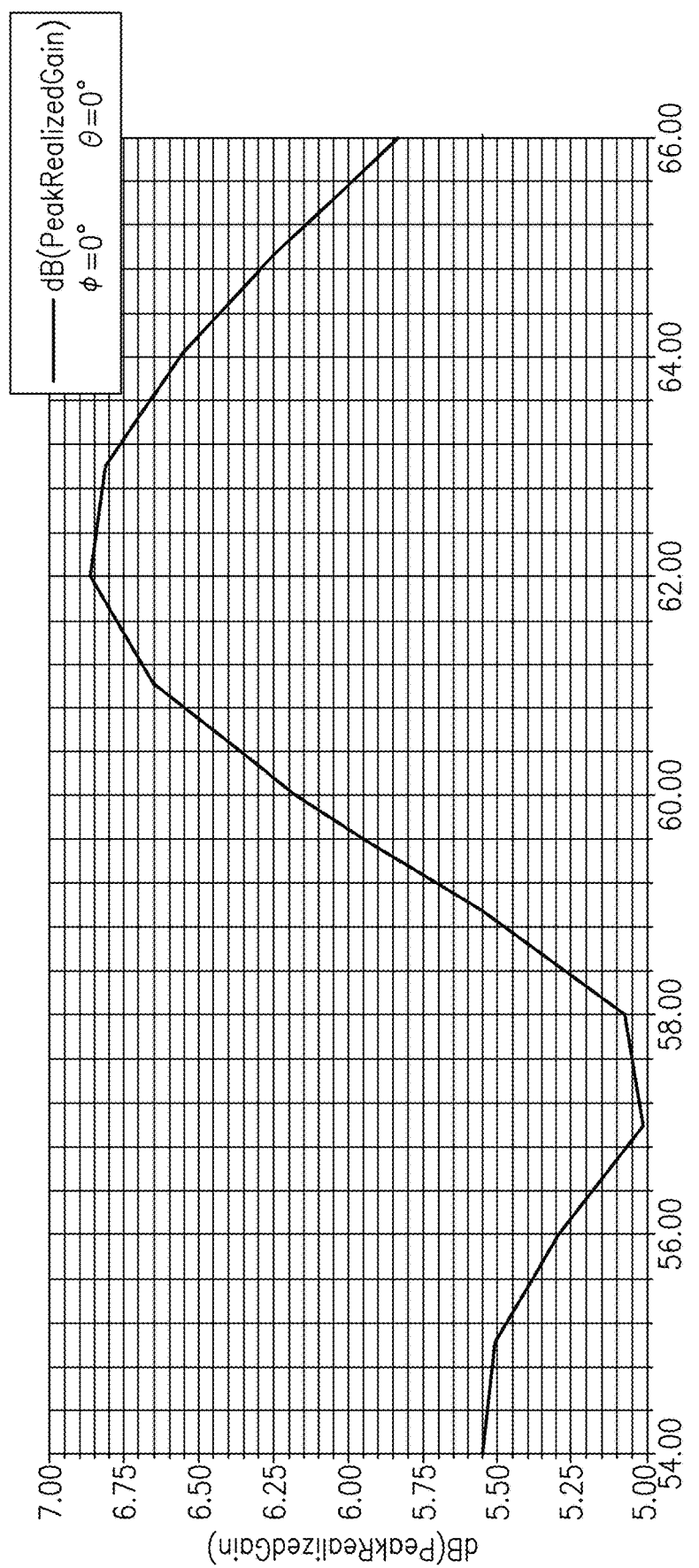

FIG. 13D is a graph of gain of the tunable patch antenna 450a versus frequency for the implementation described above.

FIGS. 14A-14D show graphs of antenna characteristics of an RF module according to another embodiment. The graphs correspond to antenna characteristics of one implementation of the RF module 600 of FIGS. 7A-7B, in which the first tuning conductor 411a and third tuning conductor 413a of the tunable patch antenna 450a are electrically floating, and in which the ground feeds 403a, 403b and tuning conductors 411b, 412a, 412b, 413b, 414a, and 414b are grounded. Although specific simulation results are shown, results can vary based on a wide variety of factors, such as antenna implementation and simulation model. Accordingly, other results are possible.

Figure 14A:
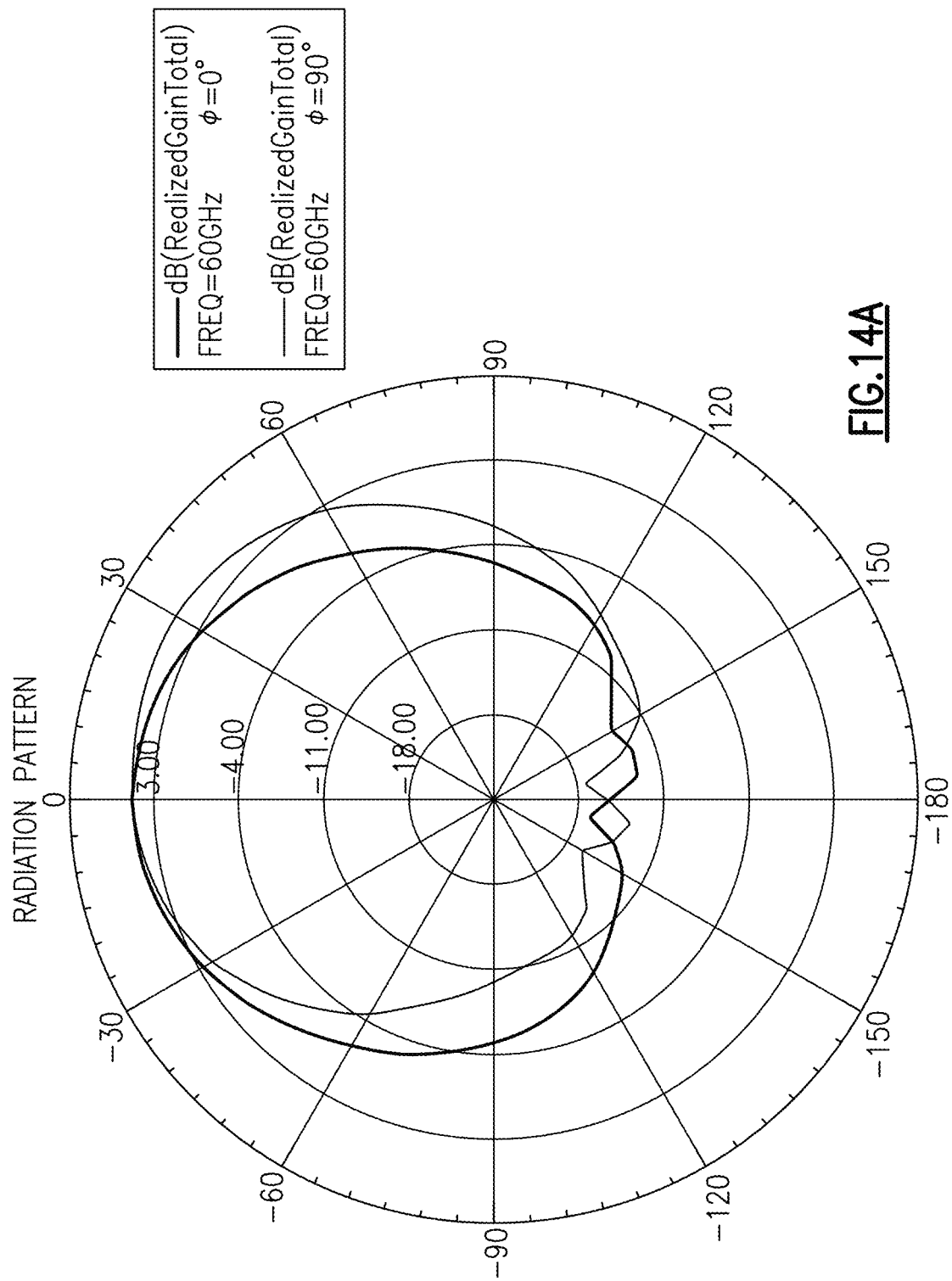
FIGS. 14A-14D show graphs of antenna characteristics of an RF module according to another embodiment.

FIG. 14A is a graph of radiation patterns for two polarizations of the tunable patch antenna 450a for the implementation described above. An overlap of the two plots of the graph indicates that the polarizations exhibit a desired correlation.

Figure 14B:
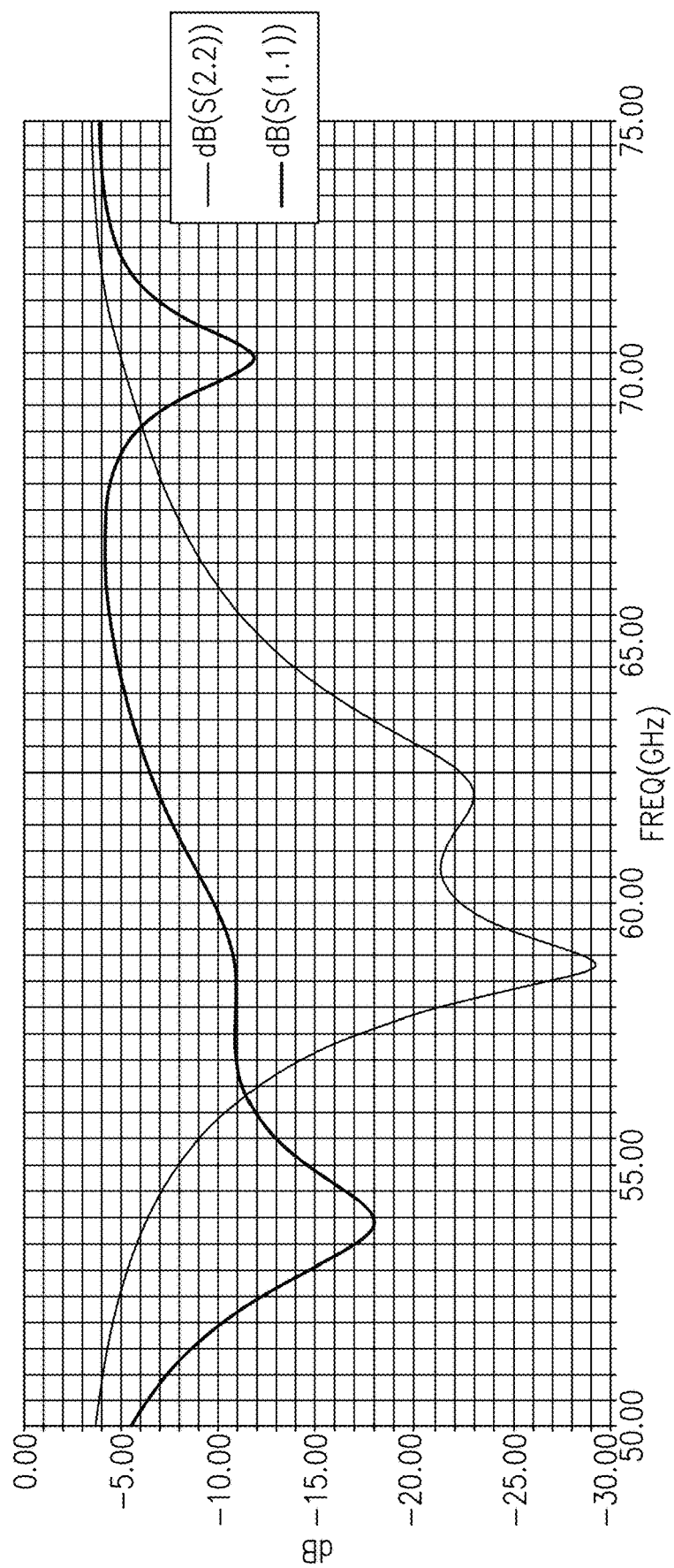

FIG. 14B is a graph of dual resonance return loss (S11 and S22), plotted for both the tunable patch antenna 450a and the tunable patch antenna 450b for the implementation described above.

Figure 14C:
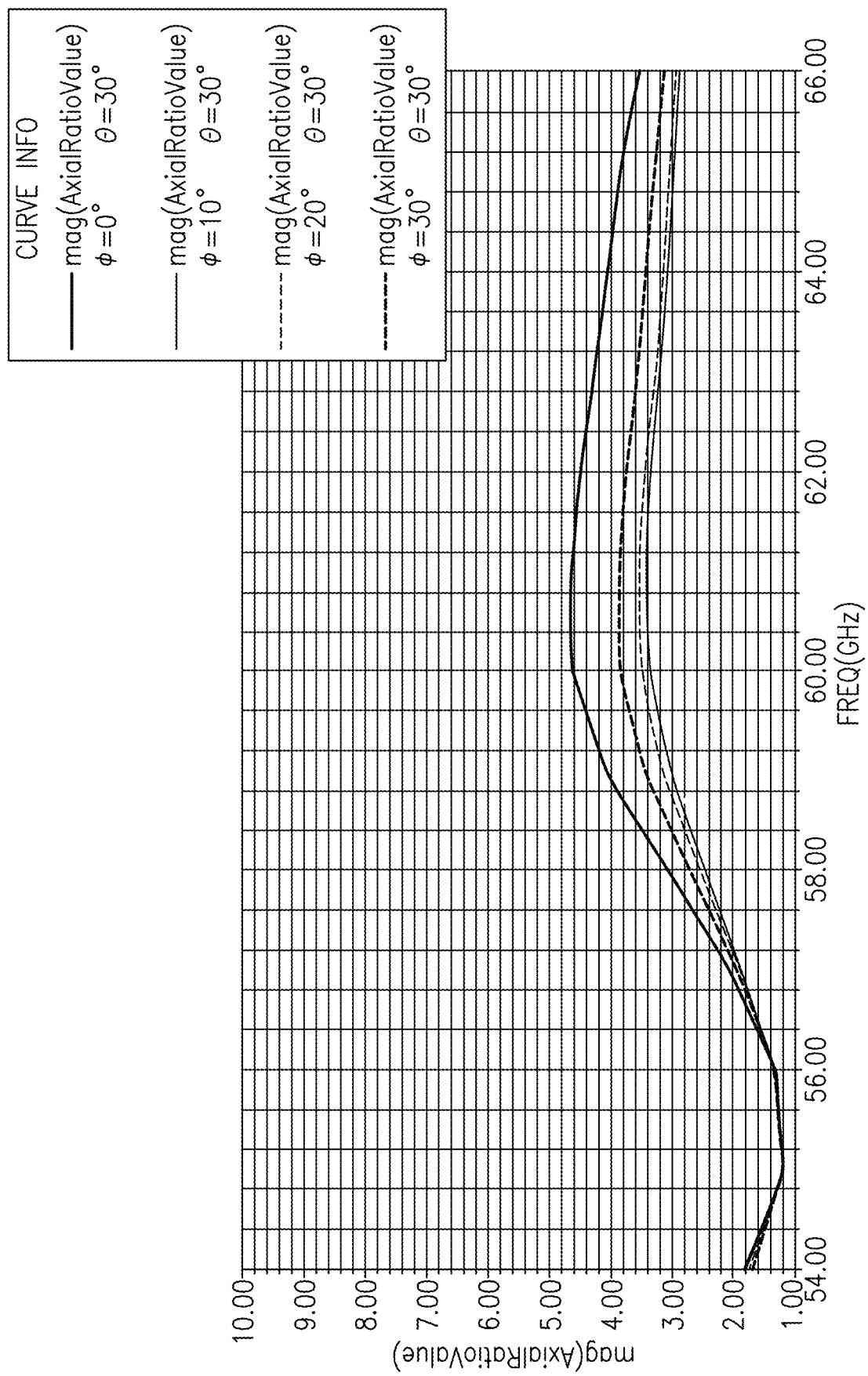

FIG. 14C is a graph of axial ratio of the tunable patch antenna 450a for different angle sweeps for the implementation described above.

Figure 14D:
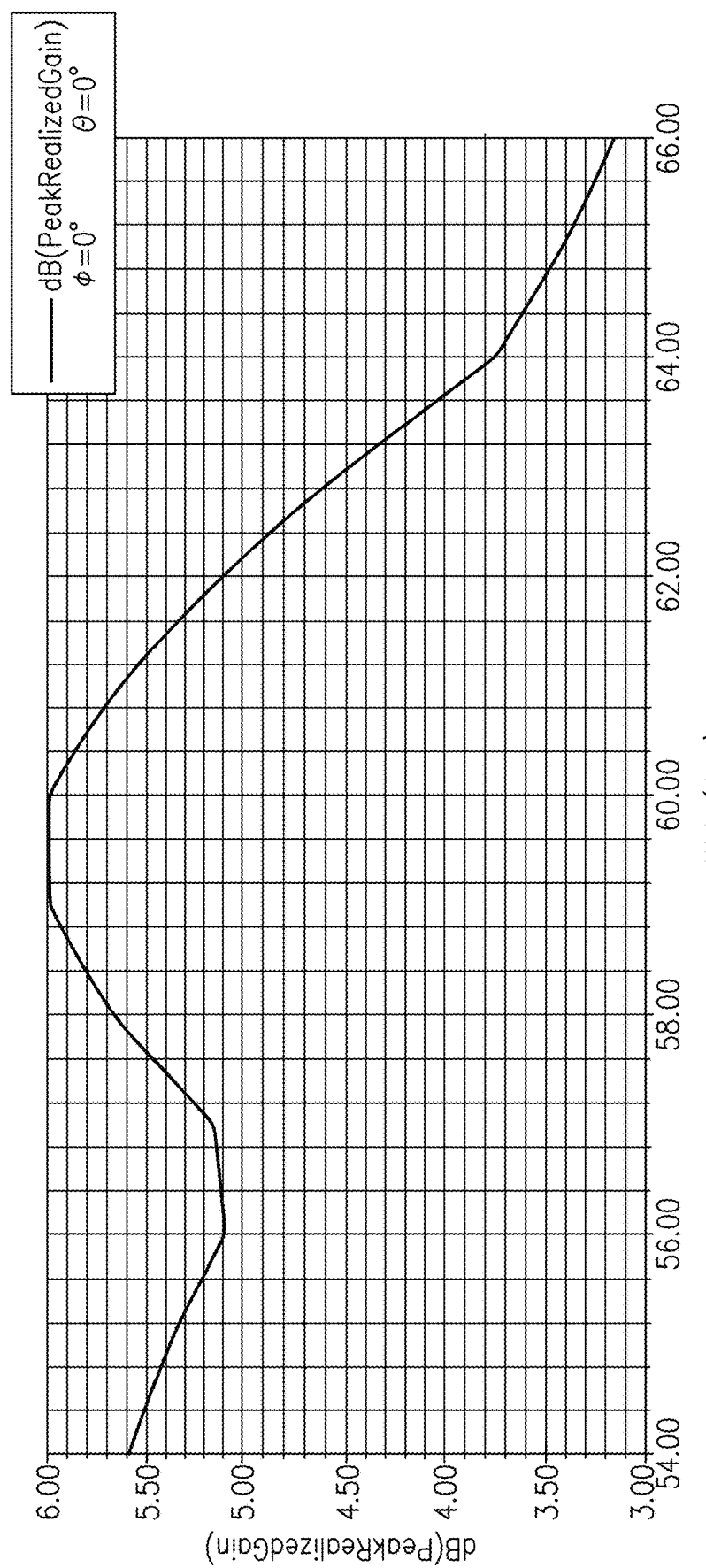

FIG. 14D is a graph of gain of the tunable patch antenna 450a versus frequency for the implementation described above.

FIGS. 15A-15E show graphs of antenna characteristics of an RF module according to another embodiment. The graphs correspond to antenna characteristics of one implementation of the RF module 600 of FIGS. 7A-7B, in which the tuning conductors 411a, 412a, 413a of the tunable patch antenna 450a are omitted. The ground feeds 403a, 403b and tuning conductors 411b, 412b, 413b, 414a, and 414b are grounded. Although specific simulation results are shown, results can vary based on a wide variety of factors, such as antenna implementation and simulation model. Accordingly, other results are possible.

Figure 15A:
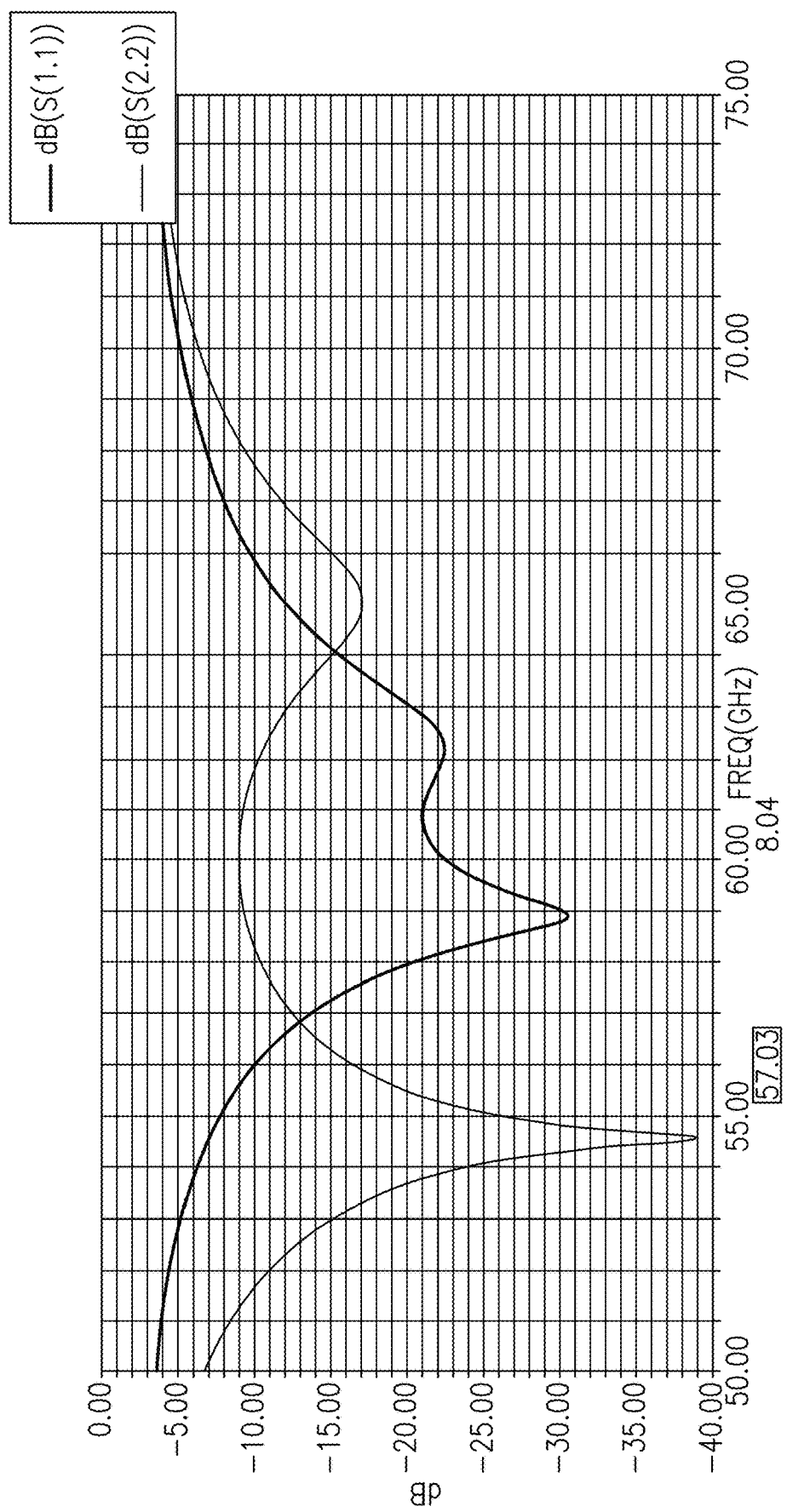
FIGS. 15A-15E show graphs of antenna characteristics of an RF module according to another embodiment.

FIG. 15A is a graph of dual resonance return loss (S11 and S22), plotted for both the tunable patch antenna 450a and the tunable patch antenna 450b for the implementation described above.

Figure 15B:
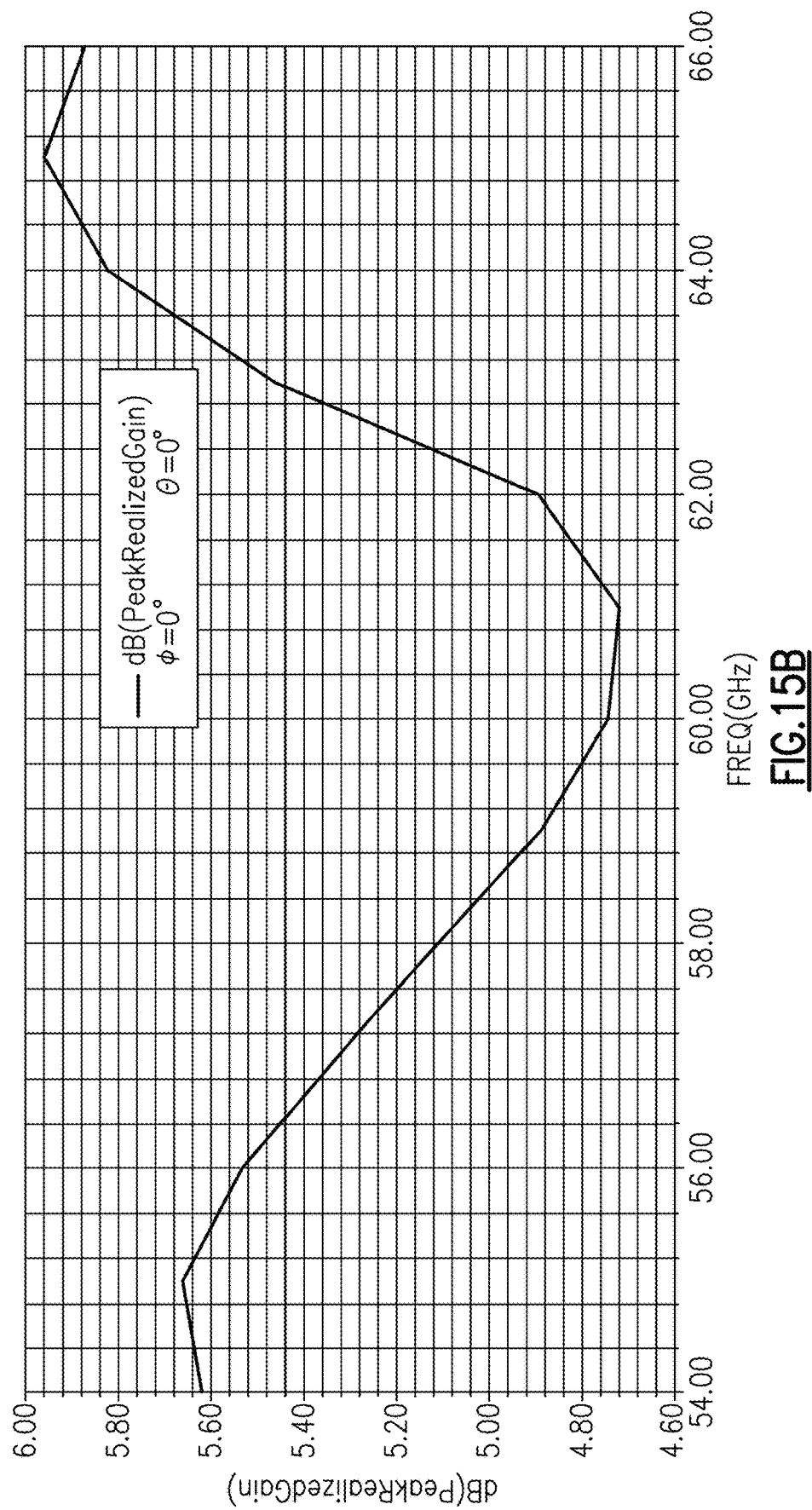

FIG. 15B is a graph of gain of the tunable patch antenna 450a versus frequency for the implementation described above.

Figure 15C:
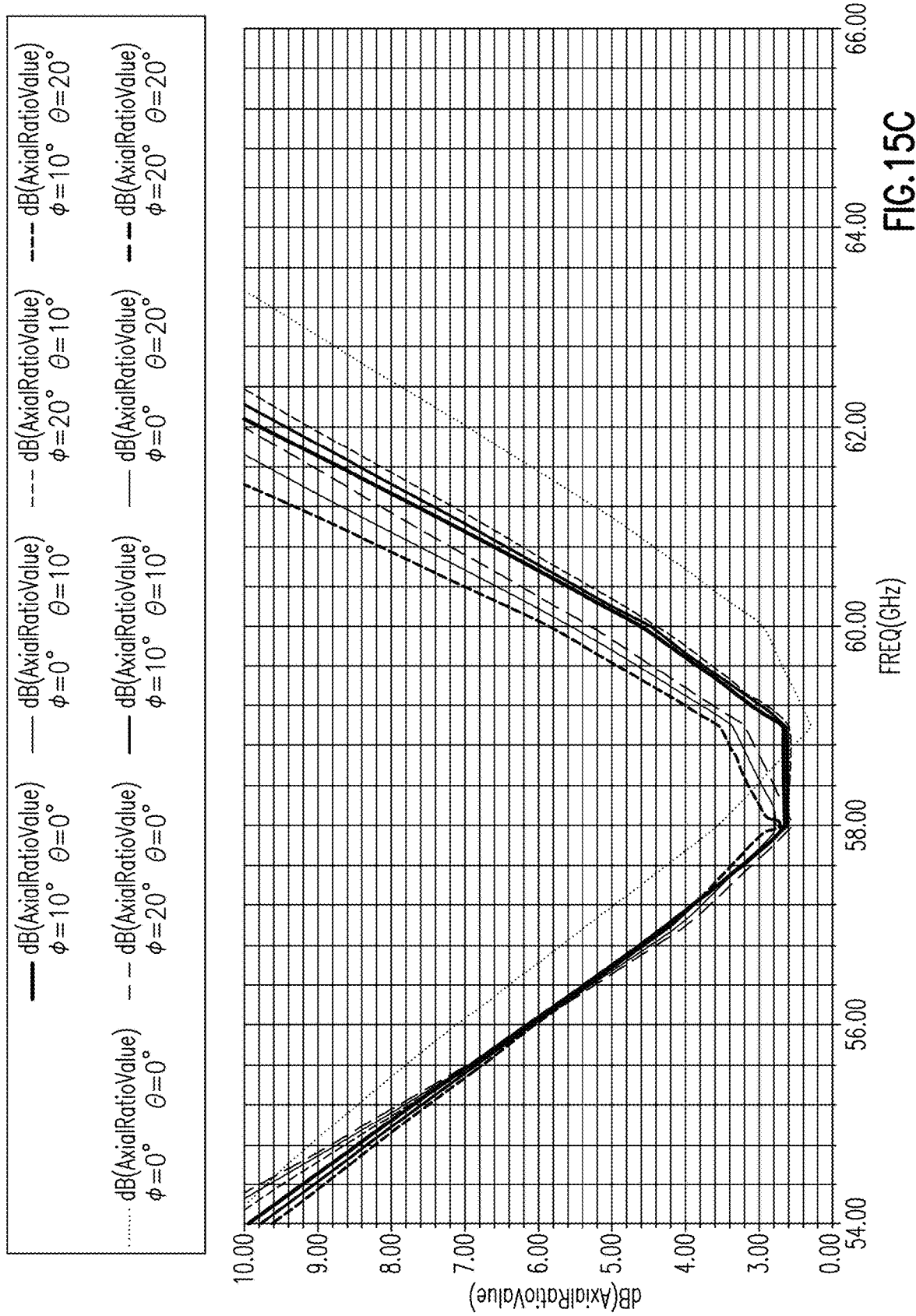

FIG. 15C is a graph of axial ratio of the tunable patch antenna 450a for different angle sweeps for the implementation described above.

Figure 15D:
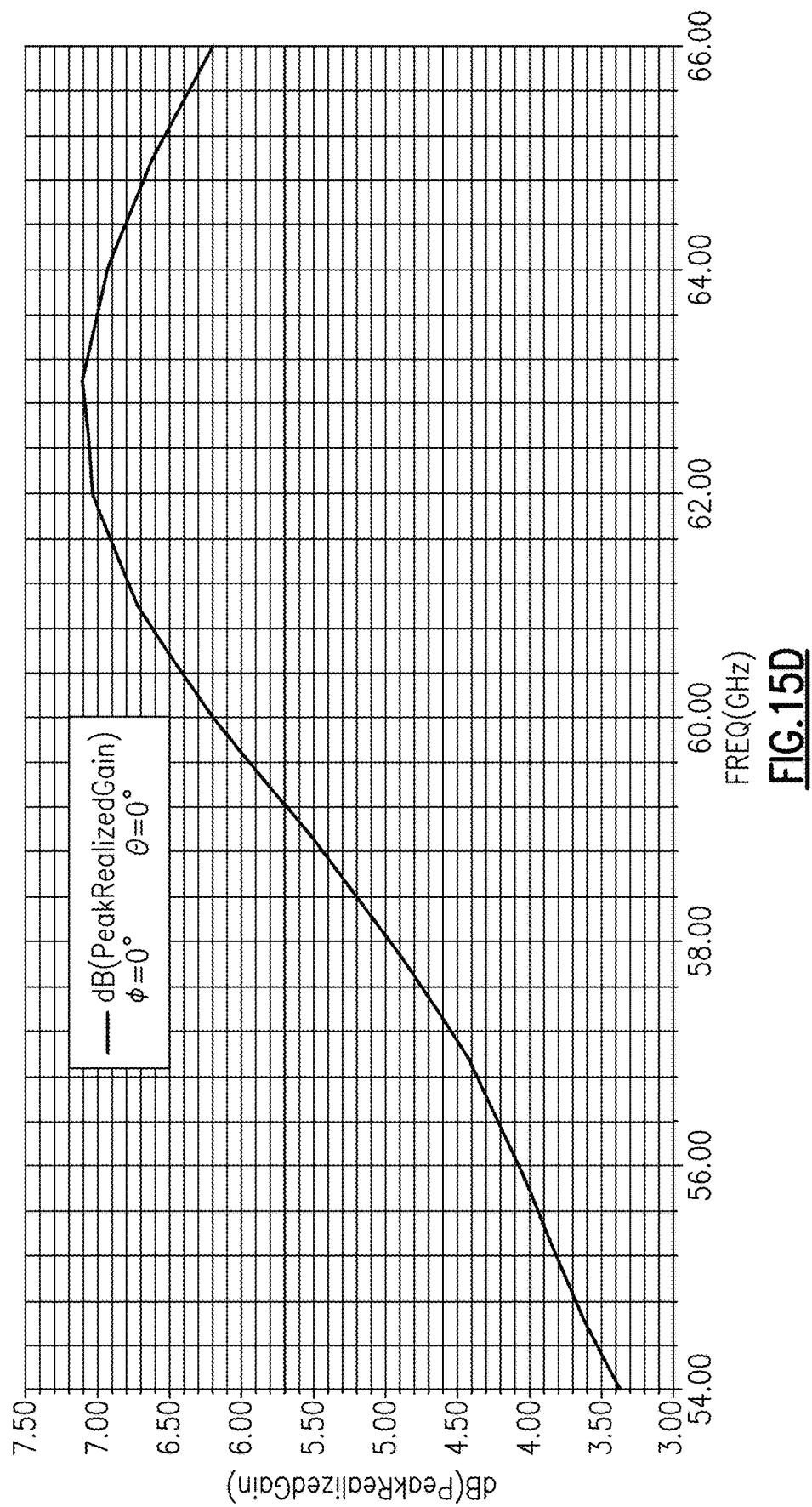

FIG. 15D is a graph of gain of the tunable patch antenna 450b versus frequency for the implementation described above.

Figure 15E:
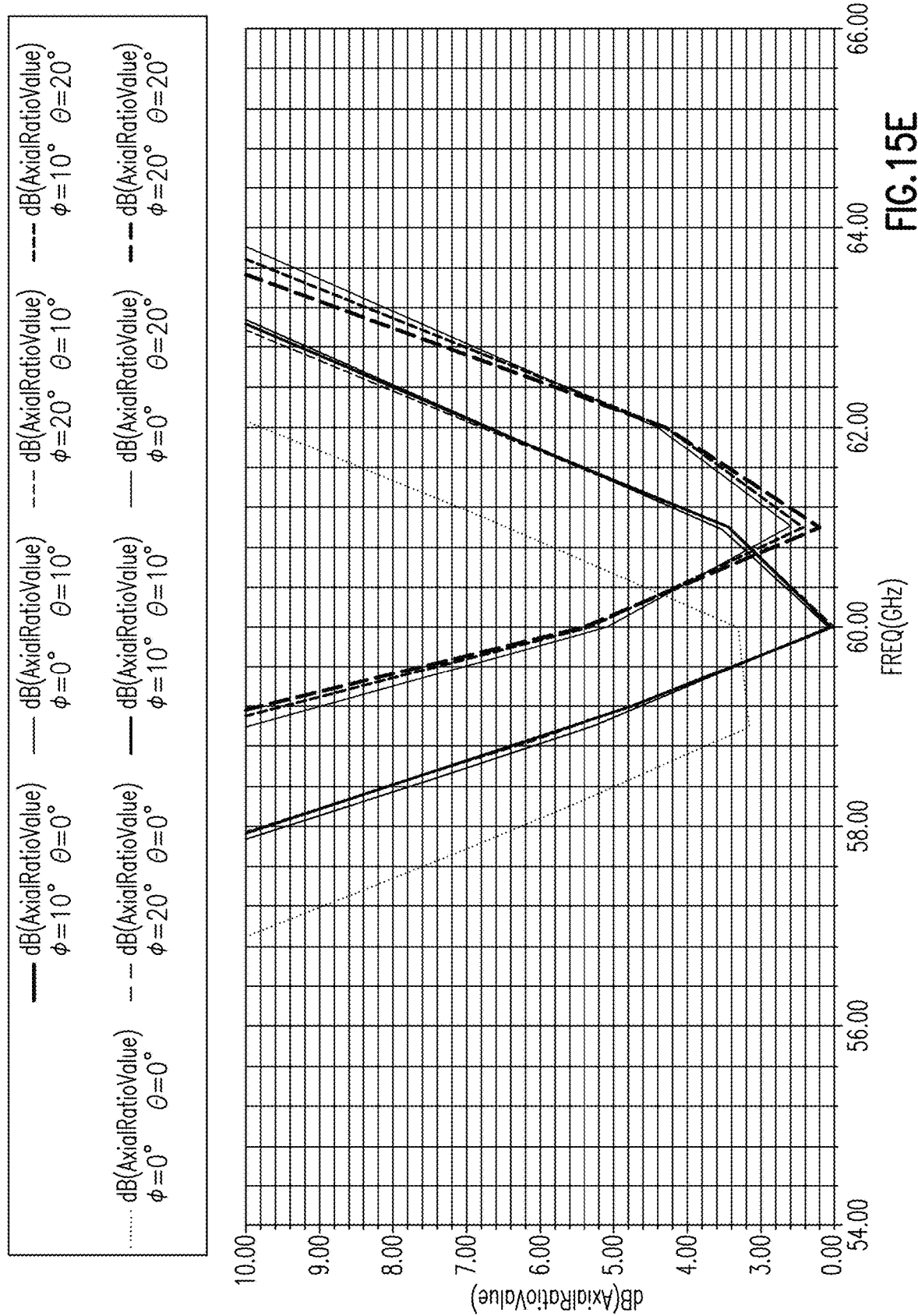

FIG. 15E is a graph of axial ratio of the tunable patch antenna 450b for different angle sweeps for the implementation described above.

FIGS. 16A-16E show graphs of antenna characteristics of an RF module according to another embodiment. The graphs correspond to antenna characteristics of one implementation of the RF module 600 of FIGS. 7A-7B, in which the tuning conductors 411a, 412a, 413a, and 414a of the tunable patch antenna 450a are omitted. The ground feeds 403a, 403b and tuning conductors 411b, 412b, 413b, and 414b are grounded. Although specific simulation results are shown, results can vary based on a wide variety of factors, such as antenna implementation and simulation model. Accordingly, other results are possible.

Figure 16A:
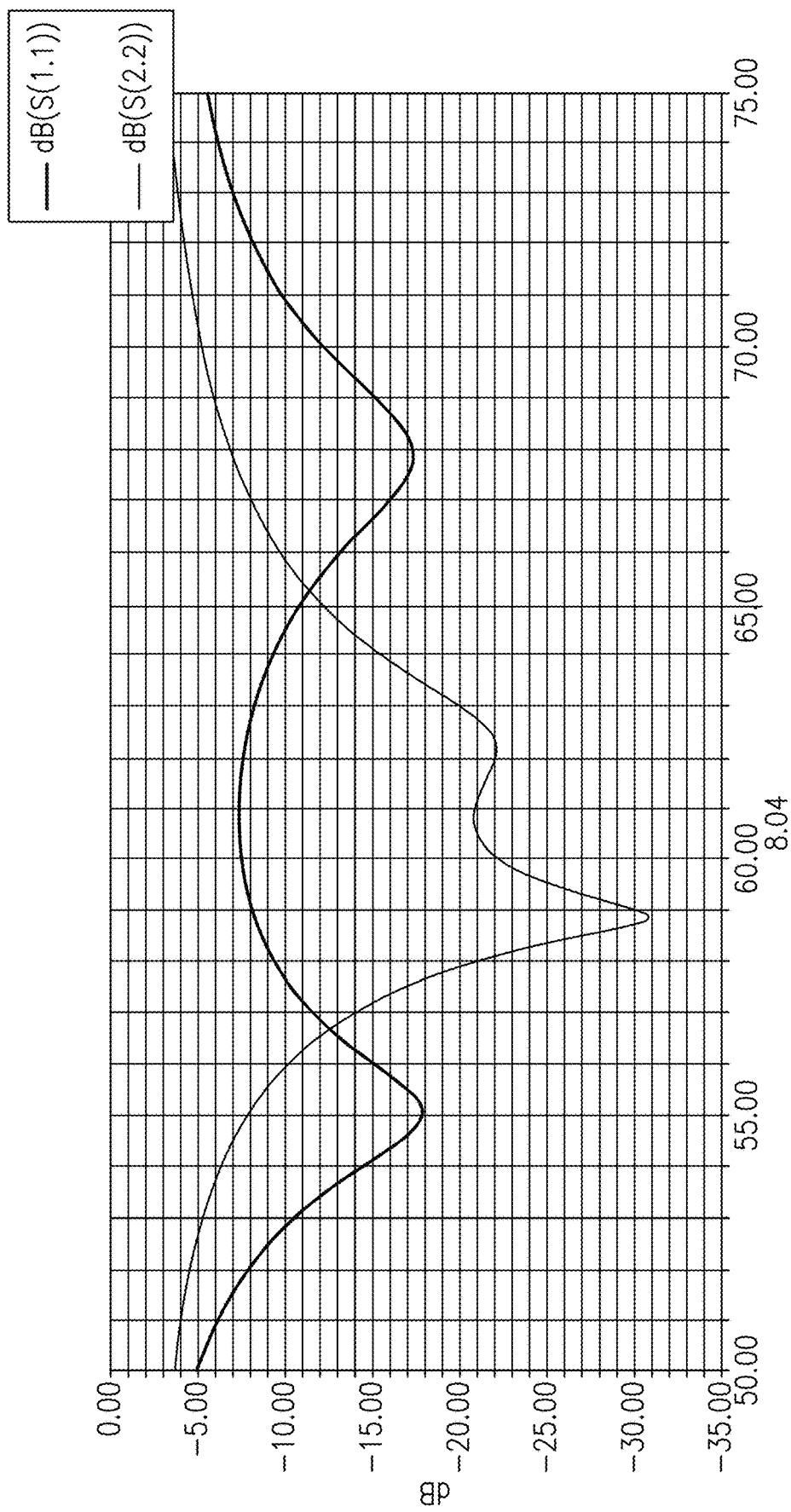

FIG. 16A is a graph of dual resonance return loss (S11 and S22), plotted for both the tunable patch antenna 450a and the tunable patch antenna 450b for the implementation described above.

Figure 16B:
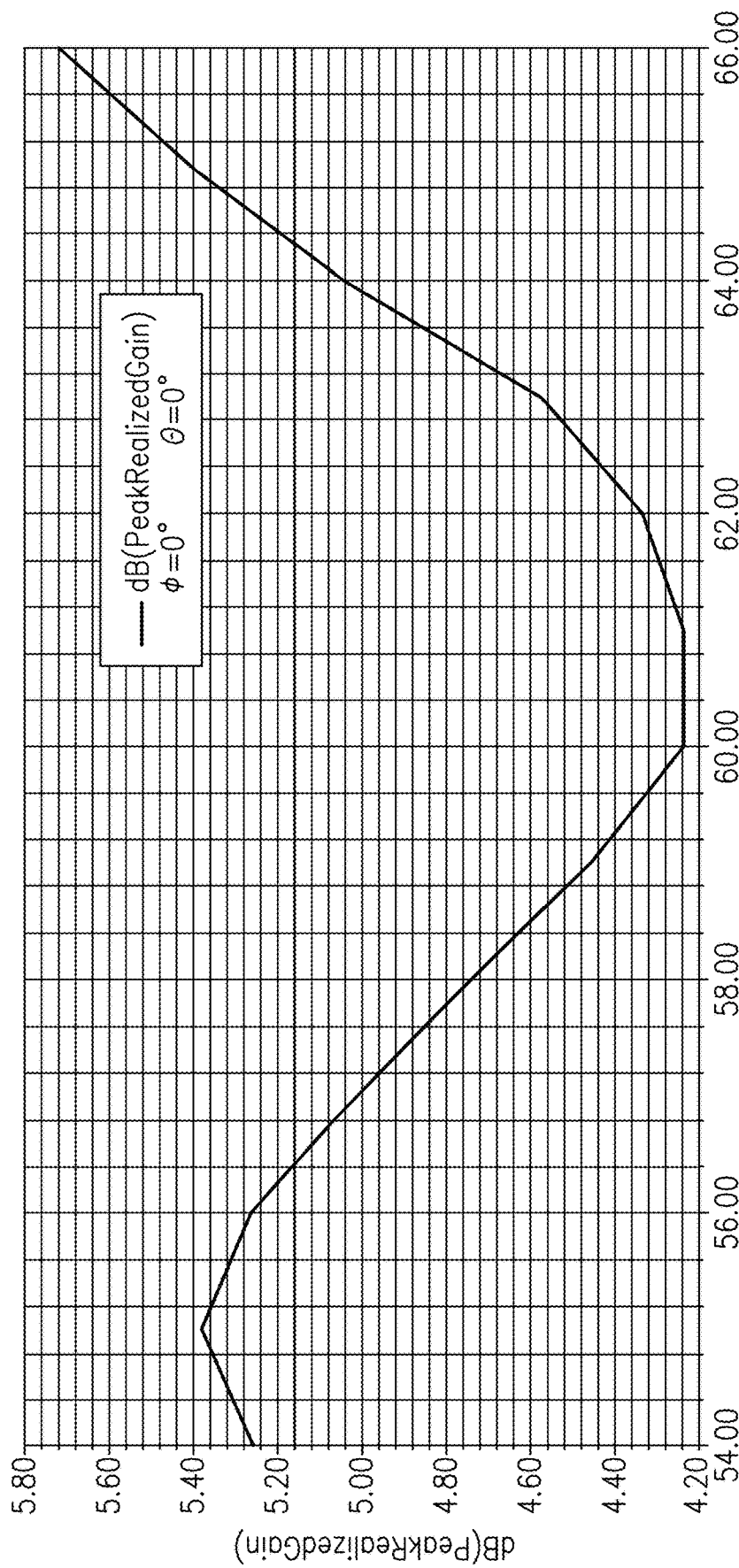

FIG. 16B is a graph of gain of the tunable patch antenna 450a versus frequency for the implementation described above.

Figure 16C:
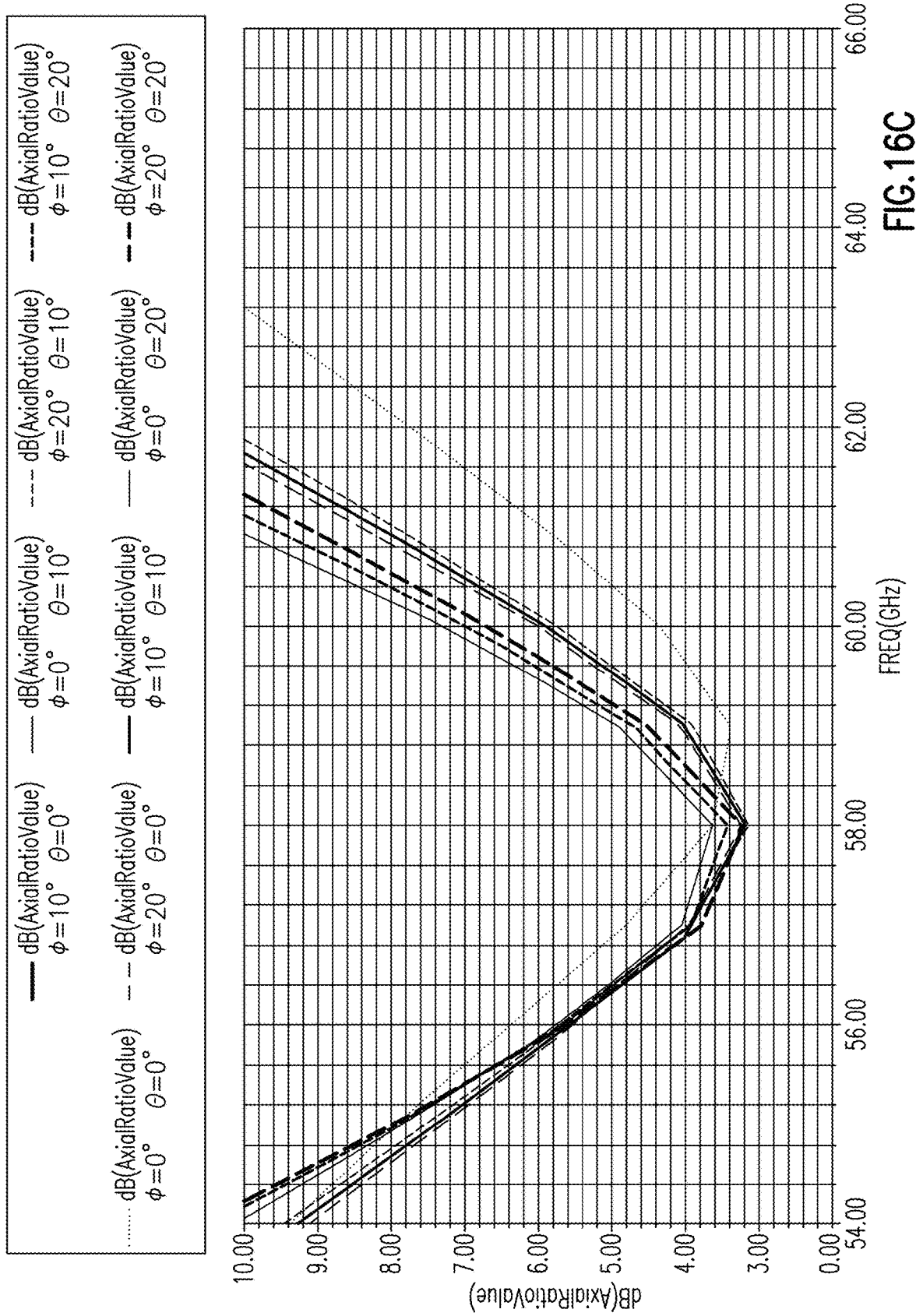

FIG. 16C is a graph of axial ratio of the tunable patch antenna 450a for different angle sweeps for the implementation described above.

FIG. 16D is a graph of gain of the tunable patch antenna 450b versus frequency for the implementation described above.

Figure 16E:
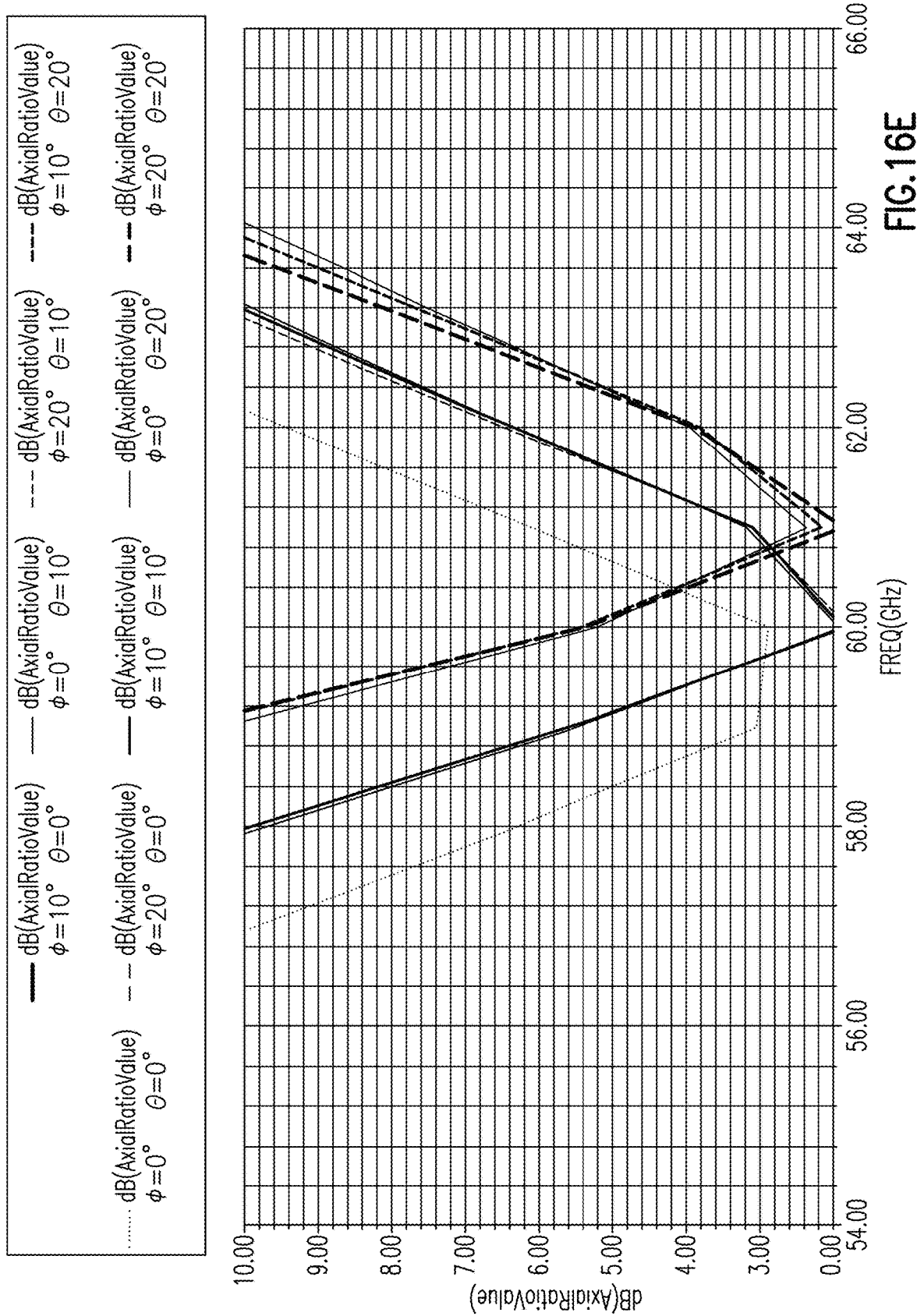

FIG. 16E is a graph of axial ratio of the tunable patch antenna 450b for different angle sweeps for the implementation described above.

Figure 17A:
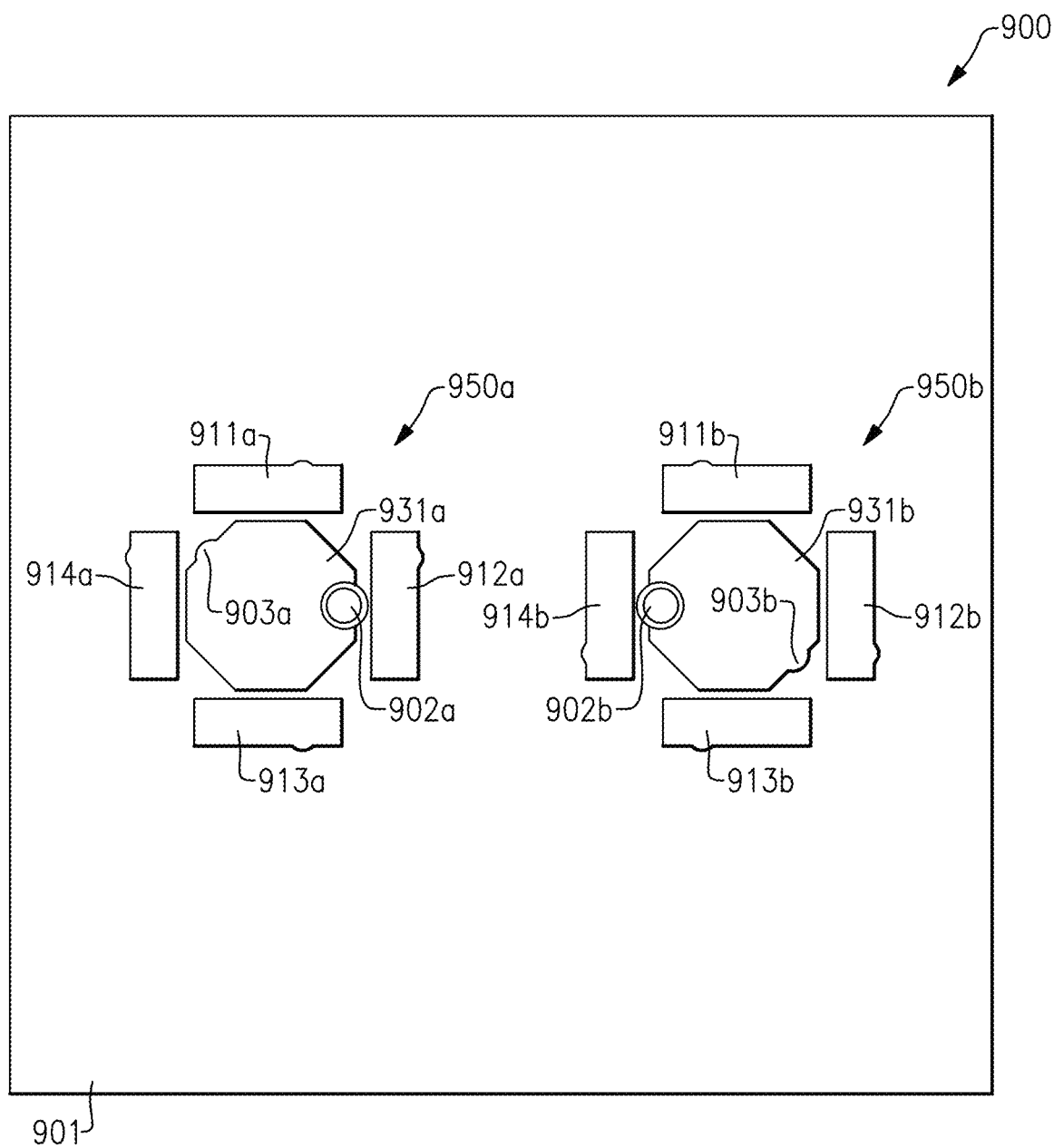
FIG. 17A is a plan view of an RF module according to another embodiment.

FIG. 17A is a plan view of an RF module 900 according to another embodiment. The RF module 900 includes a laminate 901, a first tunable patch antenna 950a, and a second tunable patch antenna 950b. The first tunable patch antenna 950a includes a patch antenna element 931a, a signal feed 902a, a ground feed 903a, and tuning conductors 911a, 912a, 913a, 914a. Additionally, the second tunable patch antenna 950b includes a patch antenna element 931b, a signal feed 902b, a ground feed 903b, and tuning conductors 911b, 912b, 913b, 914b. Vias and switches are not visible in FIG. 17A.

Figure 17B:
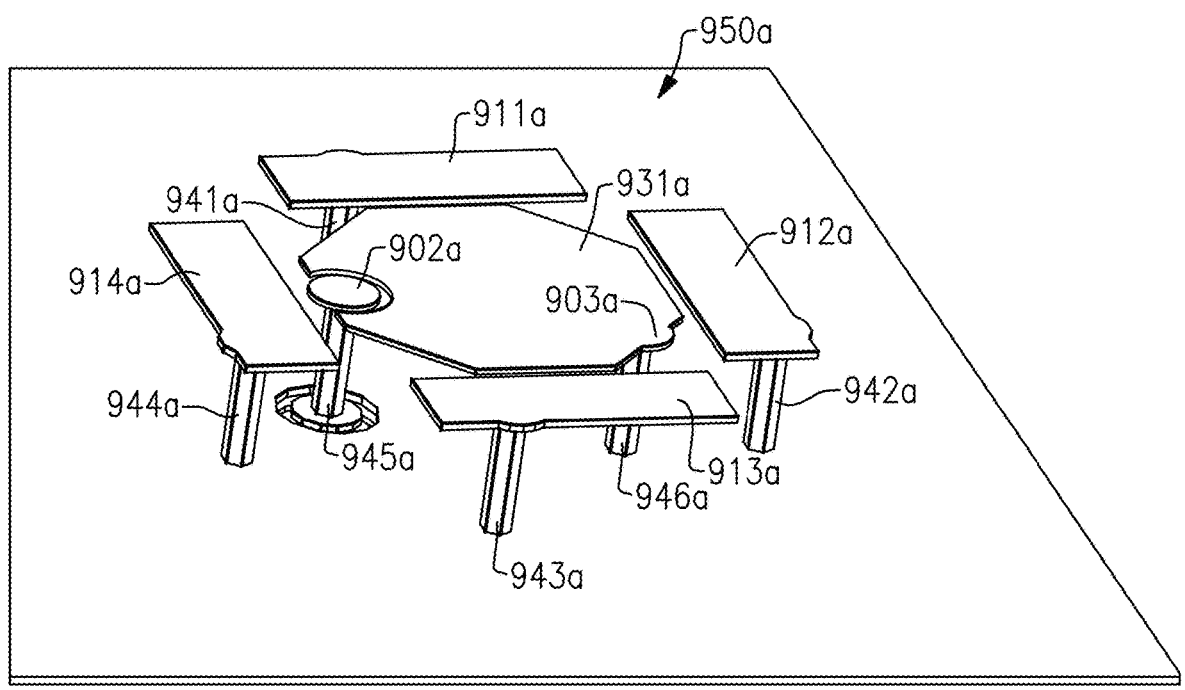
FIG. 17B is a perspective view of a tunable patch antenna according to another embodiment.

FIG. 17B is a perspective view of a tunable patch antenna 950a according to another embodiment. The tunable patch antenna 950a of FIG. 17B corresponds to one implementation of a tunable patch antenna suitable for inclusion in an RF module, such as the RF module 900 of FIG. 17A. The tunable patch antenna 950a includes a patch antenna element 931a, a signal feed 902a, a ground feed 903a, tuning conductors 911a, 912a, 913a, 914a, and vias 941a, 942a, 943a, 944a, 945a, 946a. Additionally the tunable patch antenna 950a includes switches, which are not visible in FIG. 17B.

Although not shown in FIGS. 17A and 17B, the RF module 900 can include additional structures and components that have been omitted from the figures for clarity. Additionally, certain layers have been depicted transparently so that certain components, such as vias, are visible.

As shown in FIGS. 17A and 17B, the patch antenna elements 931a, 931b include a capacitive signal feed. For example, as shown in FIG. 17B, the signal feed 902a is implemented as a center conductor that is capacitively coupled to the patch antenna element 901a to thereby feed the patch antenna element 901a. Thus, the signal feed 902a does not physically touch the patch antenna element 901a, in this embodiment. Implementing a patch antenna element in this manner can aid in providing fine-tuned control over desired antenna characteristics.

Figure 18A:
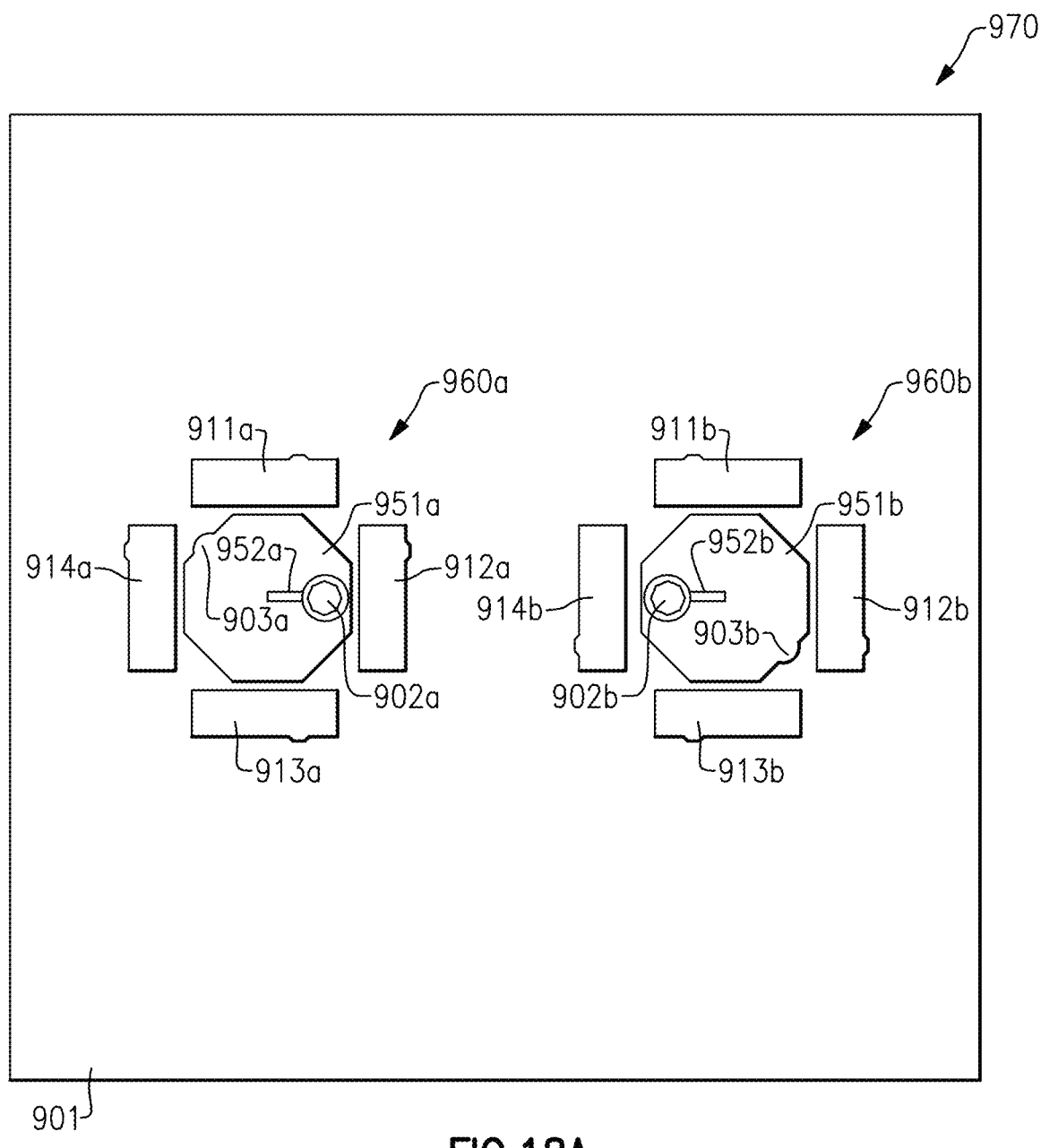
FIG. 18A is a plan view of an RF module according to another embodiment.

FIG. 18A is a plan view of an RF module 970 according to another embodiment. The RF module 970 includes a laminate 901, a first tunable patch antenna 960a, and a second tunable patch antenna 960b. The first tunable patch antenna 960a is similar to the first tunable patch antenna 950a of FIG. 17A, except that the first tunable patch antenna 960a of FIG. 18A includes a patch antenna element 951a including a slot 952a. Likewise, the second tunable patch antenna 960b is similar to the first tunable patch antenna

950b of FIG. 17A, except that the second tunable patch antenna 960b of FIG. 18A includes a patch antenna element 951b including a slot 952b.

Figure 18B:
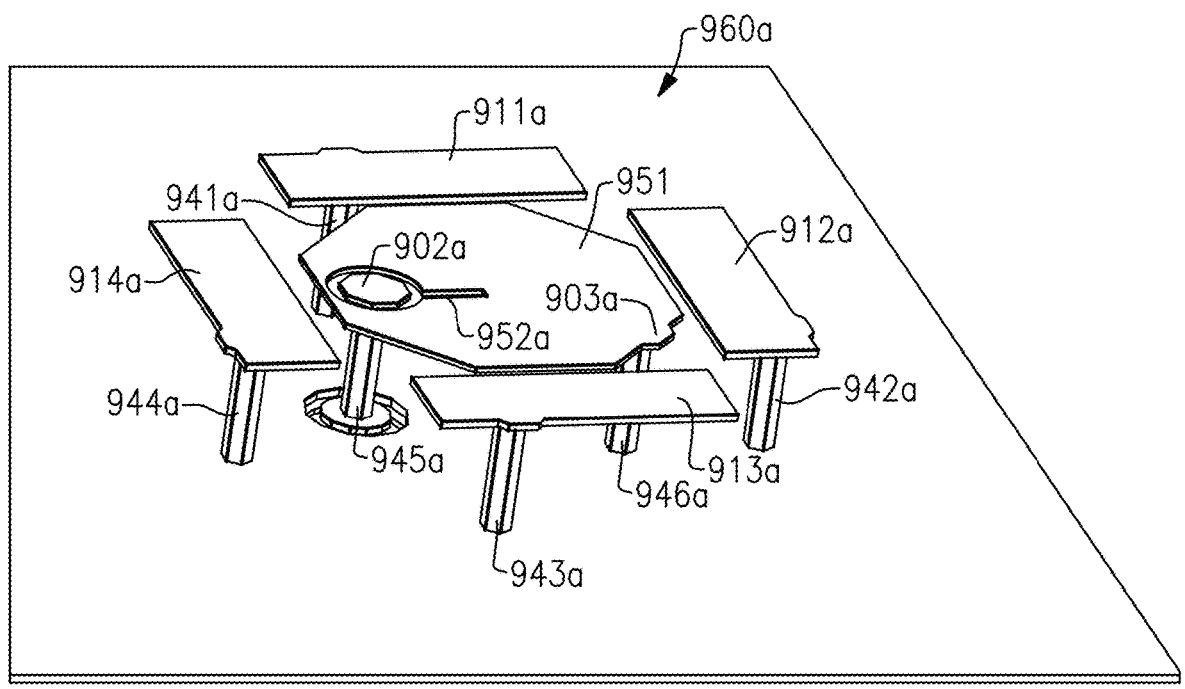
FIG. 18B is a perspective view of a tunable patch antenna according to another embodiment.

FIG. 18B is a perspective view of a tunable patch antenna 960a according to another embodiment. The tunable patch antenna 960a of FIG. 18B corresponds to one implementation of a tunable patch antenna suitable for inclusion in an RF module, such as the RF module 970 of FIG. 18A. The tunable patch antenna 960a of FIG. 18B is similar to the first tunable patch antenna 950a of FIG. 18A, except that the first tunable patch antenna 960a of FIG. 18A includes a patch antenna element 951a including a slot 952a.

Including a slot in a patch antenna element aids in controlling an input impedance into the patch antenna element from the signal feed.

Any of the antenna elements herein can include a capacitive signal feed and/or a slot.

Figure 19:
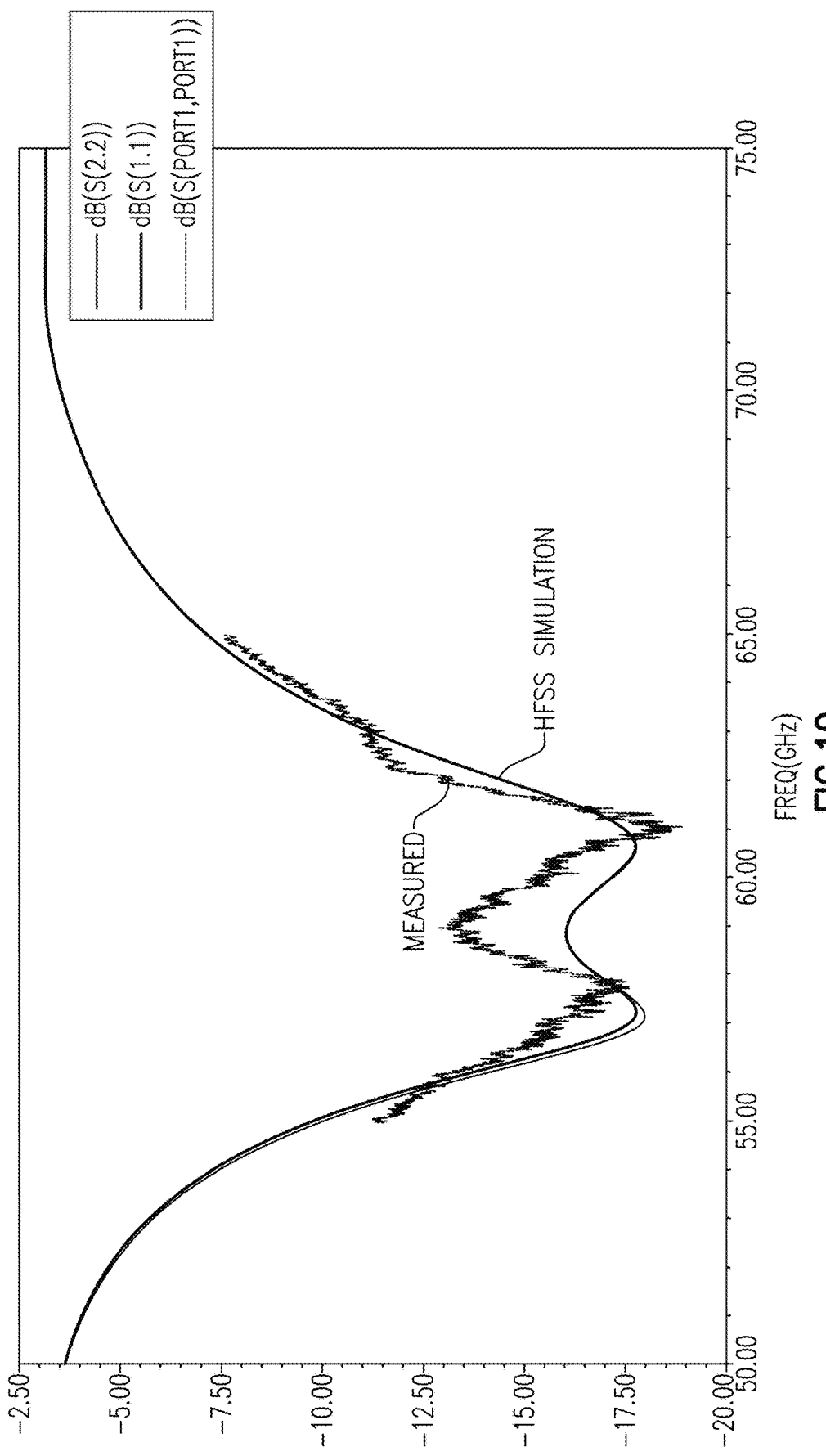
FIG. 19 is a graph of measured versus simulated dual resonance return loss for one embodiment of an RF module.

FIG. 19 is a graph of measured versus simulated dual resonance return loss for one embodiment of an RF module. The simulations are taken using High Frequency Structure Simulator (HFSS). As shown in FIG. 19, measured versus simulated results are relatively close.

Figure 20:
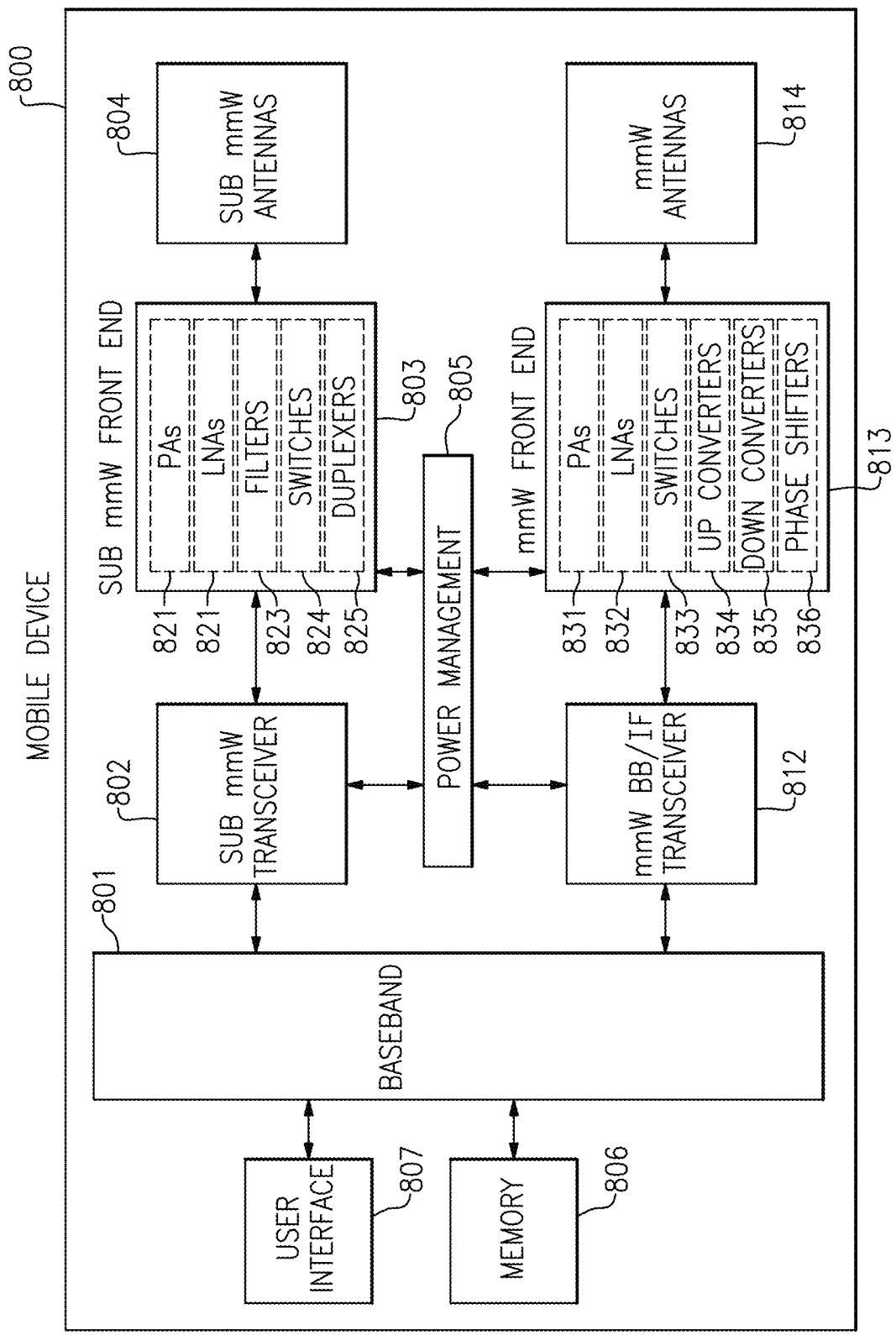
FIG. 20 is a schematic diagram of one embodiment of a mobile device.

FIG. 20 is a schematic diagram of one embodiment of a mobile device 800. The mobile device 800 includes a baseband system 801, a sub millimeter wave (mmW) transceiver 802, a sub mmW front end system 803, sub mmW antennas 804, a power management system 805, a memory 806, a user interface 807, a mmW baseband (BB)/intermediate frequency (IF) transceiver 812, a mmW front end system 813, and mmW antennas 814.

The mobile device 800 of FIG. 20 illustrates one example of a mobile device that can include a reconfigurable antenna system with ground tuning. However, the teachings herein are applicable to other implementations of mobile devices and RF electronics.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

In the illustrated embodiment, the sub mmW transceiver 802, sub mmW front end system 803, and sub mmW antennas 804 serve to transmit and receive centimeter waves and other radio frequency signals below millimeter wave frequencies. Additionally, the mmW BB/IF transceiver 812, mmW front end system 813, and mmW antennas 814 serve to transmit and receive millimeter waves. Although one specific example is shown, other implementations are possible, including, but not limited to, mobile devices operating using circuitry operating over different frequency ranges and wavelengths.

The sub mmW transceiver 802 generates RF signals for transmission and processes incoming RF signals received from the sub mmW antennas 804. It will be understood that various functionalities associated with the transmission and receiving of RF signals can be achieved by one or more components that are collectively represented in FIG. 20 as the sub mmW transceiver 802. In one example, separate components (for instance, separate circuits or dies) can be provided for handling certain types of RF signals.

The sub mmW front end system 803 aids is conditioning signals transmitted to and/or received from the antennas 804. In the illustrated embodiment, the front end system 803 includes power amplifiers (PAs) 821, low noise amplifiers (LNAs) 822, filters 823, switches 824, and duplexers 825. However, other implementations are possible.

For example, the sub mmW front end system 803 can provide a number of functionalizes, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The sub mmW antennas 804 can include antennas used for a wide variety of types of communications. For example, the sub mmW antennas 804 can include antennas for transmitting and/or receiving signals associated with a wide variety of frequencies and communications standards.

The mmW BB/IF transceiver 812 generates millimeter wave signals for transmission and processes incoming millimeter wave signals received from the mmW antennas 814. It will be understood that various functionalities associated with the transmission and receiving of RF signals can be achieved by one or more components that are collectively represented in FIG. 20 as the mmW transceiver 812. The mmW BB/IF transceiver 812 can operate at baseband or intermediate frequency, based on implementation.

The mmW front end system 813 aids is conditioning signals transmitted to and/or received from the mmW antennas 814. In the illustrated embodiment, the front end system 803 includes power amplifiers 831, low noise amplifiers 832, switches 833, up converters 834, down converters 835, and phase shifters 836. However, other implementations are possible. In one example, the mobile device 800 operates with a BB mmW transceiver, and up converters and down-converters are omitted from the mmW front end system. In another example, the mmW front end system further includes filters for filtering millimeter wave signals.

The mmW antennas 814 can include antennas used for a wide variety of types of communications. The mmW antennas 814 can include antenna elements implemented in a wide variety of ways, and in certain configurations the antenna elements are arranged to form one or more antenna arrays. Examples of antenna elements for millimeter wave antenna arrays include, but are not limited to, patch antennas, dipole antenna elements, ceramic resonators, stamped metal antennas, and/or laser direct structuring antennas.

In certain implementations, the mobile device 800 supports MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

In certain implementations, the mobile device 800 operates with beamforming. For example, the mmW front end system 803 includes phase shifters having variable phase controlled by the transceiver 802. Additionally, the phase shifters are controlled to provide beam formation and directivity for transmission and/or reception of signals using the mmW antennas 814. For example, in the context of signal transmission, the phases of the transmit signals provided to an antenna array used for transmission are controlled such that radiated signals combine using constructive and destructive interference to generate an aggregate transmit signal exhibiting beam-like qualities with more signal strength propagating in a given direction. In the context of signal reception, the phases are controlled such that more signal energy is received when the signal is arriving to the antenna array from a particular direction.

The baseband system 801 is coupled to the user interface 807 to facilitate processing of various user input and output (I/O), such as voice and data. The baseband system 801 provides the sub mmW and mmW transceivers with digital representations of transmit signals, which are processed by the transceivers to generate RF signals for transmission. The baseband system 801 also processes digital representations of received signals provided by the transceivers. As shown in FIG. 20, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers of the front end systems. For example, the power management system 805 can be configured to change the supply voltage(s) provided to one or more of the power amplifiers to improve efficiency, such as power added efficiency (PAE).

In certain implementations, the power management system 805 receives a battery voltage from a battery. The battery can be any suitable battery for use in the mobile device 800, including, for example, a lithium-ion battery.

Figure 21:
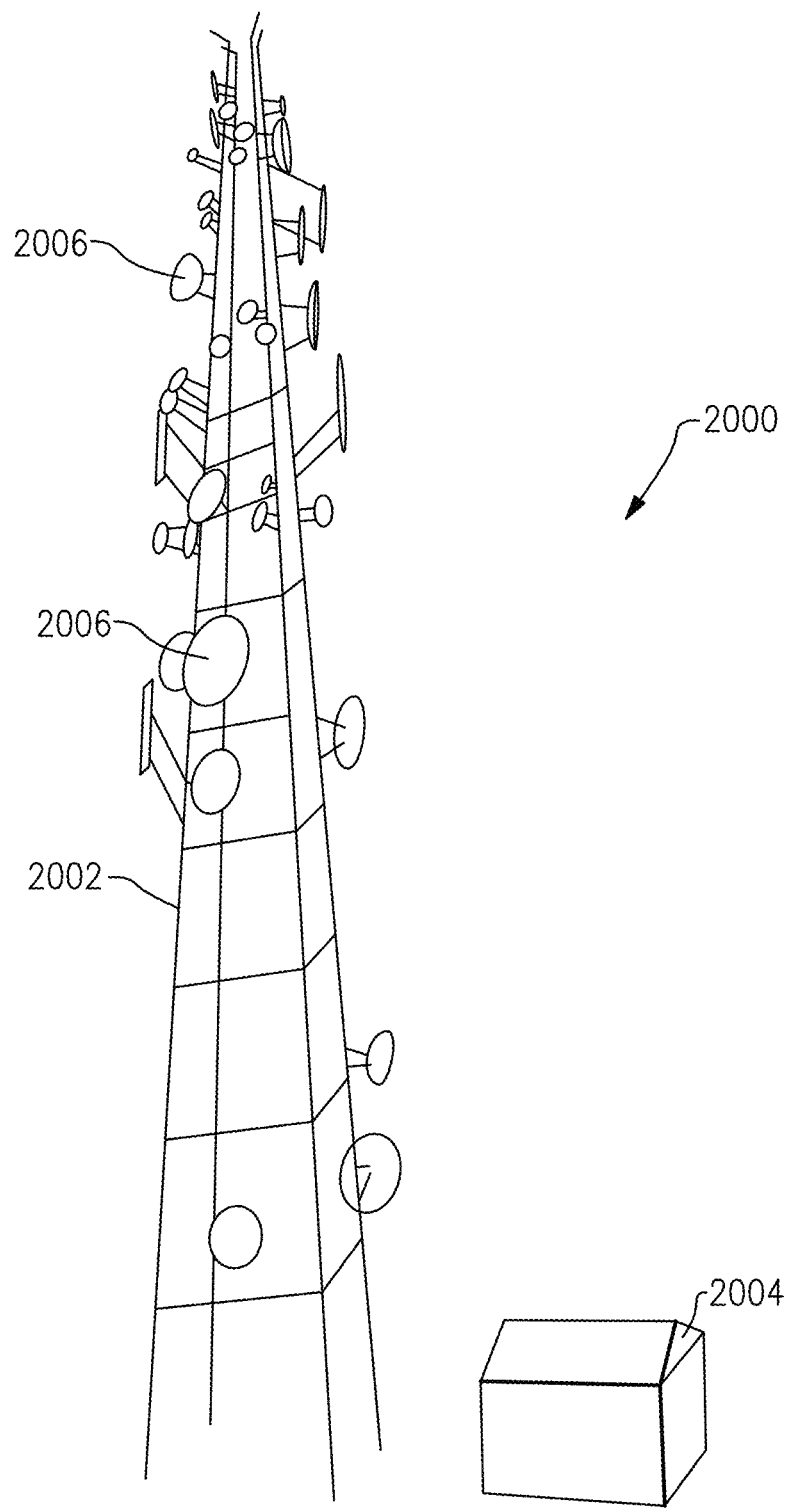
FIG. 21 is a schematic diagram of one embodiment of a macro cell base station.

FIG. 21 is a schematic diagram of one embodiment of a macro cell base station 2000. The macro cell base station 2000 includes a tower 2002, antenna structures 2006, and an electronics housing 2004.

The macro cell base station 2000 of FIG. 21 illustrates one example of a base station that can include a reconfigurable antenna system with ground tuning. For example, any of the antenna structures 2006 can include one or more tunable antenna systems implemented in accordance with teachings herein. However, the teachings herein are applicable to other implementations of base stations and RF electronics.

Figure 22:
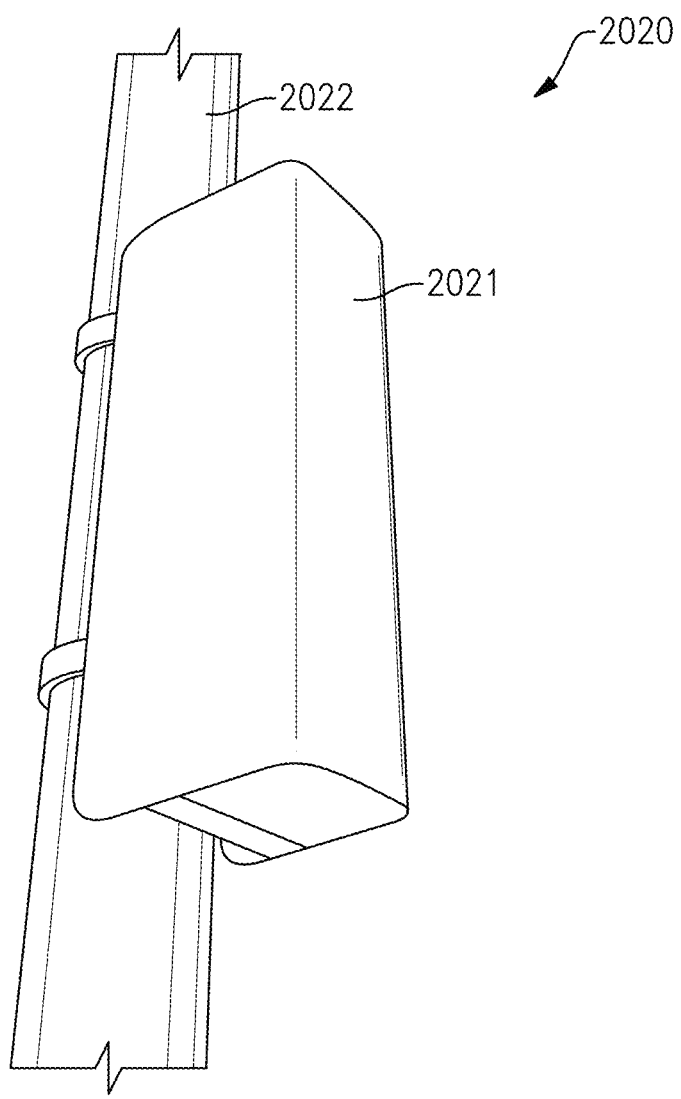
FIG. 22 is a schematic diagram of one embodiment of a small cell base station.

FIG. 22 is a schematic diagram of one embodiment of a small cell base station 2020. The small cell base station 2020 includes an antenna and electronics housing 2021, which has been attached to a pole 2022, in this example.

The small cell base station 2020 of FIG. 22 illustrates another example of a base station that can include a reconfigurable antenna system with ground tuning. For example, the antenna and electronics housing 2021 can house one or more tunable antenna systems implemented in accordance with teachings herein. However, the teachings herein are applicable to other implementations of base stations and RF electronics.

Figure 23A:
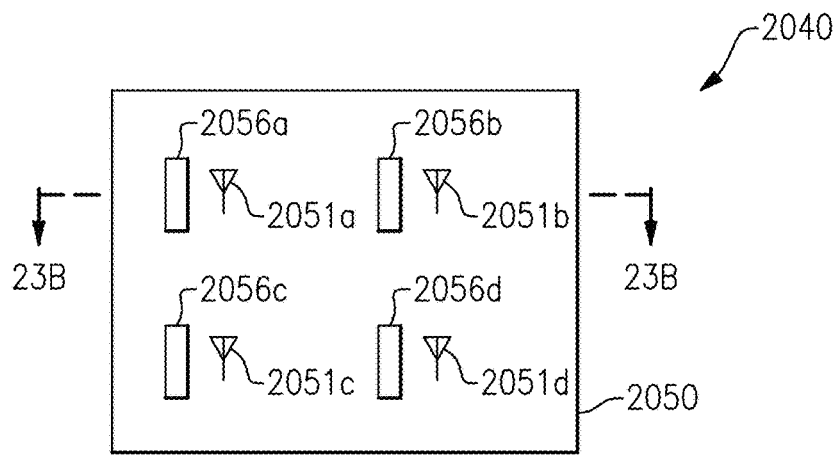
FIG. 23A is a plan view of a base station board according to one embodiment.
Figure 23B:
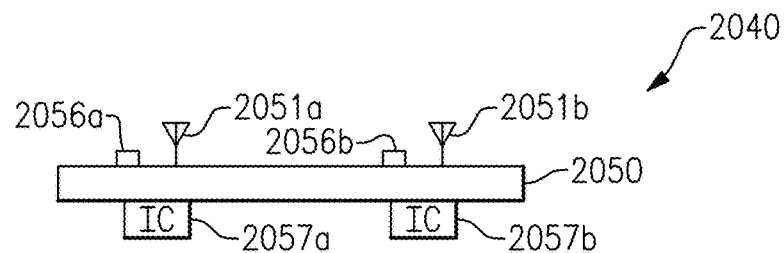
FIG. 23B is a cross section of the base station board of FIG. 23A taken along the line 23B-23B.

FIG. 23A is a plan view of a base station board 2040 according to one embodiment. FIG. 23B is a cross section of the base station board 2040 of FIG. 23A taken along the line 23B-23B. The base station board 2040 can be implemented in the macro cell base station 2000 of FIG. 21, the small cell base station 2020 of FIG. 22, and/or other suitable base station.

The base station board 2040 includes a circuit board 2050, antenna elements 2051a, 2051b, 2051c, 2051d, tuning conductors 2056a, 2056b, 2056c, 2056d, and semiconductor dies 2057a, 2057b. In the illustrated embodiment, the tuning conductors and antenna elements are a first side of the circuit board 2050, and the semiconductor dies are on a second side of the circuit board 2050 opposite the first side. In certain implementations, the semiconductor dies 2057a, 2057b include switches for controlling the electrical potential of the tuning conductors. Although one example of component placement is shown, antenna element(s), tuning conductor(s), and/or semiconductor die(s) can be placed in a wide variety of locations.

Although an example with four antenna elements, four tuning conductors, and two semiconductor dies is shown, more or fewer antenna elements, tuning conductors, and/or semiconductor dies can be included. For example, any of the antenna systems disclosed herein can be implemented on a base station board.

Figure 24A:
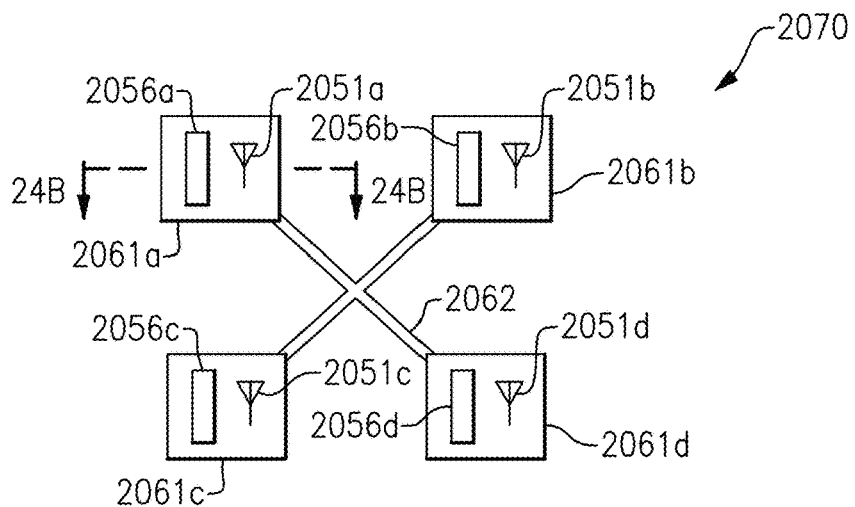
FIG. 24A is a plan view of an array of modules for a base station according to one embodiment.

FIG. 24A is a plan view of an array of modules 2070 for a base station according to one embodiment. The array of modules 2070 includes a first module 2061a, a second module 2061b, a third module 2061c, and a fourth module 2061d which are fixed in position relative to one another by a support 2062. Each module includes an antenna element, a tuning conductor, and a semiconductor die, in this embodiment.

Figure 24B:
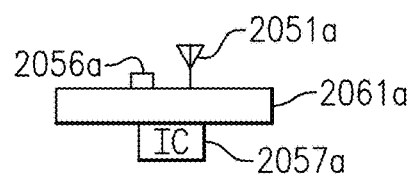
FIG. 24B is a cross section of one module of FIG. 24A taken along the line 24B-24B.

FIG. 24B is a cross section of the first module 2061a of FIG. 24A taken along the line 24B-24B. As shown in FIG. 24B, the first module 2061a includes a tuning conductor 2056a, an antenna element 2051a, and an IC 2057a. In the illustrated embodiment, the tuning conductor 2056a and the antenna element 2051a are on a first side of the module's substrate, and the IC 2057a is on a second side of the substrate opposite the first side.

The array of modules 2070 can be implemented in the macro cell base station 2000 of FIG. 21, the small cell base station 2020 of FIG. 22, and/or other suitable base station. Although an example with four modules is shown, more or fewer modules and/or modules of different implementations can be used. For example, any of the antenna systems disclosed herein can be arrayed as modules in a base station.

Figure 25A:
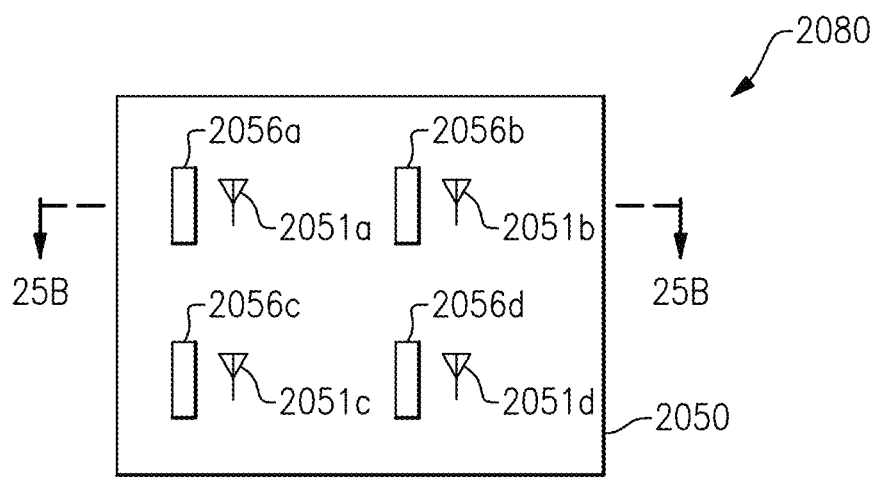
FIG. 25A is a plan view of a base station board according to another embodiment.
Figure 25B:
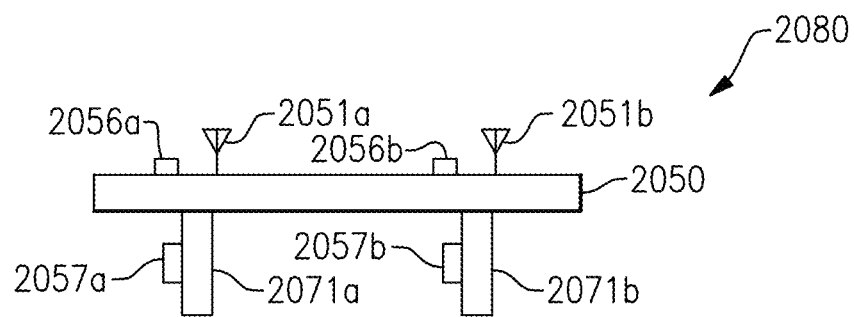
FIG. 25B is a cross section of the base station board of FIG. 25A taken along the line 25B-25B.

FIG. 25A is a plan view of a base station board 2080 according to another embodiment. FIG. 25B is a cross section of the base station board 2080 of FIG. 25A taken along the line 25B-25B.

The base station board 2080 of FIGS. 25A-25B is similar to the base station board 2040 of FIGS. 23A-23B, except the base station board 2080 includes daughter boards 2071a, 2071b extending perpendicular to the circuit board 2050. In this embodiment, each daughter board includes an IC, which can include switches for controlling the electrical potential of tuning conductors. Any number of daughter boards and ICs can be included, for instance, one daughter board per antenna.

Although FIGS. 23A-25B illustrate various examples of tunable antenna systems for base stations, other implementations are possible.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency module comprising:
a module substrate;
an antenna array formed on the module substrate and including a first patch antenna and a second patch antenna;
a first tuning conductor positioned between the first patch antenna and the second patch antenna; and
a semiconductor die attached to the module substrate and including a first transistor switch operable to control an electrical potential of the first tuning conductor to provide tuning to the antenna array.

2. The radio frequency module of claim 1 wherein the first patch antenna includes a signal feed and a ground feed, the semiconductor die further including a ground transistor switch electrically connected between the ground feed and a ground voltage.

3. The radio frequency module of claim 2 wherein the first patch antenna further includes a patch antenna element configured to radiate a radio wave, the signal feed capacitively coupled to the patch antenna element.

4. The radio frequency module of claim 3 wherein the patch antenna element further includes a slot configured to provide input impedance matching to the signal feed.

5. The radio frequency module of claim 1 wherein the first transistor switch is electrically connected between the first tuning conductor and a ground voltage.

6. The radio frequency module of claim 1 further comprising a second tuning conductor positioned on a side of the second patch antenna opposite the first tuning conductor, the semiconductor die further including a second transistor switch operable to control an electrical potential of the second tuning conductor.

7. The radio frequency module of claim 6 wherein the antenna array further includes a third patch antenna, the second tuning conductor positioned between the second patch antenna and the third patch antenna.

8. The radio frequency module of claim 1 wherein a state of the first transistor switch is operable to control a bandwidth of the antenna array.

9. The radio frequency module of claim 1 wherein a state of the first transistor switch is operable to control a direction of polarization of the antenna array.

10. The radio frequency module of claim 1 wherein the antenna array is configured to operate in a frequency range of 20 gigahertz to 100 gigahertz.

11. The radio frequency module of claim 1 wherein the first patch antenna and the second patch antenna each has an octagonal shape.

12. The radio frequency module of claim 1 wherein the antenna array is formed on a first side of the module substrate, and the semiconductor die is formed on a second side of the module substrate opposite the first side.

13. A mobile device:
a transceiver configured to generate a plurality of radio frequency transmit signals and to receive a plurality of radio frequency receive signals; and
a front end system including a radio frequency module coupled to the transceiver, the radio frequency module including a module substrate, an antenna array formed on the module substrate and including a first patch antenna and a second patch antenna, a first tuning conductor positioned between the first patch antenna and the second patch antenna, and a semiconductor die attached to the module substrate and including a first transistor switch operable to control an electrical potential of the first tuning conductor to provide tuning to the antenna array.

14. The mobile device of claim 13 wherein the first patch antenna includes a signal feed and a ground feed, the semiconductor die further including a ground transistor switch electrically connected between the ground feed and a ground voltage.

15. The mobile device of claim 13 further comprising a second tuning conductor positioned on a side of the second patch antenna opposite the first tuning conductor, the semiconductor die further including a second transistor switch operable to control an electrical potential of the second tuning conductor.

16. A front end system comprising:
a plurality of power amplifiers; and
a radio frequency module configured to receive a plurality of radio frequency signals from the plurality of power amplifiers, the radio frequency module including a module substrate, an antenna array formed on the module substrate and including a first patch antenna and a second patch antenna, a first tuning conductor positioned between the first patch antenna and the second patch antenna, and a semiconductor die attached to the module substrate and including a first transistor switch operable to control an electrical potential of the first tuning conductor to provide tuning to the antenna array.

17. The front end system of claim 16 further comprising a plurality of phase shifters each connected to a corresponding one of the plurality of power amplifiers.

18. The front end system of claim 16 wherein the first patch antenna includes a signal feed and a ground feed, the semiconductor die further including a ground transistor switch electrically connected between the ground feed and a ground voltage.

19. The front end system of claim 16 wherein the first transistor switch is electrically connected between the first tuning conductor and a ground voltage.

20. The front end system of claim 16 further comprising a second tuning conductor positioned on a side of the second patch antenna opposite the first tuning conductor, the semiconductor die further including a second transistor switch operable to control an electrical potential of the second tuning conductor.

* * * * *